US009804789B2

(12) United States Patent
Uriel

(10) Patent No.: US 9,804,789 B2
(45) Date of Patent: Oct. 31, 2017

(54) METHODS AND APPARATUS TO APPLY A MODULARIZED VIRTUALIZATION TOPOLOGY USING VIRTUAL HARD DISKS

(71) Applicant: VMware, Inc., Palo Alto, CA (US)

(72) Inventor: Ilan Uriel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/749,495

(22) Filed: Jun. 24, 2015

(65) Prior Publication Data

US 2016/0378361 A1    Dec. 29, 2016

(51) Int. Cl.
*G06F 3/06* (2006.01)
*G06F 9/455* (2006.01)

(52) U.S. Cl.
CPC .......... *G06F 3/0616* (2013.01); *G06F 3/0665* (2013.01); *G06F 3/0688* (2013.01); *G06F 9/45558* (2013.01); *G06F 2009/4557* (2013.01); *G06F 2009/45579* (2013.01)

(58) Field of Classification Search
CPC ...... G06F 3/067; G06F 3/0607; G06F 3/0616; G06F 3/0665; G06F 3/0688; G06F 3/0689; G06F 3/0683; G06F 3/0664
See application file for complete search history.

(56) References Cited

U.S. PATENT DOCUMENTS

| 6,421,684 | B1 * | 7/2002 | Cabrera | G06F 3/0607 707/802 |
| 7,085,883 | B1 * | 8/2006 | Dalgic | G06F 3/0617 711/114 |
| 7,953,942 | B2 * | 5/2011 | Innan | G06F 3/0605 709/223 |
| 8,060,476 | B1 | 11/2011 | Afonso et al. | |
| 8,156,378 | B1 | 4/2012 | Suit | |
| 8,285,758 | B1 * | 10/2012 | Bono | G06F 17/30079 707/822 |
| 8,336,047 | B2 * | 12/2012 | Van Hensbergen | G06F 9/5072 709/226 |
| 8,843,489 | B2 * | 9/2014 | Provenzano | G06F 3/0605 707/737 |
| 8,869,145 | B1 * | 10/2014 | Barve | G06F 9/5077 711/6 |
| 8,943,203 | B1 | 1/2015 | Lent et al. | |
| 9,256,475 | B1 * | 2/2016 | Aron | G06F 9/45533 |
| 9,304,804 | B2 | 4/2016 | Ivanov et al. | |
| 9,436,494 | B2 * | 9/2016 | Zheng | G06F 9/45558 |

(Continued)

OTHER PUBLICATIONS

Zhang et al, TransCom: A virtual Disk-Based Cloud Computing Platform for Heterogenous Services, 2013, IEEE, Transaaction on Network and Service Management, pp. 1-14.*

(Continued)

*Primary Examiner* — Abu Ghaffari

(57) ABSTRACT

Methods, apparatus and articles of manufacture are disclosed to apply a modularized virtualization topology using virtual hard disks. An example modularized virtualized computing environment includes a processor, a hypervisor, a virtual machine deployed by the hypervisor, and a plurality of virtual hard drives, each virtual hard drive encapsulating one respective logical functionality or one logical data set, the virtual hard drives cooperating to implement an overall functionality or service.

21 Claims, 28 Drawing Sheets

(56) References Cited

U.S. PATENT DOCUMENTS

| | | | |
|---|---|---|---|
| 9,451,023 B2* | 9/2016 | Sancheti | G06F 3/065 |
| 2002/0069369 A1* | 6/2002 | Tremain | H04L 63/0209 |
| | | | 726/14 |
| 2005/0010924 A1* | 1/2005 | Hipp | G06F 9/4843 |
| | | | 718/104 |
| 2006/0112219 A1* | 5/2006 | Chawla | G06F 3/0607 |
| | | | 711/114 |
| 2006/0136913 A1 | 6/2006 | Sameske | |
| 2007/0050764 A1 | 3/2007 | Traut | |
| 2007/0074208 A1 | 3/2007 | Ling et al. | |
| 2008/0072224 A1 | 3/2008 | Check et al. | |
| 2008/0114961 A1* | 5/2008 | Ramaswamy | G06F 3/061 |
| | | | 711/170 |
| 2010/0082714 A1 | 4/2010 | Herron et al. | |
| 2011/0131386 A1 | 6/2011 | Okutsu | |
| 2011/0184993 A1 | 7/2011 | Chawla et al. | |
| 2011/0185355 A1 | 7/2011 | Chawla et al. | |
| 2012/0084768 A1* | 4/2012 | Ashok | G06F 9/45558 |
| | | | 718/1 |
| 2012/0102487 A1* | 4/2012 | Cahill | H04L 67/1097 |
| | | | 718/1 |
| 2012/0151095 A1* | 6/2012 | Cyr | G06F 3/0622 |
| | | | 710/5 |
| 2012/0216187 A1 | 8/2012 | Ben-Yhuda et al. | |
| 2012/0304168 A1 | 11/2012 | Raj Seeniraj et al. | |
| 2013/0007741 A1* | 1/2013 | Britsch | G06F 9/4401 |
| | | | 718/1 |
| 2013/0160003 A1 | 6/2013 | Mann et al. | |
| 2013/0185715 A1 | 7/2013 | Dunning et al. | |
| 2014/0007098 A1* | 1/2014 | Stillwell, Jr. | G06F 9/30003 |
| | | | 718/1 |
| 2014/0195753 A1* | 7/2014 | Khatri | G06F 9/45533 |
| | | | 711/162 |
| 2014/0229943 A1 | 8/2014 | Tian et al. | |
| 2014/0282518 A1* | 9/2014 | Banerjee | G06F 9/45533 |
| | | | 718/1 |
| 2014/0282539 A1 | 9/2014 | Sonnek | |
| 2015/0032980 A1 | 1/2015 | Winokur | |
| 2015/0046926 A1* | 2/2015 | Kenchammana-Hosekote | G06F 9/45533 |
| | | | 718/1 |
| 2015/0058555 A1* | 2/2015 | Karamanolis | G06F 3/0689 |
| | | | 711/114 |
| 2015/0106810 A1* | 4/2015 | Ciano | G06F 9/45533 |
| | | | 718/1 |
| 2015/0154046 A1 | 6/2015 | Farkas et al. | |
| 2015/0381723 A1* | 12/2015 | Sancheti | G06F 3/065 |
| | | | 709/217 |
| 2016/0004611 A1 | 1/2016 | Lakshman et al. | |
| 2016/0147555 A1 | 5/2016 | Hepkin | |
| 2016/0147556 A1 | 5/2016 | Hu et al. | |

OTHER PUBLICATIONS

Lyle et al, A Software Architecture for Adaptive Modular Sensing Systems, 2010, Sensors 2010, pp. 7514-7560.*

Whitkar et al, Constructing Services with Interposable Virtual Hardware, 2004, USENIX, NSDI'04, pp. 1-24.*

Meyer et al, Parallax: Virtual Disks for Virtual Machines, 2008, ACM, Eurosys '08, pp. 41-54.*

U.S., "Non-Final Office Action," issued in connection with U.S. Appl. No. 14/749,493 dated Nov. 18, 2016, 28 pages.

U.S., "Non-Final Office Action," issued in connection with U.S. Appl. No. 14/749,488, dated Jan. 10, 2017, 24 pages.

U.S., "Non-Final Office Action," issued in connection with U.S. Appl. No. 14/749,475, dated May 4, 2017, 40 pages.

U.S., "Final Office Action," issued in connection with U.S. Appl. No. 14/749,488, dated Apr. 18, 2017, 17 pages.

United States Patent and Trademark Office, "Final Office Action," issued in connection with U.S. Appl. No. 14/749,475, on Aug. 28, 2017, 42 pages. (Copy not provided as this is a USPTO document. Applicant will provide document upon request from Examiner).

* cited by examiner

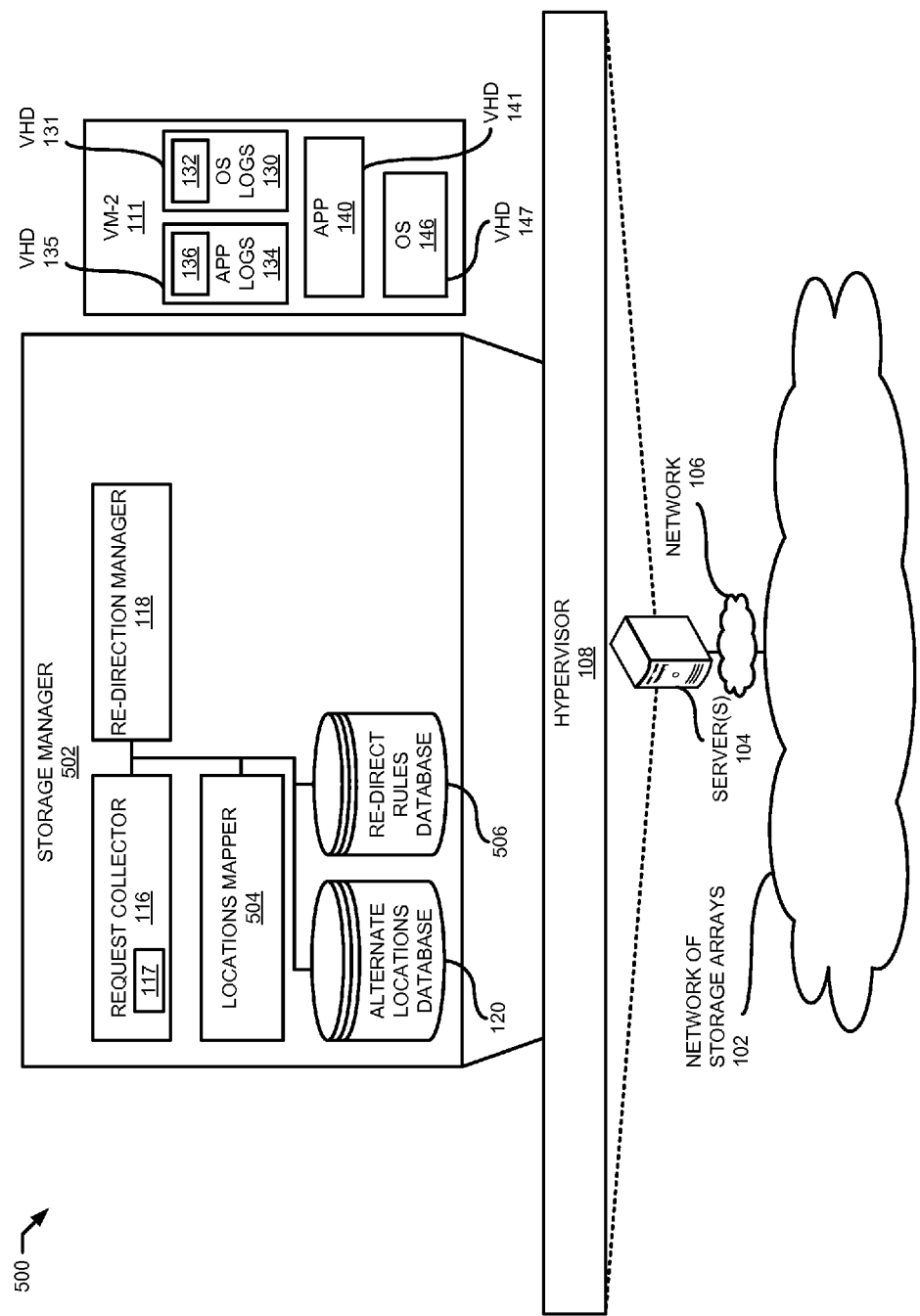

600 →

| 605 | 610 | 620 |
| --- | --- | --- |
| REQUEST ORIGINATOR | PARAMETER | RE-DIRECT? |
| *.* | LOGS FOLDER | YES |
| SOLITAIRE | HIGHSCORES.TXT FILE | YES |
| *.* | *.USERACCOUNTS FILE | NO |
| ... | ... | ... |

640 → (row 1)
650 → (row 2)
660 → (row 3)

RE-DIRECT RULES

FIG. 6

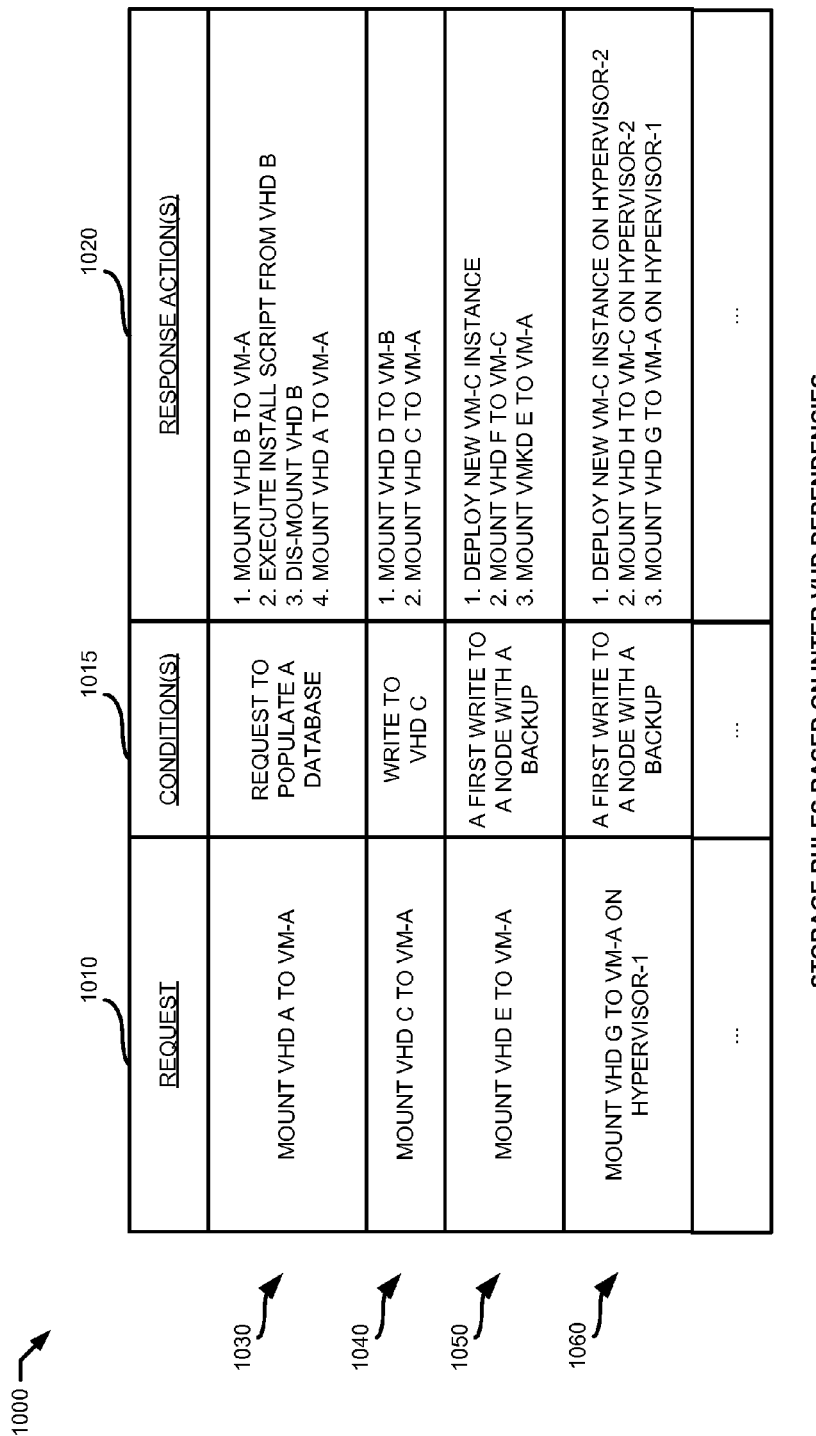

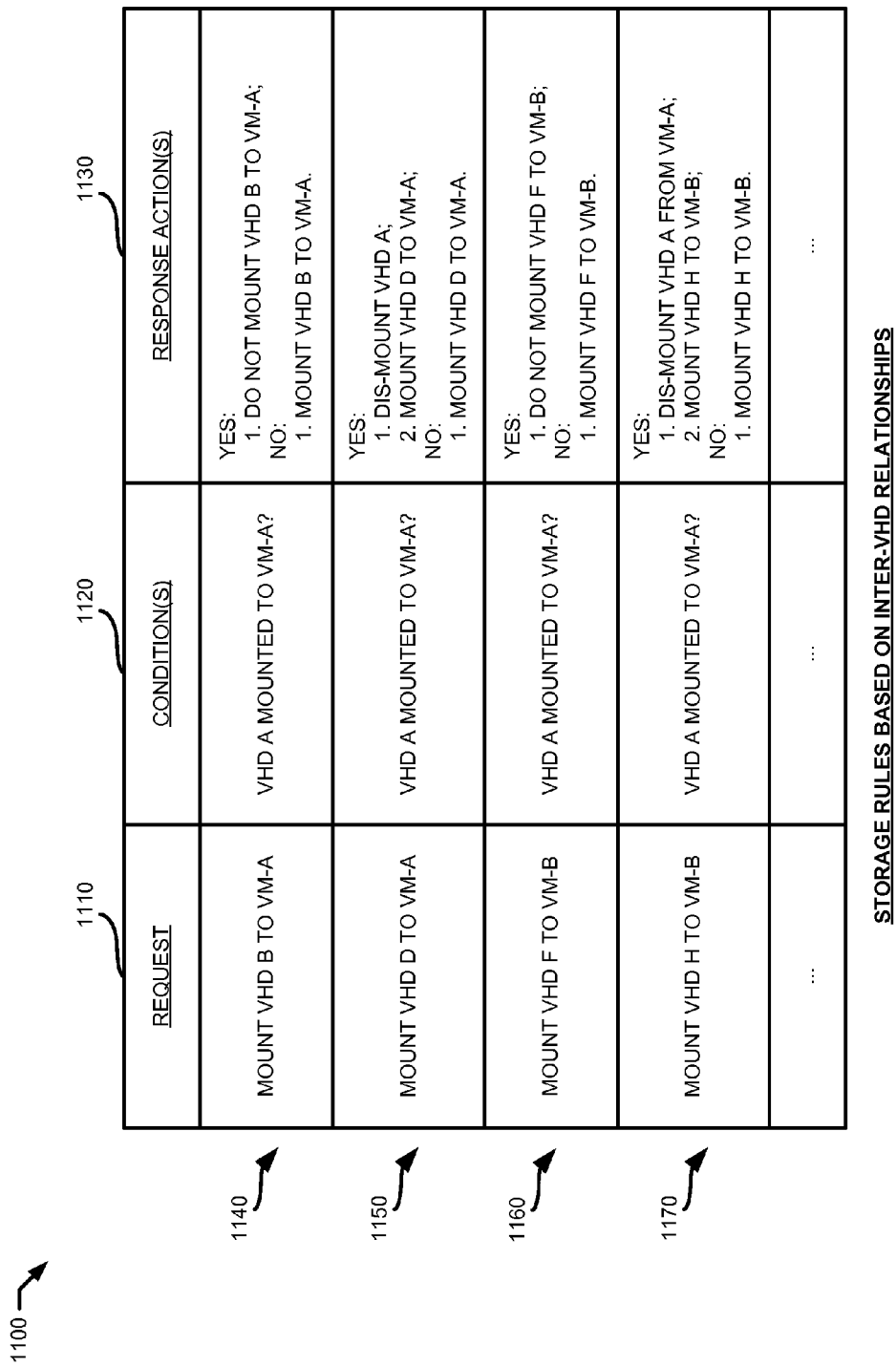

| TIME | VIRTUAL MACHINE #1 | VIRTUAL MACHINE #2 | ACTION | RULE |
|---|---|---|---|---|
| 1 | VHD A; VHD B | VHD C | ACCESS REQUEST TO MOUNT VHD D TO VM #1 DETECTED | VHD B CANNOT BE MOUNTED WITH VHD D |
| 2 | VHD A | VHD C | VHD B DIS-MOUNTED FROM VM #1 | |
| 3 | VHD A; VHD D | VHD C | VHD D MOUNTED TO VM #1 | MOUNT VHD E WITH VHD D TO VM #1; MOUNT VHD F TO VM #2 |
| 4 | VHD A; VHD D; VHD E | VHD C; VHD F | VHD E MOUNTED TO VM #1; VHD F MOUNTED TO VM #2 | |

CONFIGURATIONS OF TWO VIRTUAL MACHINES AT DIFFERENT POINTS IN TIME

FIG. 21

METHODS AND APPARATUS TO APPLY A MODULARIZED VIRTUALIZATION TOPOLOGY USING VIRTUAL HARD DISKS

FIELD OF THE DISCLOSURE

This disclosure relates generally to virtualized computing environments, and more particularly, to methods and apparatus to apply a modularized virtualization topology using virtual hard disks.

BACKGROUND

Virtualization has become a widely used technique. In some virtualized computing environments, virtual machines are provisioned and operate using pooled physical resources. This approach is advantageous as it enables efficient sharing of physical resources (e.g., processors, storage, etc.) among virtual machines. In other virtualized computing environments, containers are used to provide separate processing environments. Wherein a virtual machine instantiates its own operating system and cooperates with a hypervisor, a container does not have its own operating system but executes directly on a host operating system which may be shared with other containers.

BRIEF DESCRIPTION OF THE DRAWINGS

FIG. 5A is a diagram of an example virtual computing environment constructed in accordance with the teachings of this disclosure to generate alternate path location mappings in a modularized virtualization topology using virtual hard disks.

FIG. 6 illustrates an example data table that may be employed by the example storage manager of FIG. 5A or FIG. 5B to store re-direct rules.

FIG. 10 illustrates an example data table that may be employed by the example storage manager of FIG. 9A or FIG. 9B to store inter-virtual hard disk dependencies rules.

FIG. 11 illustrates an example data table that may be employed by the example storage manager of FIG. 9A or FIG. 9B to store inter-virtual hard disk relations rules.

FIG. 21 is an example data table illustrating the configuration (e.g., stage) of two virtual machines in a virtual computing environment at different points in time.

DETAILED DESCRIPTION

Figure 1A:
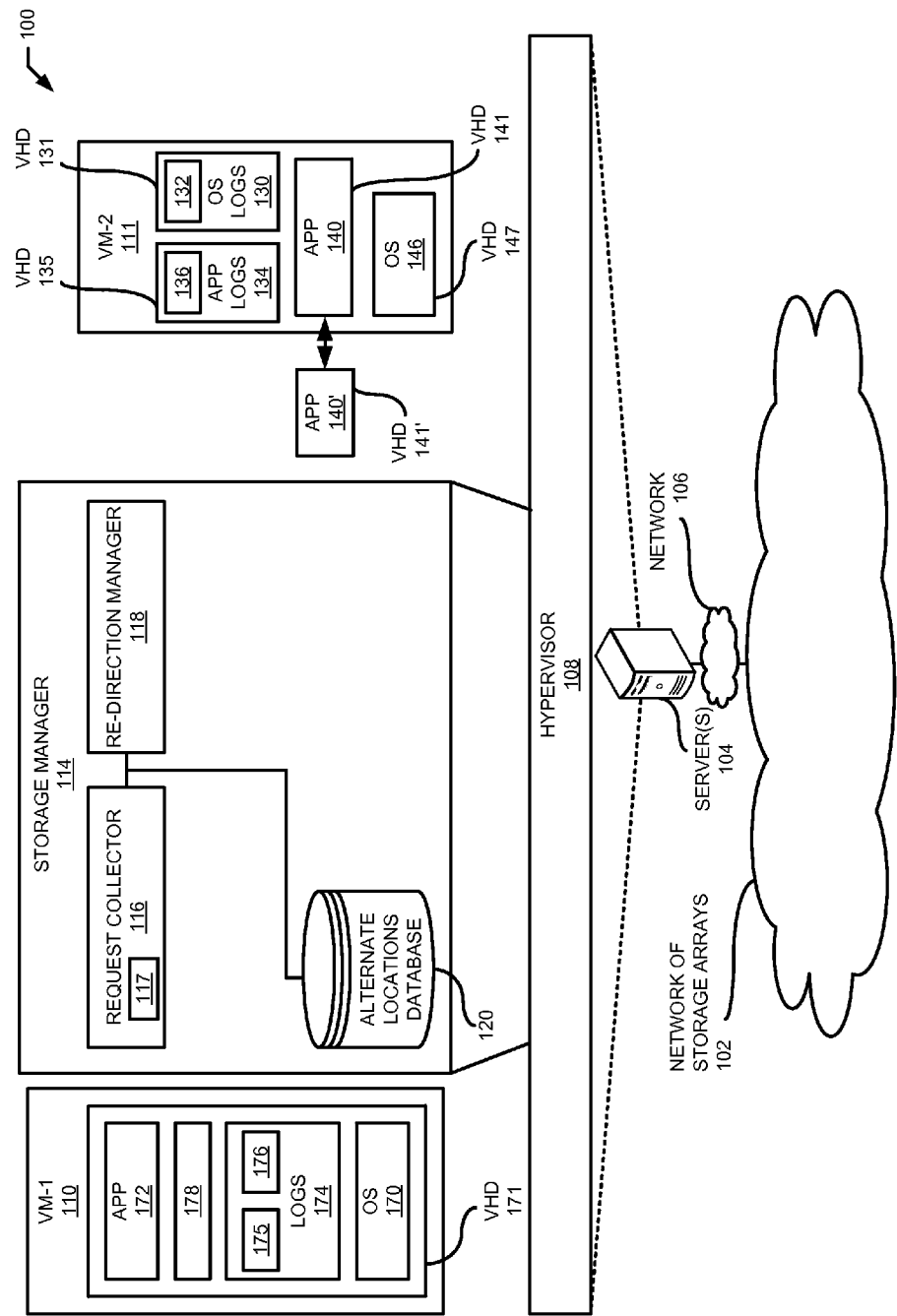
FIG. 1A is a diagram of an example virtual computing environment constructed in accordance with the teachings of this disclosure to re-direct detected access requests in a modularized virtualization topology using virtual hard disks.

In a non-virtual environment, a hard drive is a physical storage mechanism, which hosts all files that are designated to be consumed by multiple computers, applications and processes. A combination of several files residing on such a hard drive present a logical entity. For example, for a group of image files located at a pathname (e.g., c:\screensaver), the folder "screensaver" on the hard drive "c" is a receptacle of screensaver files. In a similar manner, a folder "mySQL" on the hard drive "c" is a receptacle of database servers and is located at a pathname (e.g., c:\mySQL). In the reality of physical computing, one physical hard drive is required to host many such receptacles. Furthermore, many of these receptacles represent multiple functionalities or data sets (e.g., an operating system (OS), a web server and a database), as physically partitioning the different functionalities or data sets into separate hard drives is not practical. Therefore, in a physical computing environment, the following equation will hold true:

one physical hard drive>one receptacle

Furthermore, each receptacle on a physical hard drive may be broken down into sub-receptacles, if appropriate, according to circumstances. For example, a database receptacle may be broken down into sub-receptacles such as a database engine and database data. Thus, in the reality of physical computing, a physical hard drive will contain many receptacles and/or sub-receptacles. These receptacles may be logically unrelated to each other, such as in the case of a screensaver and a database, or may have some logical relation, such as in the case of a database engine and a database data file. In either instance, locating the logically related or logically unrelated receptacles on the same physical drive is a consequence of a physical necessity (e.g., limited resources such as space and/or money) rather than being the best option for a scenario.

In a virtual environment, the concept of a virtual storage drive (referred to herein as a virtual hard disk or a virtual hard drive) may be entirely different. A virtual storage disk in a virtual environment is not a physical device. It is a virtual entity encapsulated in a file. This disclosure takes advantage of this truth by creating a situation where each virtual hard disk=one receptacle containing one logical functionality, in contrast to the physical computing reality and/or many logical functionalities of one physical hard drive containing many receptacles and/or sub-receptacles. As a result, in this disclosure, a virtual hard disk (VHD) stores set of folders and/or files (e.g., executables, libraries, instructions and/or data) representing a single logical functionality or data set in a software solution. As a result, as used herein, a virtual hard disk is not a location where numerous unrelated receptacles reside. Instead, a virtual hard disk (VHD) is a single receptacle for a single logical functionality or logically-related data set. As a result of this topology, logical rules between receptacles can be embedded into virtual hard disks and expressed, enforced and/or audited in terms of virtual hard disks (e.g., mounting a virtual hard disk, dis-mounting a virtual hard disk, etc.). This topology provides many advantages and has many implications.

For example, because in this disclosure, one virtual hard disk is identical to one receptacle associated with one functionality or one data set (i.e., a virtual hard disk screensaver contains only screensaver functionality), virtual hard disks may be mounted or dis-mounted based on overall functionality one wishes to achieve and/or based on logical functionality one wishes to make sure does not occur. The overall logical functionality sought to be achieved can be all located in one receptacle. For example, to implement a database service, a database engine and a database data file can be both located in the same receptacle. Alternatively, the overall logical functionality sought to be achieved can be located in multiple VHDs, where each VHD represents one logical functionality (or portion) of the overall logical functionality. For example, the database engine of the database service may be located in a first VHD and the database data file of the database service may be located in a second VHD. In some such instances, the overall logical functionality of the database service is achieved when the first VHD and the second VHD are both mounted and their respective functionalities operate together.

As used herein, a VHD can include one or more executable(s), library (or libraries) and/or data file(s). As used herein, a logical functionality is at least one functionality such as one or more files and/or folders necessary for the execution of an Internet browser, a database engine, etc., a receptacle contains a logical functionality, and a sub-receptacle is a receptacle owned by another receptacle.

In view of the above topology in which a software system is structured as multiple individual virtual disk drives, each of such virtual disk drives representing a separate logical functionality or separate data set, the software system may be analogized to an electronic device made from several components where each VHD corresponds to such a component. In such an electronic device, fixing or upgrading the device may involve disconnecting one module and placing in another (replacement) module (as opposed to fixing or upgrading an existing module by modifying or switching small parts within one module). System software exhibiting the modularized virtualization disclosed herein may be similarly upgraded or repaired by dis-mounting one virtual hard disk and replacing it with (mounting) another virtual hard disk. This approach is beneficial for easily changing (e.g., repairing, modifying and/or upgrading) the overall functionality and/or for maintaining separation between logical functionalities and/or data sets as needed. The disclosed modularized virtualization topology is also beneficial in that the change can be easily reversed. Switching one virtual hard disk with another as permitted by the modularized virtualization contemplated in this disclosure is far easier than the traditional approach of investigating and replacing specific files that may be scattered across multiple locations (e.g., dispersed in folders and/or files) in a single hard disk or multiple hard disks, where each such location may serve or include files representing multiple receptacles each containing one or more logical functionalities and/or data sets.

A virtual hard disk (sometimes referred to herein as a "virtual disk," a "virtual hard drive," a "virtual drive" or a "virtual disk drive") is a file (e.g., a VMDK in terms of VMware virtualization). This file represents a virtual hard disk to the hypervisor of a virtual system (or a container in container-based virtualization system, such as commercialized by Docker Inc.). As used herein, a receptacle is at least one folder and/or file, which is stored on a disk, to perform a logical functionality or store a data set. For example, a folder with all Word software files and/or Word software-related folders on it can be referred to as a Word receptacle (e.g., a word processing receptacle). In this disclosure, a receptacle contains only files and/or data with a logical connection between them. It is not a collection of unrelated files and/or unrelated data. For example, a receptacle does not contain logical functionalities and/or data sets associated with different applications and/or products. Rather, a receptacle in this disclosure includes one or more folders, files and/or data that fulfill one logical functionality or data set. A virtual hard disk (VHD) is a receptacle that encapsulates only one logical functionality or one logically-related data set, such as a database engine, a word processor, a web server, database files, etc.

In order to create a modularized virtualization topology as described above, it is important to ensure that (1) a functionality or data set encapsulated in a virtual hard disk resides in full on one virtual hard disk and does not leak onto any other virtual hard disk; and (2) a virtual hard disk encapsulating functionality has no unrelated files, which can render unrelated functionalities, parts of unrelated functionalities and/or other logical functionalities unusable as a consequence. Known deployment topologies of existing software products do not satisfy the above principles. For example, it is common for a software product to install some of its files on OS directories, which reside on the OS virtual hard disk. Similarly, it is common for a software product to install on the same virtual disk drive both data files and program files, or program files of two different applications, such as an archive application and a database application server.

Another implication of the modularized virtualization topology disclosed herein is that technical rules and/or business rules may be expressed in terms of mounting and dis-mounting virtual hard disks. As explained above, a modularized virtualization system is built by assembling (e.g., mounting) multiple virtual disk drives each of which represents a specific logical functionality or specific data set. In such a system, changing the overall system functionality or topology is a matter of replacing or adding one or more virtual disk drives. This is analogous to existing physical devices, such as a smart phone, where fixing or upgrading a device is a matter of replacing one physical module in that device with another physical replacement module.

Continuing with that analogy, an aspect of any product (physical or software) is its life cycle. Every product has a number of life cycle stages. These life cycle stages often exhibit unique characteristics. Different operations belong to different life cycle stages of a product. For example, when a car is manufactured, it is given a chassis number. The assignment of a chassis number happens only once in a particular life cycle (e.g., manufacturing) and does not happen again in the life of the product. As another example, a network card is given a unique physical address at a specific life cycle stage and is not given such an address at any later stage.

It may be mandatory for a particular operation to occur in a given life cycle stage for a product to properly function. On the other hand, performing the same operation in a different life cycle stage may be irrelevant or even destructive.

In a reality as contemplated by this disclosure where logical functionalities are respectively encapsulated into virtual disk drives, life cycle policies can be expressed and fulfilled via rules for mounting and/or dis-mounting virtual hard disks. For example, a system may be made from an OS (possibly encapsulated in a first virtual hard disk), an application encapsulated in a second virtual hard disk and a logical functionality which is valid for a specific life cycle stage of a product and which is encapsulated in a third virtual hard disk. In the example, the OS may be a first logical functionality encapsulated in the first virtual hard disk and the application may be a second location functionality encapsulated in the second virtual hard disk. According to this disclosure, a given virtual hard disk exhibiting one or more life cycle restriction(s), (expressed, for instance, in metadata associated with the virtual hard disk), can be automatically mounted, automatically un-mounted, automatically refused mounting and/or automatically refused un-mounting based on the current life cycle stage of the system and the life cycle restriction(s) of the given virtual hard disk.

Further, even a given virtual hard disk that does not itself exhibit a life cycle stage restriction (such as an application virtual hard disk), can be automatically mounted, automatically un-mounted, automatically refused mounting and/or automatically refused un-mounting based on prior execution of an operation required by another virtual hard disk exhibiting such a life cycle timing restriction. For instance, consider a product requiring activation. Assume the activation process resides on a virtual hard disk with a life cycle category restriction indicating it is to be executed at the activation life cycle stage. It may be desired that the virtual hard disk encapsulating the application will be refused mounting, before the life cycle virtual hard disk functionality is finished.

As another example, consider a need to fix a newly discovered security issue. A system can refuse mounting an application virtual hard disk before a hot fix just released and provided on a dedicated virtual hard disk is executed. Because the life cycle restriction may not be reflected in all VHDs, such restrictions are managed in examples disclosed herein by a life cycle manager. In virtual machine-based implementations, the life cycle manager is implemented within or in conjunction with a hypervisor. In container-based systems, the life cycle manager may be implemented within or on the host operating system.

As mentioned above, re-executing a process more than once can, in some examples, be disruptive. For example, re-executing a database table alteration process after it has already been executed once can be damaging and result in data loss (e.g., by overwriting valid data). Applying a life cycle restriction to the virtual hard disk encapsulating the database table alteration process is beneficial to ensure the virtual hard disk will be refused mounting after its functionality has been executed on the corresponding system. Such a refusal ensures the database alteration process will be executed only once and at the appropriate time.

In another aspect, this disclosure presents a method for migrating existing topologies into the modularized virtualization topology disclosed herein, wherein each logical functionality or logically-related data set is encapsulated into a respective single virtual hard disk (i.e., multiple VHDs are constructed with each such VHD encapsulating one particular logical functionality or one particular data set in accordance with the two requirements disclosed above). This modularized virtualization topology is distinct from existing virtual topologies where multiple files for multiple different logical functionalities can be located in a same virtual hard disk. In this immigration context, this disclosure discloses both (a) installation/migration and (b) normal execution after installation. In both contexts, manual re-deployment or coding is avoided by hooking or trapping input/output (I/O) requests and re-directing the I/O requests to designated virtual hard disks without the program's knowledge. This is done by creating virtual hard disks structured in accordance with the principles of this disclosure and establishing re-direction rules that direct I/O requests to a corresponding one of the virtual hard disks. This re-direction enables the substitution of virtual hard disks that follow the principles of (1) encapsulating a logical functionality or logically-related data set in full on one virtual hard disk without leaking any portion of that logical functionality or that data set onto any other virtual hard disk(s); and (2) ensuring the virtual hard disk encapsulating the logical functionality or logically-related data set does not include unrelated files or data, which can render any functionality the virtual hard disk does not provide unusable (e.g., should the VHD be dis-mounted or upgraded). As explained below, this is accomplished without requiring knowledge of the program that is being changed to the modularized virtualization topology disclosed herein. For example, re-direct rules provided by the developer may enable generating path location mappings appropriate for the specific virtual computing environment. For example, a re-direct rule may assert that access requests associated with a "logs" folder are re-directed (e.g., to an alternate path location) without the application knowing the exact alternate path location where the access requests will be re-directed. In such instances, because of the re-direct rule, a developer alteration, either in terms of configuration, service pack or new application version, is not required.

A virtual machine template defines a virtual machine (VM) having specified virtual computing resources. For example, a virtual machine template may include metadata that describe the configuration of a virtual machine including computing (e.g., processing) resources, networking resources, storage resources, etc. When a template for a virtual machine or multiple virtual machines is deployed in a virtual computing environment, the resources are provisioned. As part of the provisioning, applications and OS files are made available for use to create one or more virtual machine(s) having the specified settings. The files may be installed at different locations (e.g., directories, hard drives, etc.) in the virtual computing environment, including locations hosting the operating system of the virtual machine. Applications may include numerous components including services, workspaces, configuration files, property files, database, etc. Modifying an application (e.g., upgrading and/or removing components of the application) may involve modifying and/or removing files corresponding to the application. In systems not employing the modularized virtualization disclosed herein, such files that were modified or removed might also be used to run other applications. As such, removing or modifying such files substantially increased the likelihood that the operating system or virtual machine would become unstable.

As discussed above, examples disclosed herein employ a modularized virtualization topology by encapsulating logical functionalities and/or logically-related data sets of the software system in respective, logically separate, virtual hard disks (VHDs). A VHD is a file that is accessible to a hypervisor or host operating system in a virtual computing environment. Disclosed examples include a storage manager to structure the computing environment in the modularized virtualization topology by dedicating VHDs on a one-to-one basis to specific logical functionalities (e.g., applications, services, workspaces, configuration file(s), property file(s), folder(s), function(s), data sets, etc.). For example, the storage manager may dedicate a first VHD to store instructions for an operating system, a second VHD to store word processing documents, a third VHD to store images, etc. In such circumstances, each of the functionalities and/or data sets may be referred to as encapsulated (e.g., in the above example, the operating system is encapsulated in the first VHD, the word processing documents are encapsulated in the second VHD, etc.). Encapsulation in this sense means all parts of one logical entity (e.g., a logical functionality or data set) contained in one VHD.

In some examples, the example storage manager automatically migrates existing software to the modularized virtualization topology disclosed herein. In some such examples, to preserve the overall operation of the software after the migration, an original path location included in one or more calls (e.g., function calls such as read/write commands) of the original (pre-migration) software is mapped to an alternate path location corresponding to a VHD encapsulating the called functionality and/or logically-related data set. As a result, when an application such as a computer game (e.g., "Solitaire") requests access to a folder (e.g., a folder "logs"), the storage manager may re-direct the request to an alternate folder encapsulated in a specific VHD (e.g., a folder "Solitaire\logs"). In some such examples, the example storage manager maintains an alternate locations database to store path location mappings that map original path locations (e.g., the folder "logs") to alternate path locations corresponding to specific VHDs (e.g., the folder "Solitaire\logs").

In some examples, an alternate path location may not exist at the time access to the location is requested (e.g., during a migration to the new topology, prior to creation of the mapping such as during a new installation, etc.). In some such examples, the example storage manager disclosed herein may create the alternate path location in real-time (e.g., "on-the-fly"). For example, during migration of the computer game "Solitaire" to the topology disclosed herein, the example storage manager may determine that the alternate path location (e.g., the folder "Solitaire\logs") does not exist and, as a result, may provision a first virtual machine in the virtual computing environment by mounting one or more VHDs containing the functionality needed to create alternate path location(s). One or more additional VHDs may be created by the VM to implement the functionality (or functionalities) originally implemented at the original path location by the original (pre-migration) software corresponding to the path location "Solitaire\logs." These additional VHDs may be linked to one another and/or to existing VHDs to create the original overall functionality. The example storage manager disclosed herein may then update the alternate locations database to record the new path location(s), thereby mapping the original path location to the newly created VHD(s). In some cases, new path locations linking the newly created VHDs are also stored.

In some disclosed examples, when the example storage manager creates a virtual hard disk (VHD), the storage manager associates rules and/or properties with the VHD. In some such examples, the rules and/or properties may control how the VHD interrelates with one or more other VHDs in the virtual computing environment. For example, rules and/or properties associated with a first VHD may define which other VHD(s) are allowed and/or not allowed to be mounted in the virtual computing environment at specific times (e.g., at the same time as the first VHD, during a specific life cycle stage, etc.). Example rules and/or properties associated with the first VHD may additionally or alternatively define actions to perform when a request to mount a second VHD is received while the first VHD is mounted (e.g., mount the second VHD, refuse the request to mount the second VHD, dis-mount the first VHD and then mount the second VHD, etc.).

In some examples disclosed herein, the rules and/or properties control in which life cycle stage(s) the VHD is accessible. For example, a VHD encapsulating script to delete the contents of a database may only be executed when the database is in a de-provision life cycle stage.

In some examples disclosed herein, the storage manager stores the rules and/or properties in the VHD (e.g., as metadata). Additionally or alternatively, some example implementations of the storage manager store the rules and/or properties for the VHD(s) in a repository (e.g., in a relationships and/or dependencies database).

FIG. 1A illustrates an example virtual computing environment 100 employing virtual machines and a hypervisor. The example virtual computing environment 100 of FIG. 1A includes an example network of storage arrays 102 in communication with one or more example computing server(s) 104. The example network of storage arrays 102 may be implemented using any suitable wired and/or wireless storage including, for example, one or more Fiber Channel Storage Area Network (SAN) arrays, one or more Internet Small Computer System Interface (iSCSI) SAN arrays, one or more Network Attached Storage (NAS) arrays, etc. In the illustrated example, the network of storage arrays 102 are connected to and shared between groups of servers through an example network 106, thereby enabling aggregating storage resources and enabling increased flexibility in provisioning the storage resources to example virtual machines 110, 111.

In the illustrated example of FIG. 1A, the example computing server(s) 104 may be implemented by any number of x86 or ARM (Acorn RISC Machine architecture) servers (e.g., one or more). The server(s) 104 of the illustrated example are in communication with the example network of storage arrays 102 via the example network 106. While in the illustrated example the computing server(s) 104 are illustrated as a single server, the computing server(s) 104 may be implemented by any number (e.g., 1, 2, 3, etc.) and/or type(s) of servers. The network 106 of the illustrated example may be implemented using any suitable wired and/or wireless network(s) such as, for example, one or more data buses, one or more Local Area Networks (LANs), one or more wireless LANs, one or more cellular networks, the Internet, etc. As used herein, the phrase "in communication," and/or variations thereof, encompass direct communication and/or indirect communication through one or more intermediary components and do not require direct physical (e.g., wired) communication and/or constant communication, but rather additionally include selective communication at periodic or aperiodic intervals, as well as one-time events.

In the illustrated example of FIG. 1A, one or more of the example computing server(s) 104 executes an example hypervisor 108. A hypervisor (sometimes referred to as a "virtualization layer," a "virtualization platform" or a "virtual machine monitor") abstracts processor, memory, storage and/or other resources of the computing environment into one or more virtual machines. The example virtual machines 110, 111 include an operating system and/or execute one or more applications. In some examples, the hypervisor 108 may be installed on a computing server without an intervening operating system (e.g., a bare-metal hypervisor). In some examples, the hypervisor 108 may be installed on a storage device rather than on a computing server.

The example hypervisor 108 of FIG. 1A virtualizes and aggregates the underlying physical hardware resources (e.g., the example network of storage arrays 102 and/or the example computing server(s) 104) across the physical computing environment and provides pools of virtual resources available for use in the virtual computing environment 100. Thus, by using the resources available from the physical components of the virtual computing environment 100, one or more of the example virtual machines 110, 111 may request resources dynamically as a workload increases or release resources dynamically as the workload decreases.

Figure 1B:
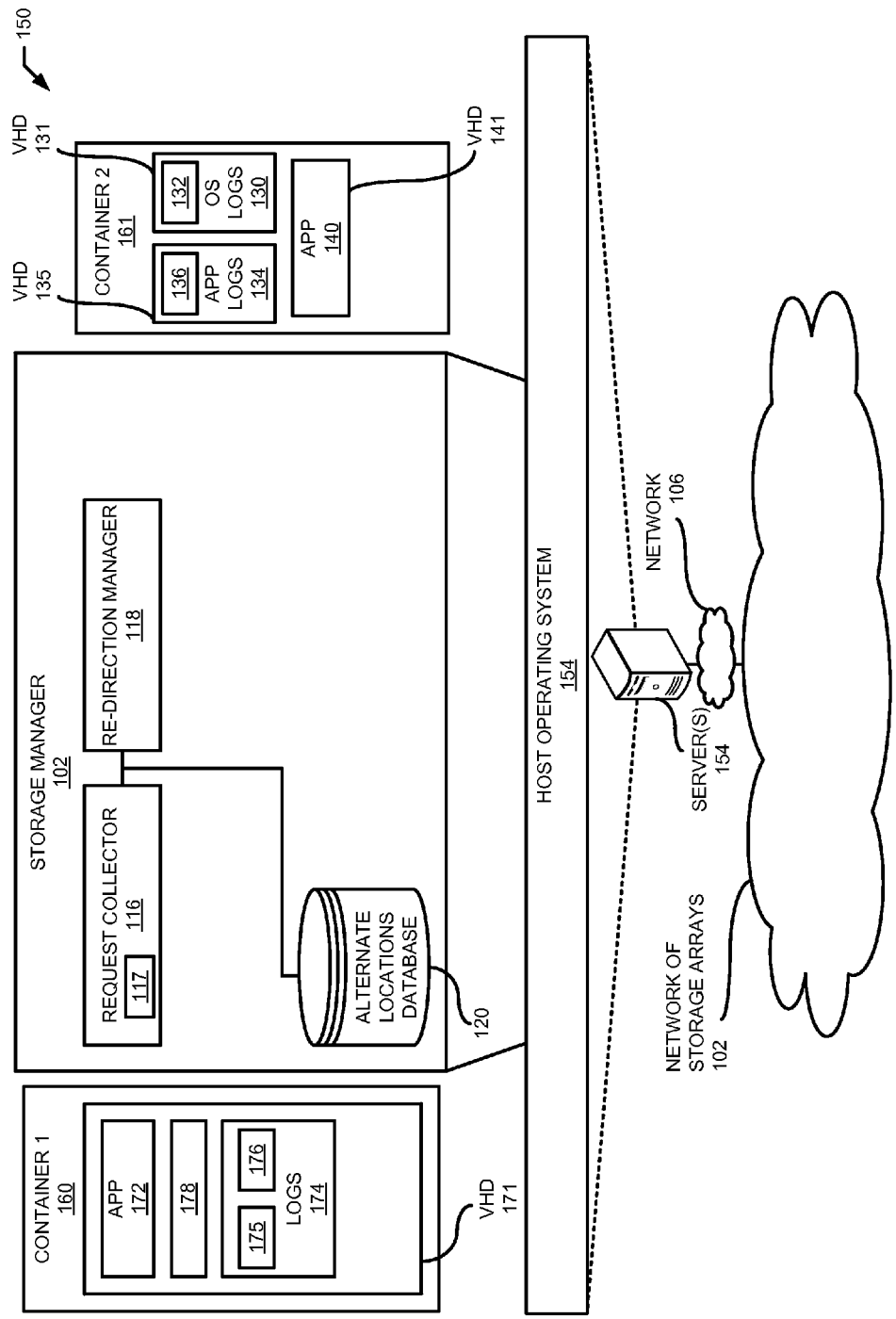
FIG. 1B is a diagram of an alternate example virtual computing environment constructed in accordance with the teachings of this disclosure to re-direct detected access requests in a modularized virtualization topology using virtual hard disks.

In some examples disclosed herein, a lighter-weight virtualization is employed by eliminating the hypervisor 108 and using containers in place of the virtual machines 110, 111. FIG. 1B is an example illustrating such a light-weight virtual computing environment 150. In the illustrated example of FIG. 1B, an example computing server 152 provides a host operating system 154. Example containers 160, 161 of the example of FIG. 1B are software constructs that run on top of the host operating system 154 without the need for a hypervisor or a separate guest operating system. Unlike virtual machines, the containers do not instantiate their own operating systems. Like virtual machines, the containers 160, 161 are logically separate from one another. Numerous containers can run on a single computer or processor system. Also like virtual machines, the containers 160, 161 can execute instances of applications or programs separate from application/program instances executed by the other containers on the same computer or processing system.

In some examples, the host operating system 154 uses name spaces to isolate the containers 160, 161 from each other. Such an approach provides operating system level segregation of the different groups of applications that operate within the different containers 160, 161. This segregation is akin to the virtual machine segregation that is offered in hypervisor-based virtualized environments, and thus can be viewed as a form of virtualization that isolates different groups of applications that operate in different containers. Other than the use of virtual machines and a hypervisor instead of containers running on a host OS, the example of FIGS. 1A and 1B are similar. Thus, the following discussion of like numbered components in FIG. 1A apply equally well to the like numbered parts of FIG. 1B and, to avoid redundancy, FIG. 1B will not be separately described.

Returning to the illustrated example of FIG. 1A, the hypervisor 108 has provisioned a first virtual machine (VM-1) 110 and a second virtual machine (VM-2) 111. In the example of FIG. 1A, the first VM 110 is structured in a traditional manner and, thus, does not employ the modularized virtualization topology disclosed herein. The first VM 110 is presented in FIG. 1A to illustrate differences between a traditional architecture and a modularized virtualization topology as disclosed herein. The second VM 111 illustrates modularized virtualized topology principles disclosed herein.

The example hypervisor 108 provisions the virtual machines 110, 111 and configures the respective virtual machines 110, 111 for operation in the virtual computing environment 100. For example, the hypervisor 108 may install and configure an example operating system 146, 170 and/or application(s) 140, 172 onto the virtual machines 110, 111.

As noted above, in the illustrated example of FIG. 1A, the example first virtual machine 110 implements a past system that does not utilize the modularized virtualization topology disclosed herein. For example, a virtual hard disk (VHD) 171 includes the operating system 170, an application 172 and a "logs" folder 174 (e.g., three different functionalities or data sets). In this way, the example first virtual machine 110 resembles a physical computing environment in which one hard drive contains many receptacles and/or sub-receptacles (e.g., the OS 170, the application 172 and the "logs" folder 174).

The traditional topology illustrated by the first virtual machine 110 has several drawbacks. For instance, data and/or instructions may be co-mingled throughout the components loaded on the first virtual machine 110, which may lead to instability and/or faults. For example, during execution, the operating system 170 of the first virtual machine 110 and the application 172 may access a same "library" file 178. In some circumstances, upgrading the operating system 170 may require replacing the "library" file 178. In some such examples, replacing the "library" file 178 may render the application 172 unusable.

In some examples, during executing, the operating system 170 may record user actions in a "UserActions" file 175 (e.g., a text document, a database, etc.) in the "logs" folder 174. In a similar manner, the application 172 of the first virtual machine 110 may record high scores in a "High-Scores" file 176 (e.g., a text document, a database, etc.) in the same "logs" folder 174. Thus, in the example VM-1 110, resources of the operating system 170 are co-mingled with resources of the application 172 as both the operating system 170 and the application 172 are accessing the same example "logs" folder 174. In some such examples, because of the co-mingling of resources, managing the security of the example "logs" folder 174 becomes comparatively more difficult for each application that has access to the "logs" folder 174.

Moreover, in some examples, modifying the configuration of the first virtual machine 110 may include dedicating processes to track the related virtual resources in the storage accessible to the first virtual machine 110 (e.g., within folders and sub-folders). For example, the first virtual machine 110 may include a process to track overlapping resources in the first virtual machine 110 such as the example "logs" folder 174, which may be written into by, for example, the operating system 170 and the application 172. Additionally or alternatively, modifying the configuration of the first virtual machine 110 may result in leaving resources not necessary for the modified configuration on the first virtual machine 110 (e.g., the resources may overlap with another application and, thus, may be left even though, in reality, they are not used). For example, when updating the operating system 170, the developers of the operating system 170 may configure the update to replace the "logs" folder 174 with a "new logs" folder and include script in the update to remove the "logs" folder 174 from the first virtual machine 110. However, as the example "logs" folder 174 on the first virtual machine 110 is also used by the application 172 (e.g., the application 172 logs user high scores in a file in the "logs" folder 174), the developers may choose to leave the "logs" folder 174 on the first virtual machine 110, resulting in storage space being used by unnecessary resources and/or introducing a security vulnerability. Alternatively, the developers may configure the update to remove the "logs" folder 174 from the first virtual machine 110. Removing the "logs" folder 174 increases the risk of adversely affecting performance or operability of other applications (e.g., deleting the HighScores file accessed by the application 172) that rely on or use contents of the "logs" folder 174.

In the illustrated example of FIG. 1A, the second virtual machine 111 employs a modularized virtualization topology as disclosed herein. In the illustrated example, the resources mounted on the second virtual machine 111 are encapsulated in separate VHDs. For example, the VHD 171 of the first virtual machine 110 includes the operating system 170, the application 172 and the "logs" folder 174, which includes the "UserActions" file 175 and the "HighScores" file 176. In contrast, the second virtual machine 111 includes a first VHD 147 that encapsulates an operating system 146, a second VHD 141 that encapsulates an application 140, a third VHD 130 that encapsulates a "logs" folder dedicated to the operating system 146 (e.g., an example "OS logs" folder 130), and a fourth VHD 135 that encapsulates a "logs" folder dedicated to the application 140 (e.g., an example "app logs" folder 134). This modularized virtualized topology results in different messaging as messages must be directed to the correct VHD. For instance, in the traditional topology represented by the first virtual machine 110, when the operating system 170 loaded on the first virtual machine 110 communicates a message (e.g., a write request) to the "UserActions" file 175, the message is directed to the "logs" folder 174 in the VHD 171 of the first virtual machine 110, and when the application 172 loaded on the first virtual machine 110 communicates a message (e.g., a write request) to the "HighScores" file 176, the message is directed to the same "logs" folder 174 in the VHD 171. In contrast, in the modularized virtualization topology illustrated in the second virtual machine 111, when the operating system 146 loaded on the second virtual machine 111 communicates a message (e.g., a write request) to the "UserActions" file 132, the message is directed to the "OS logs" folder 130 encapsulated by the VHD 131, and when the application 140 loaded on the second virtual machine 111 communicates a message (e.g., a write request) to the "HighScores" file 136, the message is directed to a different "logs" folder than the "OS logs" folder 130 (e.g., the message is directed to the "app logs" folder 134 encapsulated by the VHD 135 that is also loaded on the second virtual machine 111.

As described above, a virtual computing environment employing the modularized virtualization topology described in FIG. 1A enables quick, focused modifying of the resources loaded on the virtual machines. For example, a developer of the application 140 may wish to apply a patch to the application 140 (e.g., patch a vulnerability to the application 140 that enables a user to modify their high scores without earning the high score) while applying no modifications to the "app logs" folder 134. In the illustrated example of FIG. 1A, the patch may be applied by swapping the VHD 141 encapsulating the application 140 with a new VHD encapsulating an updated version 140' of the application 140 (e.g., dis-mounting the VHD 141 from the second virtual machine 111 and mounting a new VHD 141'). In such instances, the fourth VHD 135 encapsulating the "app logs" folder 134 does not need to be modified and, thus, applying the patch to the application 140 does not modify the VHD 135 and/or the functionality and/or data set encapsulated by the VHD 135.

Figure 1C:
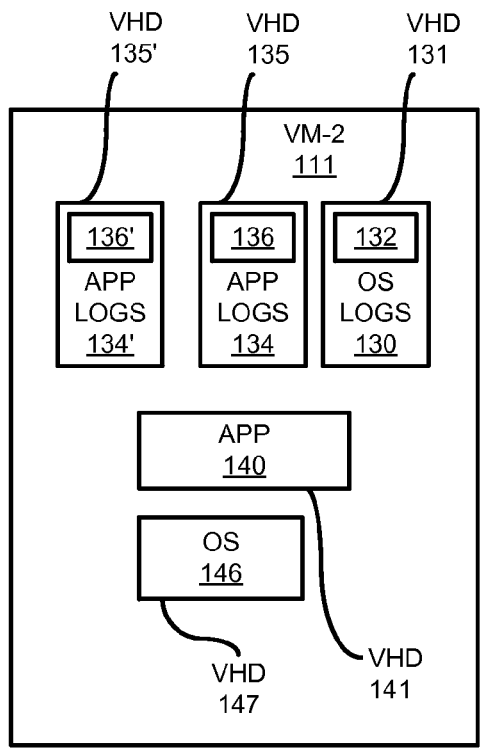
FIG. 1C is a block diagram of the example second virtual machine of the example virtual computing environment of FIG. 1A at a first time.
Figure 1D:
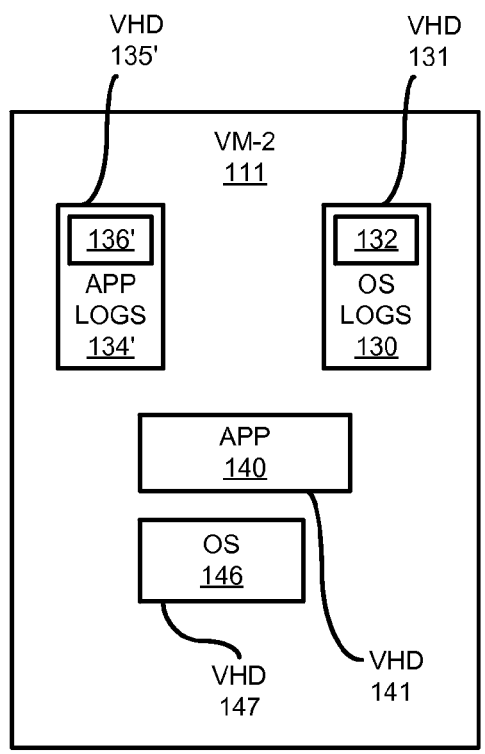
FIG. 1D is a block diagram of the example second virtual machine of the example virtual computing environment of FIG. 1A at a second (later) time.

In addition, employing modularized virtualization topology ensures there is no risk of, for example, accidentally modifying another file that may traditionally be located in the same folder as the "HighScores" file corresponding to the application. For example, applying a patch to the overall functionality of the applications 140, 172 may include updating the data structure used to record high scores (e.g., the "HighScores" files 176, 136 of the respective first virtual machine 110 and the second virtual machine 111). In the illustrated example of FIG. 1A, applying such a patch to the software system loaded on the second virtual machine 111 may include (1) mounting a new VHD 135' encapsulating a new "app logs" folder 134' and a new "HighScores" data structure 136' (see FIG. 1C), (2) importing the data from the "HighScores" file 136 to the new "HighScores" data structure 136', within the new VHD 135', and (3) dis-mounting the VHD 135 encapsulating the "HighScores" file 136 (see FIG. 1D). In such circumstances, the developer need not be worried about accidentally modifying (e.g., removing) other files traditionally included in the "logs" folder such as the "UserActions" file 175 loaded on the first virtual machine 110 because the modularized virtualization topology avoids overlaps likely to result in such accidental modifications.

In order to enforce the principles of modularized virtualized topology disclosed herein, the illustrated example is provided with a storage manager 114. In the illustrated example of FIG. 1A, the storage manager 114 includes an example request collector 116 to monitor communications within the virtual computing environment 100, an example re-direction manager 118 to re-direct access requests from an original path location to an alternate path location, and an example alternate locations database 120.

The example storage manager 114 may re-direct a portion of access requests intercepted within the virtual environment 100. The example storage manager 114 of FIG. 1A includes the request collector 116 to monitor communications between the hypervisor 108 and the virtual machines 110, 111, communications between the virtual machines 110, 111, and/or communications within one of the virtual machines 110, 111 to VHDs. For example, the request collector 116 may intercept a communication (e.g., trap or hook an I/O communication) and parse the communication (e.g., a message, a request, instructions, etc.) to determine whether it is a request to access a software asset at an original path location (e.g., a read request or a write request) from the hypervisor 108 to the second virtual machine 111. For example, the request collector 116 may parse a communication and determine the communication is an access request when the syntax of the communication matches a write request syntax or when the syntax of the communication matches a read request syntax. The request collector 116 may then initiate a process to read data from and/or write data to virtual resources (e.g., software assets) loaded onto the second virtual machine 111 at a different pathname location than the original pathname location. In the illustrated example of FIG. 1A, the request collector 116 initiates the process by providing a detected access request to the example re-direction manager 118 for further processing and returns to monitoring the communications. In some examples, the request collector 116 may include and/or be in communication with an example buffer 117 to temporarily store the intercepted communications before providing them to the re-direction manager 118.

The example re-direction manager 118 of FIG. 1A operates to support an environment in which virtual resources with a logical connection between them are encapsulated in a single VHD. As noted, a VHD in this disclosure does not include unrelated virtual resources. The granularity of the functionality and/or data set encapsulated in the VHDs may vary for different services. For example, a database service may be described as having one functionality (e.g., "a database"). As a result, the re-direction manager 118 may encapsulate all virtual resources (e.g., software assets) associated with "a database" (e.g., database data, a database engine, instructions to erase database data, etc.) by re-directing requests directed to the virtual resources to a database VHD.

In other examples, the functionality of the database service may be encapsulated into multiple VHDs. For example, the re-direction manager 118 may cause database data to be encapsulated in a first VHD, the database engine to be encapsulated in a second VHD and instructions to erase database data in a third VHD.

An example benefit of the re-direction manager 118 encapsulating different functionalities of a service into dedicated VHDs is that modifying (e.g., upgrading, downgrading, patching, etc.) a functionality of the service requires only modifying the relevant VHD (e.g., the VHD encapsulating the functionality). For example, if the database engine in the database service needs to be upgraded, only the second VHD (e.g., the VHD encapsulating the database engine) needs to be accessed without risking the integrity of the information stored in the database (e.g., without accessing the first VHD).

The example storage manager 114 of FIG. 1A includes the example re-direction manager 118 to re-direct access requests made in the virtual computing environment 100 to appropriate VHDs. For example, the re-direction manager 118 may re-direct a write request (e.g., write (logs, HighScores.txt) from the original path location specified in the write request (e.g., the logs folder), to an alternate path location (e.g., the VHD 135 encapsulating the "app logs" folder 134). In the illustrated example, the re-direction manager 118 determines whether to re-direct an access request based on mappings (sometimes referred to herein as "path location mappings" or "mapping rules") stored in the alternate locations database 120. In the illustrated example of FIG. 1A, the example alternate locations database 120 stores path location mappings. An example data table 200 representing path location mappings is shown in the illustrated example of FIG. 2.

The example re-direction manager 118 of the illustrated example of FIG. 1A determines path locations to which access requests should be directed. To determine whether to direct the access request to its original path location or to re-direct the access request to an alternate path location, the example re-direction manager 118 queries the example alternate locations database 120 to determine whether the original path location specified in the access request (e.g., the logs folder) is mapped to an alternate path location.

In the illustrated example of FIG. 1A, when an alternate location mapping to the original path location is returned by the alternate locations database 120, the example re-direction manager 118 re-directs the access request to the alternate location (e.g., an encapsulating VHD). In such circumstances, communications between the hypervisor 108 and the original path location are transformed into communications between the hypervisor 108 and the alternate path location identified by the alternate locations database 120.

Mappings stored in the example alternate locations database 120 of FIG. 1A may be used to access VHDs encapsulating the corresponding functionality. In some examples, the mappings stored in the alternate locations database 120 are protected (e.g., cannot be modified and/or can only be modified by pre-determined, authorized applications). In some such examples, unapproved applications (e.g., applications that are not defined in a rule set to be able to modify mappings stored in the alternate locations database 120) can be stopped from modifying the mapping entries in the alternate locations database 120, thereby preserving the persistence of the alternate path location mappings. For example, a word processor cannot modify path location mappings related to the "Solitaire" application. In addition, the alternate path location mappings preserve the access credentials of the original path location of approved applications (e.g., inherits the same access credentials of the original path).

In some examples, the mappings are populated by a developer during or after a development phase. For example, when an operating system is installed on a virtual machine, the installation process may populate the alternate locations database 120 with one or more path location mappings to define where libraries (e.g., application programming interfaces) made available by/to the operating system are installed. In some examples, such mappings increase the likelihood of preventing subsequently loaded applications from accessing resources used by the operating system and/or hijacking access to the libraries. An example flowchart representative of example machine-readable instructions that may be executed to implement the example re-direction manager 118 is described below in connection with FIG. 3.

The example alternate locations database 120 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., a flash memory). The example alternate locations database 120 may additionally or alternatively be implemented by one or more double data rate (DDR) memories such as DDR, DDR2, DDR3, mobile DDR (mDDR), etc. The example alternate locations database 120 may additionally or alternatively be implemented by one or more mass storage devices such as hard disk drive(s), compact disk drive(s), digital versatile disk drive(s), etc. While in the illustrated example the alternate locations database 120 is illustrated as a single database, the alternate locations database 120 may be implemented by any number and/or type(s) of databases.

In the illustrated example of FIG. 1A, the example storage manager 114 prevents co-mingling resources of different applications in the virtual computing environment 100. The request collector 116 of the storage manager 114 of the example of FIG. 1A intercepts requests (e.g., traps and/or hooks I/O requests such as read requests, write requests, etc.) to virtual resources mounted on the second virtual machine 111 in the virtual computing environment 100 and the re-direction manager 116 forwards (e.g., re-directs) the access requests to a VHD associated with the corresponding resource (e.g., a virtual hard disk encapsulating a related logical functionality). As used herein, "encapsulation" is defined to mean the creating of a virtual hard disk (or receptacle) in which all of the components of the virtual hard disk (or receptacle) are logically related. For example, an operating system may be encapsulated and referred to as "OS.VHD" or "OS VHD."

Although the storage manager 114 of the example of FIG. 1A is implemented as a component of the hypervisor 108, the storage manager 114 may alternatively be implemented as a virtual machine provisioned by the hypervisor 108, as a component (e.g., a device driver) of an operating system running one or more containers, etc. Additionally or alternatively, the storage manager 114 may be part of a single point of control to the virtual computing environment 100 (e.g., a virtualization manager such as vCenter Server, provided by VMware, Inc., a Delaware corporation). Additionally or alternatively, the virtual computing environment 100 may include more than one storage manager 114. For example, a first storage manager may manage the first virtual machine 110 and a second storage manager may manage the second virtual machine 111.

In the illustrated example of FIG. 1A, the hypervisor 108 of the illustrated example loads (e.g., mounts) a VHD 147 encapsulating the operating system 146 onto the second virtual machine 111. In the illustrated example of FIG. 1A, the re-direction manager 118 allocates the example VHD 147 to the operating system 146. An encapsulated VHD may include one or more types of resources (e.g., files, folders or directories, databases, executables, configuration information, etc.) related to the same logical functionality and/or logically-related data set. The VHD 147 of this example encapsulates the resources (e.g., files, executables, databases, directories, etc.) used by the operating system 146. In the illustrated example, the OS 146 is encapsulated in one virtual hard disk (VHD) 147. However, in some examples, the OS may be a collection of several different, disparate functionalities and/or data sets. In such examples, rather than being one VHD 147 as shown in FIG. 1A, the OS may be implemented by several VHDs, each encapsulating a separate functionality or data set.

The example hypervisor 108 of FIG. 1A also loads (e.g., mounts) the VHD 141 encapsulating the example application 140 or an application component (e.g., a load balancer, an appserver and/or a database) onto the second virtual machine 111. Additionally or alternatively, the example storage manager 114 of FIG. 1A may encapsulate resources in a VHD at a more granular level. For example, the re-direction manager 118 may encapsulate database data in a first VHD, may encapsulate the database data in a second VHD and may encapsulate a database engine in a third VHD. As a result, each of the three VHDs encapsulates respective functionalities that represent a different logical part of the overall functionality of the database. Moreover, in such an example, each of the three VHDs is related to each other. For example, to write data to and/or retrieve data from the database, both the first VHD (e.g., the database data) and the third VHD (e.g., the database engine) should be available (e.g., mounted).

Assume for purposes of discussion, it is desirable to load an application 140 which was not built in accordance with modularized virtualization topology principles. When the hypervisor 108 loads the VHD 141 encapsulating the non-modularized virtualized application 140 (e.g., a computer game such as "Solitaire"), one or more components of the application 140 may also access virtual machine resources loaded for and used by the operating system 146. In other instances, the application may violate the principle of sharing a data set with an unrelated functionality or data set. For example, during execution, the operating system 146 may record user actions in a "UserActions" file 132 (e.g., a text document, a database, etc.) in a logs folder. The non-modularized virtualized application 140 may be structured to record user high scores in a "HighScores" 133 file also in the same logs folder.

The storage manager 114 of the illustrated example is structured to avoid this sharing. In particular, the storage manager 114 of the illustrated example includes the example re-direction manager 118 to forward an access request to its original path location (e.g., to not re-direct an access request from its original path location (e.g., the example "logs" folder 174)) or to re-direct the access request to an alternate path location (e.g., a virtual hard disk dedicated to the resource associated with the access request (e.g., a logical functionality)) as required to maintain the non-sharing principles. For example, in response to detecting a write request to the "UserActions" file 132 in a common logs folder (e.g., the example "logs" folder 174), the storage manager 114 may re-direct the access request to an alternate VHD 131 encapsulating a logs folder related to the operating system (e.g., an example "OS logs" folder 130). In the example of FIG. 1A, the "OS logs" folder 130 is encapsulated in its own VHD 131 mounted to the VM-2 111. The example storage manager 114 of FIG. 1A may also re-direct intercepted access requests directed to the "HighScores" file 136 made by the application (e.g., "Solitaire") to a second alternate VHD 135 encapsulating a logs folder related to the application (e.g., an example "app logs" folder 134). In the example of FIG. 1A, the "app logs" folder 134 is encapsulated in its own, separate VHD 135 mounted to the VM-2 111. As a result, instead of being found in a common logs folder that is shared by the operating system 146 and the application 140, resources having a logical functionality related to the operating system are found in VHDs associated with the example OS 146 (e.g., the example VHDs 131, 147), and the resources having a logical functionality related to the application are located in VHDs associated with the application 140 (e.g., the example VHDs 135, 141). For example, the Solitaire application may communicate a write request to write to the HighScores.txt file 136 in the logs folder (e.g., write (logs, HighScores.txt). The example storage manager 114 intercepts the write request and re-directs the write request to the VHD 135 encapsulating a functionality or data set associated with the Solitaire application. In contrast, a write request to write to a file in the logs folder that is generated by the operating system 146 may be forwarded to the security logs folder or re-directed to the VHD 131 encapsulating a functionality or data set associated with the operating system. In the illustrated example, the storage manager 114 does not regenerate the access request with the alternate path location. In some such examples, a device driver (located either in the OS or the hypervisor 108) regenerates the access request with the alternate path location by altering the path location of the original access request.

Figure 2:
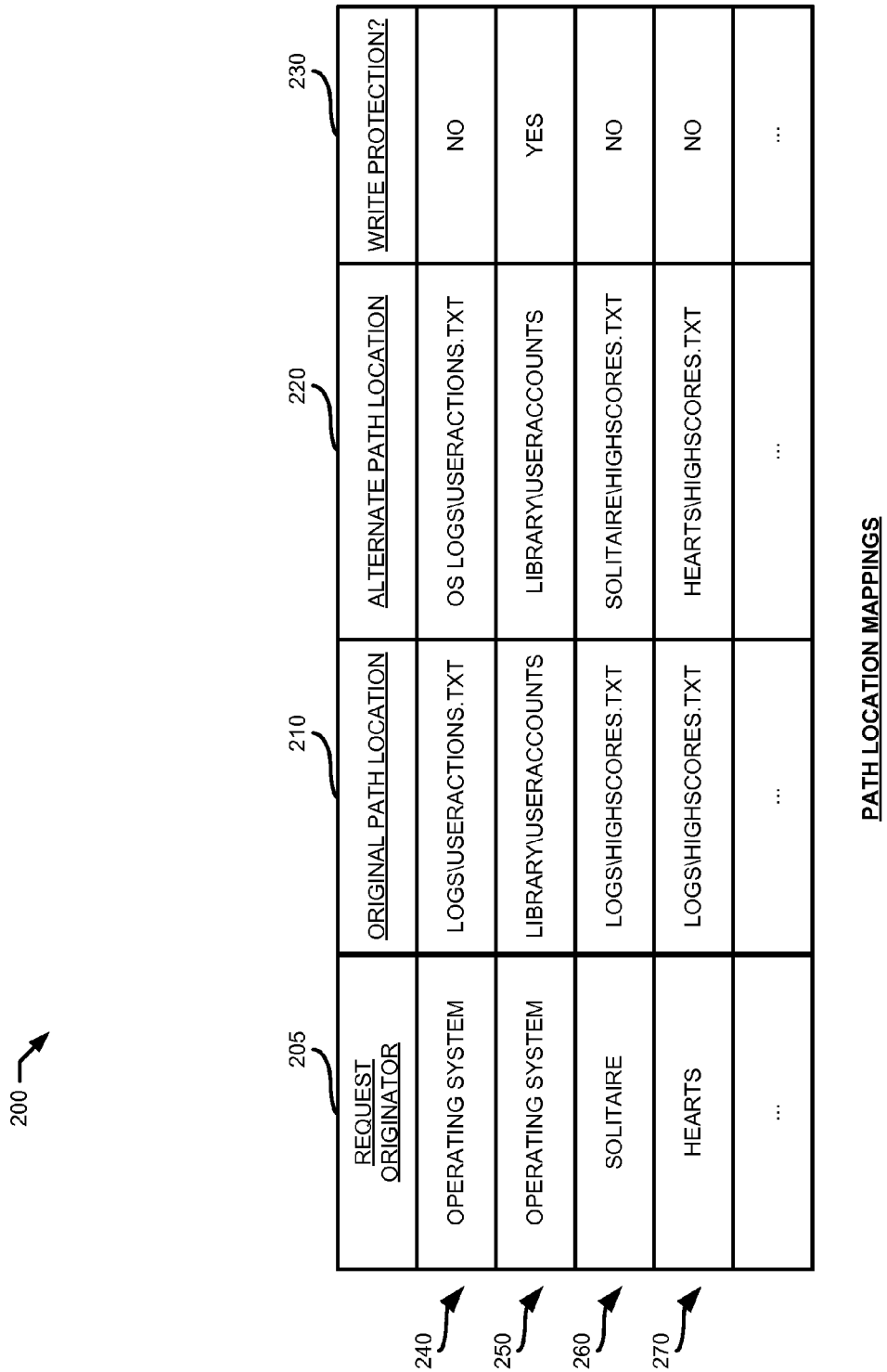
FIG. 2 illustrates an example data table that may be employed by the example storage manager of FIG. 1A or FIG. 1B to store path location mappings.

FIG. 2 illustrates an example data table 200 that may be employed by the example alternate locations database 120 of FIG. 1A to store path location mappings. For example, the re-direction manager 118 may access the data table 200 to identify an alternate path location to re-direct the access request to instead of the original path location specified in the access request. The example data table 200 of FIG. 2 includes a request originator column 205, an original path location column 210, an example alternate path location column 220 and a write protection column 230. However, any other columns representing any other conditions and/or characteristics of an access request may additionally or alternatively be used. Moreover, the example column(s) may be implemented in any other fashion. For example, the example original path location column 210 identifies an original path location that may be used to find a corresponding mapped alternate path location specified in the example alternate location column 220. The example request originator column 205 identifies the source of the access request (e.g., the calling function). In some examples, the request originator information may not be known and/or the example data table 200 may not include the request originator column 205. For example, an alternate path location mapping may re-direct an access request even when the source calling the access request is unknown.

The data table 200 of the illustrated example includes four example rows 240, 250, 260, 270. The example first row 240 indicates that requests originated by the "operating system" to the original path location "logs\UserActions.txt" are mapped to a different VHD located at the alternate path location "OS logs\UserActions.txt" and that the corresponding resource (e.g., the UserActions.txt file) is not write protected. The example second row 250 indicates that requests originated by the "operating system" to the original path location "Library\UserAccounts" are mapped to a VHD located at the same alternate path location "Library\UserAccounts" and that the corresponding resource (e.g., the VHD encapsulating the logical functionality and/or data sets contained at the "Library\UserAccounts" path location) is write protected. By using the same path as the original path location and the alternate path location, a corresponding access request for a UserAccounts file is re-directed to the original path location, which may be useful for a developer to prevent identified resources from being re-directed.

The example third row 260 indicates that requests originated by the "Solitaire" application to the original path location "logs\HighScores.txt" are mapped to a VHD located at the alternate path location "Solitaire\HighScores.txt" and that the corresponding resource (e.g., the HighScores.txt file) is not write protected. The example fourth row 270 indicates that requests originated by the "Hearts" application to the original path location "logs\HighScores.txt" are mapped to a VHD located at the alternate path location "Hearts\HighScores.txt" and that the corresponding resource (e.g., the HighScores.txt file) is not write protected. While in the illustrated example of FIG. 2, four example rows 240, 250, 260, 270 are shown corresponding to four example path location mappings, more or fewer path location mappings may be represented in the example data table 200 corresponding to the path location mappings provided by application developers. Further, while in the illustrated example the origination is known, in some operating systems, the originator is not known and mapping is done without reference to the source while achieving the same result of mapping calls to separate VHDs encapsulating one functionality each.

As noted above, FIG. 1B illustrates an example lightweight modularized virtualization system constructed using a container-based architecture instead of a virtual machine-based architecture. The example of FIG. 1B is similar to the example of FIG. 1A. However, in the example of FIG. 1B, the example storage manager is executed on the host operating system 154 and the modularized virtualization topology is reflected within containers instead of in virtual machines. Subject to these differences, the above description of FIG. 1A is applicable to the example of FIG. 1B.

While an example manner of implementing the example storage manager 114 is illustrated in FIG. 1A and FIG. 1B, one or more of the elements, processes and/or devices illustrated in FIGS. 1A and/or 1B may be combined, divided, re-arranged, omitted, eliminated and/or implemented in any other way. Further, the example request collector 116, the example buffer 117, the example re-direction manager 118, the example alternate locations database 120 and/or, more generally, the example storage manager 114 of FIGS. 1A and/or 1B may be implemented by hardware, software, firmware and/or any combination of hardware, software and/or firmware. Thus, for example, any of the example request collector 116, the example buffer 117, the example re-direction manager 118, the example alternate locations database 120 and/or, more generally, the example storage manager 114 of FIGS. 1A and/or 1B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request collector 116, the example buffer 117, the example re-direction manager 118, the example alternate locations database 120 and/or, more generally, the example storage manager 114 of FIGS. 1A and/or 1B is/are hereby expressly defined to include a tangible computer readable storage device or storage disk such as a memory, a digital versatile disk (DVD), a compact disk (CD), a Blu-ray disk, etc. storing the software and/or firmware. Further still, the example storage manager 114 of FIGS. 1A and/or 1B may include one or more elements, processes and/or devices in addition to, or instead of, those illustrated in FIGS. 1A and/or 1B, and/or may include more than one of any or all of the illustrated elements, processes and devices.

Figure 3:
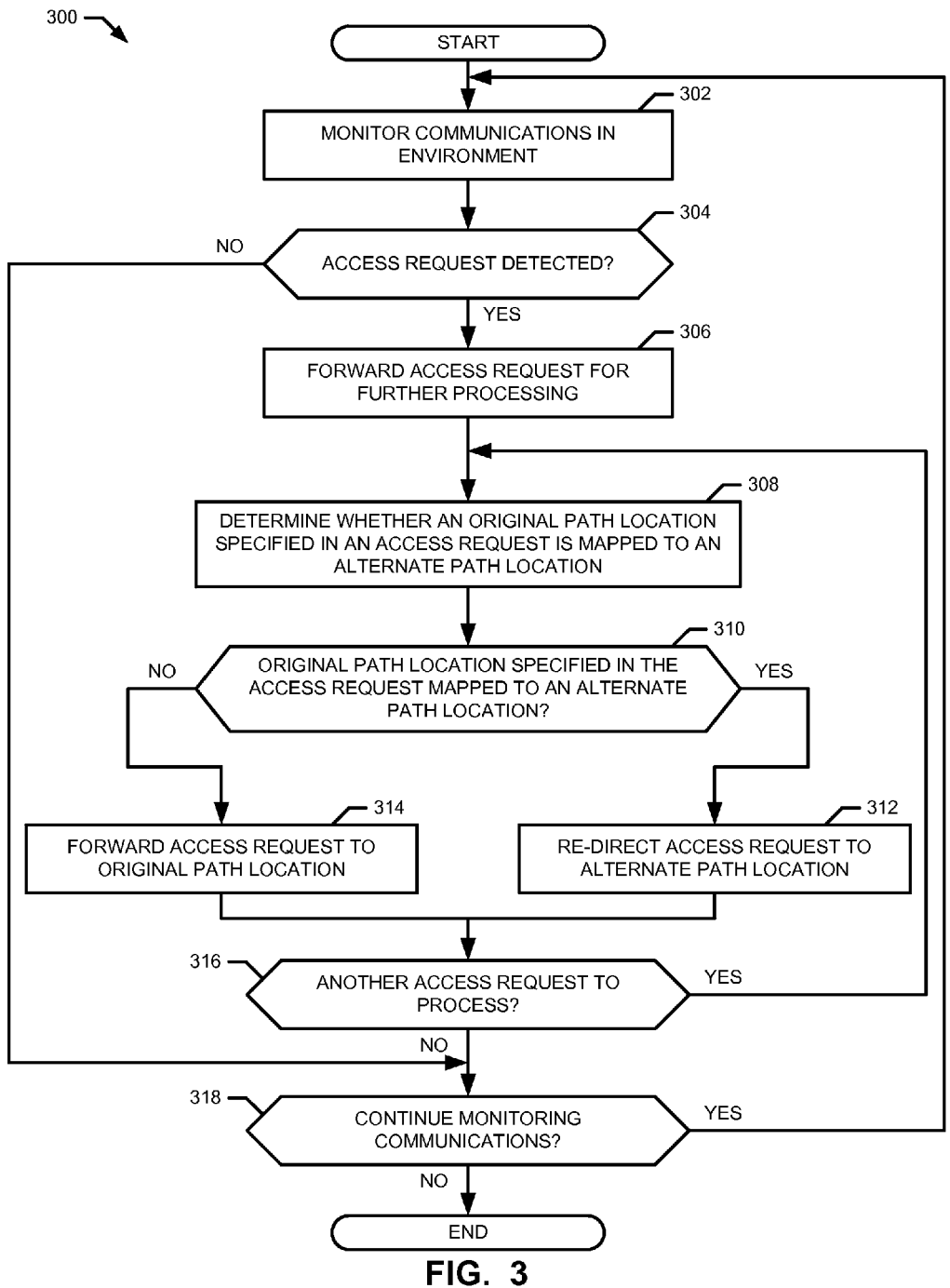
FIG. 3 is a flowchart representative of example machine-readable instructions that may be executed to re-direct access requests in the environments of FIG. 1A or FIG. 1B.

A flowchart representative of example machine readable instructions for implementing the storage manager 114 of FIGS. 1A and/or 1B is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example storage manager 114 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 3 is a flowchart representative of example machine-readable instructions 300 that may be executed to implement the example storage manager 114 of FIGS. 1A and/or 1B to re-direct access requests within the virtual computing environment 100. For example, the re-direction manager 118 (FIGS. 1A and/or 1B) may re-direct access requests based on path location mappings. The example instructions 300 of the illustrated example of FIG. 3 begin at block 302 when the example storage manager 114 monitors communications in the virtual computing environment 100. For example, the request collector 116 (FIGS. 1A and/or 1B) intercepts (e.g., traps and/or hooks) communications within the virtual computing environment 100. Such communications may be, for example, access requests between the example hypervisor 108 and the example virtual machine 111 provisioned by the hypervisor 108 and/or access requests within a VM. At block 304, the example request collector 116 determines whether an intercepted communication is an access request. For example, the request collector 116 may parse the communication and determine the communication is an access request when the syntax of the communication matches a write request syntax or when the syntax of the communication matches a read request syntax. If, at block 304, the request collector 116 determined that the communication was not an access request (e.g., an access request was not detected), then control proceeds to block 318 to determine whether to continue or not to continue monitoring communications for an access request.

If, at block 304, the request collector 116 detected an access request, then, at block 306, the request collector 116 forwards the access request to the re-direction manager 118 for further processing. At block 308, the example re-direction manager 118 determines whether the original path location specified in the access request is mapped to an alternate path location. For example, the re-direction manager 118 may query the path locations mappings shown in the example data table 200 of FIG. 2. If, at block 310, the example re-direction manager 118 determined that the original path location is mapped to an alternate path location (e.g., the alternate locations database 120 returned an alternate path location for requests from the request originator), then, at block 312, the example re-direction manager 118 re-directs the access request to the alternate path location. If, at block 310, the example re-direction manager 118 determined that the original path location was not mapped to an alternate path location for requests from the request originator, then, at block 314, the example re-direction manager 118 forwards the access request to the original path location specified in the access request.

At block 316, the example re-direction manager 118 determines whether another access request to process is received. If, at block 316, the re-direction manager 118 determines that there is another access request to process, control returns to block 308 to determine whether the original path location specified in the new access request is mapped to an alternate path location for requests from the request originator.

If, at block 316, the example re-direction manager 118 determined that there was not another access request to process, or after the request collector 116 determined than an intercepted communication was not an access request at block 304, then, at block 318, the storage manager 114 determines whether to continue monitoring for communications. If, at block 318, the storage manager 114 determined to continue monitoring for communications, then control returns to block 302 to continue monitoring communications in the virtual computing environment 100 for an access request. If, at block 318, the storage manager 114 determined not to continue monitoring the virtual computing environment 100 for communications, the example program 300 of FIG. 3 ends.

Figure 4:
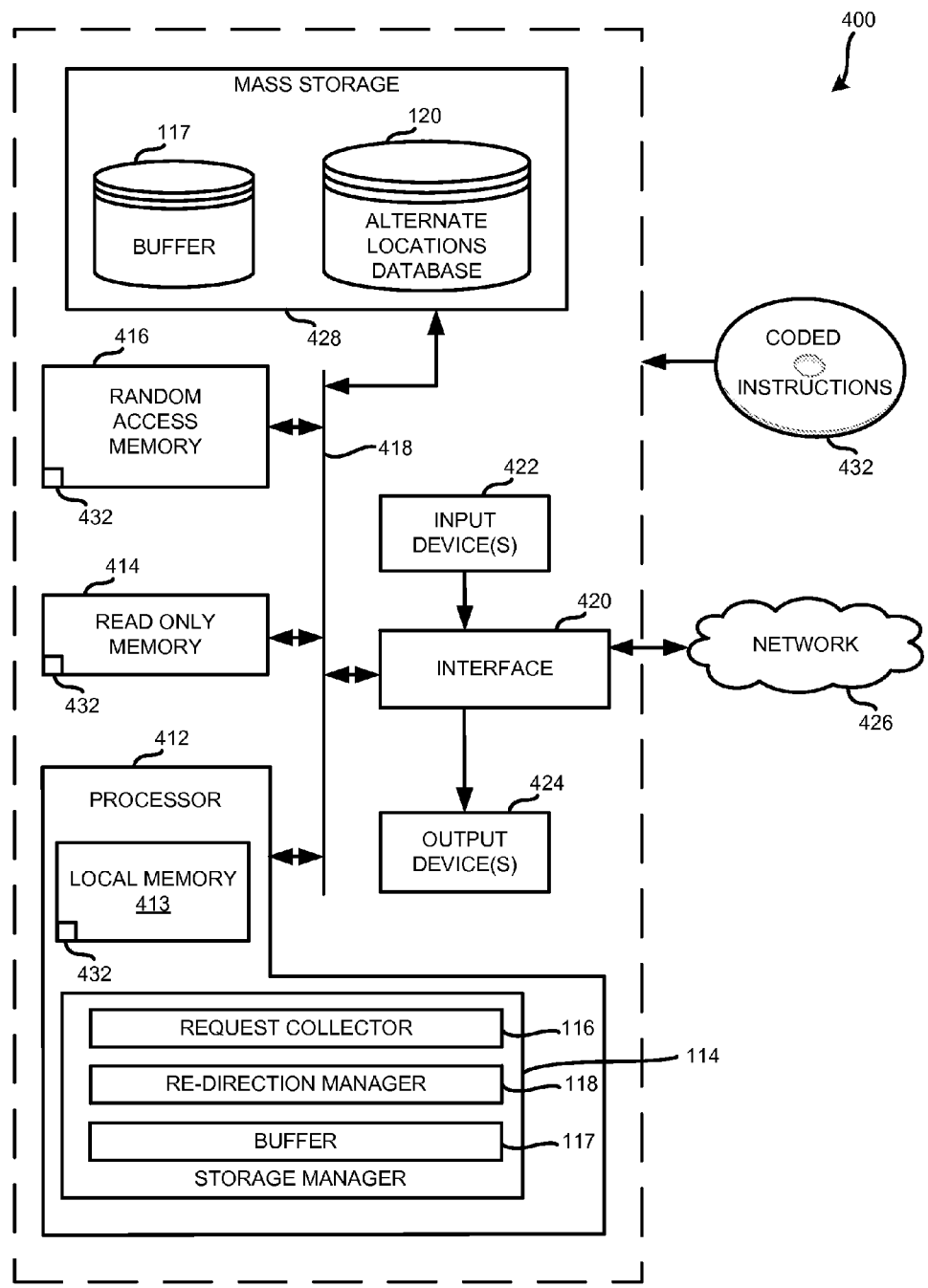
FIG. 4 is a block diagram of an example storage manager structured to execute the example machine-readable instructions of FIG. 3 to implement the example storage manager of FIG. 1A or FIG. 1B.

FIG. 4 is a block diagram of an example processor platform 400 capable of executing the instructions of FIG. 3 to implement the storage manager 114 of FIGS. 1A and/or 1B. The processor platform 400 can be, for example, a server, a personal computer, or any other type of computing device. The processor platform 400 of FIG. 4 may represent, for example, the physical resources on which the hypervisor 108, the virtual machine(s) and/or the container(s) are instantiated.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example executes the instructions to implement the example request collector 116, the example buffer 117, the example re-direction manager 118 and/or, more generally, the storage manager 114. The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives. The example mass storage 428 implements the example buffer 117 and the example alternate locations database 120. Although the example buffer 117 of FIG. 4 is illustrated in the example processor 412 and the example mass storage 428, the example buffer 117 can be in either or both locations.

Coded instructions 432 representative of the machine-readable instructions of FIG. 3 may be stored in the mass storage device 428, in the volatile memory 414, in the non-volatile memory 416, and/or on a removable tangible computer readable storage medium such as a CD or DVD.

FIG. 5A illustrates an example virtual computing environment 500 including an example storage manager 502. Other than the storage manager 502, the example of FIGS. 1A and 5A are similar. Thus, the discussion of like numbered components in FIG. 1A apply equally well to the like numbered parts of FIG. 5A and will not be repeated here.

In the illustrated example of FIG. 5A, the example virtual computing environment 500 includes the example storage manager 502 to prevent co-mingling resources of different applications in the virtual computing environment 500. The example storage manager 502 of FIG. 5A includes the example request collector 116 to monitor communications within the virtual computing environment 500, the example re-direction manager 118 to re-direct access requests for which an associated path location mapping is stored (e.g., in the alternate locations database 120), an example locations mapper 504 to generate alternate path location mappings to re-direct access requests from an original path location to an alternate path location, the example alternate locations database 120, and an example re-direct rules database 506.

Figure 5B:
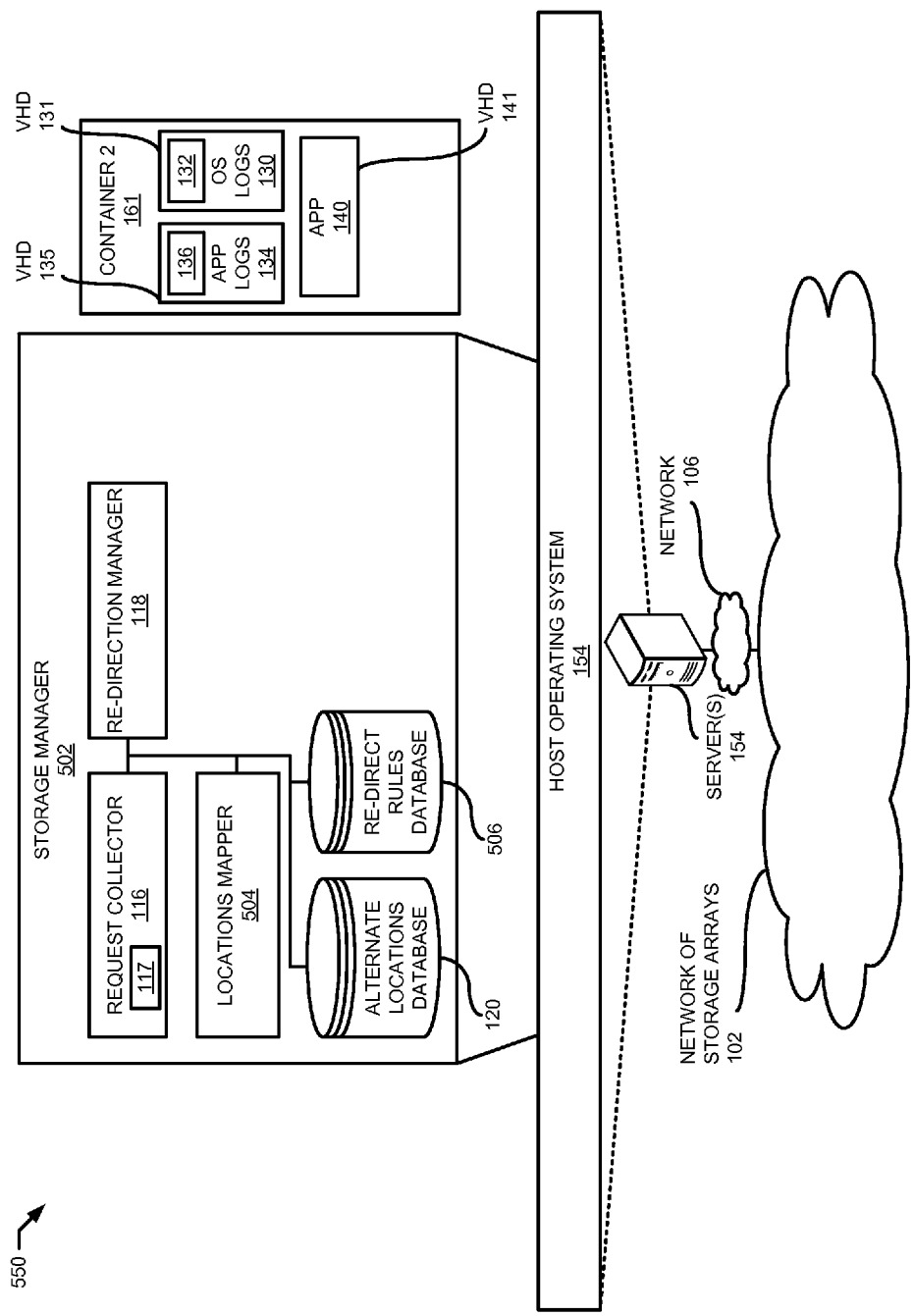
FIG. 5B is a diagram of an alternate example virtual computing environment constructed in accordance with the teachings of this disclosure to generate alternate path location mappings in a modularized virtualization topology using virtual hard disks.

FIG. 5B is an example illustrating a light-weight virtual computing environment 550 employing containers. Other than the use of virtual machines and a hypervisor instead of containers running on a host OS, the example of FIGS. 5A and 5B are similar. Thus, the following discussion of like numbered components in FIG. 5A apply equally well to the like numbered parts of FIG. 5B and, to avoid redundancy, FIG. 5B will not be separately described.

The example storage manager 502 may re-direct a portion of access requests intercepted within the virtual environment 500 of FIG. 5A. The example storage manager 502 of FIG. 5A includes the request collector 116 to monitor communications between the hypervisor 108 and the virtual machine 111, and/or communications within the virtual machine 111. For example, the request collector 116 may intercept a communication from the hypervisor 108 to the second virtual machine 111 (e.g., trap or hook an I/O communication) and parse the communication (e.g., a message, a request, instructions, etc.) to attempt to identify an access request (e.g., a read request or a write request). For example, the request collector 116 may parse a communication and determine the communication is an access request when the syntax of the communication matches a write request syntax or when the syntax of the communication matches a read request syntax. The request collector 116 may then initiate a process to read data from and/or write data to virtual resources loaded onto the second virtual machine 111. In the illustrated example of FIG. 5A, the request collector 116 initiates the process by providing a detected access request to the example re-direction manager 118 and/or the example locations mapper 504 for further processing and returns to monitoring the communications. In some examples, the request collector 116 may include and/or be in communication with an example buffer 117 to temporarily store the intercepted communications before providing them to the re-direction manager 118 and/or the locations mapper 504.

The example storage manager 114 of FIG. 5A includes the example re-direction manager 118 to encapsulate virtual resources by re-directing access requests made in the virtual computing environment 500 to appropriate VHDs. In the illustrated example, the re-direction manager 118 determines whether to re-direct an access request based on mappings stored in the alternate locations database 120. In the illustrated example of FIG. 5A, when an alternate location mapping to the original path location is returned by the alternate locations database 120, the example re-direction manager 118 re-directs the access request to the alternate location (e.g., to a VHD encapsulating the requested functionality). In such circumstances, communications between the hypervisor 108 or the VM-2 111 and the original path location are transformed into communications between the hypervisor 108 or the VM-2 111 and the alternate path location identified by the alternate locations database 120.

In some examples, when an alternate location mapping to the original path location is not returned by the alternate locations database 120, the example re-direction manager 118 forwards the access request to the original path location. In some examples, when an alternate location mapping is not returned by the alternate locations database 120, the example storage manager 502 determines whether the alternate locations database 120 should include a mapping corresponding to the original path location.

The example storage manager 502 of FIG. 5A includes the example locations mapper 504 to determine whether to update the alternate locations database 120 by including a path location mapping. If the locations mapper 504 determines to update the alternate locations database 120, the locations mapper 504 adds a new path location mapping to the alternate locations database 120. For example, the locations mapper 504 may inspect a database for a re-direct rule directed to the original path location. In some such examples, when the locations mapper 504 identifies a re-direct rule directed to the original path location, the locations mapper 504 updates the alternate locations database 120 to include the path location mapping. As a result, the locations mapper 504 maintains that the storage manager 114 operates in compliance with the re-direct rules.

In some examples, the request collector 116 and/or the example re-direction manager 118 of FIG. 5A initiates the example locations mapper 504 when a query to the alternate locations database 120 does not return an alternate path location. For example, an alternate path location dedicated to a different logical functionality and/or logically-related data set may not yet have been created when installing a service to the virtual computing environment 500, when migrating a software system to the modularized virtualization topology of the virtual computing environment 500, when an operating system is powered on, etc. For example, the first time a write request made by, for example, the "Solitaire" application 140 to write to the "HighScores" file 135 is detected, the write request cannot be re-directed to the appropriate VHD (e.g., the example VHD 135 encapsulating the "app logs" folder 134). In some examples, when the locations mapper 504 determines that a path location mapping should exist corresponding to the original path location, the locations mapper 504 updates the example alternate locations database 120 to include a new path location mapping.

The example locations mapper 504 of FIG. 5A determines whether the alternate locations database 120 should include a path location mapping based on re-direct rules stored in the re-direct rules database 506. In some examples, the re-direct rules are populated by a developer during or after a development phase. For example, a developer of a service implemented with a modularized virtualization topology may populate the re-direct rules database 506 with re-direct rules that correspond to different logical functionalities and/or logically-related data sets to be re-directed. In some examples, the re-direct rules may represent best practices and/or define specific mappings for a service. In the illustrated example of FIG. 5A, the example re-direct rules database 506 stores rules (e.g., re-direct rules) used to generate the path location mappings stored in the alternate locations database 120. An example data table 600 representing re-direct rules is shown in the illustrated example of FIG. 6.

In the illustrated example, once the locations mapper 504 generates a path location mapping for an encapsulating VHD, subsequent access requests to the logical functionality and/or logically-related data set encapsulated by the VHD are re-directed from the original path location to the alternate path location. For example, a subsequent access to a mapped original path location may be re-directed by the example re-direction manager 118.

In the illustrated example, when an alternate location mapping is not returned by the alternate locations database 120, the locations mapper 504 of FIG. 5A performs a first test to determine whether the access request is a read request or a write request. In the illustrated example, when the access request is a read request, the locations mapper 504 directs the access request to the original path location. For example, a read request is an attempt to retrieve information stored at a path location. As a result, if a path location mapping for the original path location is not included (e.g., not found) in the alternate locations database 120), then information cannot be retrieved from an alternate path location and, thus, the storage manager 502 forwards (e.g., directs) the access request to the original path location identified in the read request.

In the illustrated example, when the access request is a write request, the example locations mapper 504 determines whether to update the alternate locations database 120 to include a new path location mapping by accessing re-direct rules retrieved from the example re-direct rules database 506. For example, the locations mapper 504 may parse and/or query the re-direct rules database 506 for a re-direct rule directed to the original path location.

A re-direct rule (e.g., a rule to generate a path location mapping in the alternate locations database 120 to re-direct an access request to an alternate path location instead of the original path location specified in the access request) may define one or more conditions that, when satisfied, result in the re-directing of the access request. The example re-direct rules may be used to identify logical functionality (or functionalities) and/or logically-related data set(s). For example, a re-direct rule may define logical relations based on, for example, file type, destination, originator, etc. For example, a first re-direct rule may re-direct access requests directed to any executable (*.EXE) files to a first virtual hard disk associated with the request originator, a second re-direct rule may re-direct access requests to a logs folder to a second virtual hard disk that is accessed by more than one application (e.g., a "common" or "shared" folder)), and a third re-direct rule may re-direct access requests from a specified application (e.g., the operating system 146) to a third virtual hard disk (e.g., the VHD 147).

When the example locations mapper 504 of FIG. 5A matches parameters (e.g., the original path location, resource type, etc.) of the access request with a re-direct rule in the re-direct rules database 506, the locations mapper 504 generates an alternate location mapping to store in the alternate locations database 120. In some examples, a re-direct rule, when satisfied, may specify that an alternate location mapping should not be created (e.g., corresponding access requests are not re-directed from their original path location to an alternate path location). In some such examples, the locations mapper 504 may generate an alternate location mapping in which the original path location is also the alternate path location. An example data table 600 representing re-direct rules is shown in the illustrated example of FIG. 6.

The example re-direct rules database 506 may include system-wide rules for generating alternate location mappings. For example, a first re-direct rule may state that any access request directed to a logs folder by an operating system is to be re-directed to an alternate path location. In the illustrated example, the first re-direct rule is used to generate an alternate path location mapping to the VHD 131 encapsulating the "OS logs" folder 130. In such circumstances, the example locations mapper 504 generates an alternate location mapping to cause access requests directed to the logs folder to be re-directed to alternate path location (e.g., the VHD 131). Additionally or alternatively, one or more of the re-direct rules recorded in the example re-direct rules database 506 may be application-specific. For example, the re-direct rules database 506 may include a re-direct rule to cause access requests directed to the "logs" folder by the "Solitaire" application to be re-directed to an alternate path location (e.g., the "app logs" VHD 135), but not when an access request is directed to the logs folder 130 by another application (e.g. the word processor). An example flowchart representative of example machine-readable instructions that may be executed to implement the example locations mapper 504 is described below in connection with FIG. 7B.

The example re-direct rules database 506 of FIG. 5A may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., a flash memory). The example re-direct rules database 506 may additionally or alternatively be implemented by one or more double data rate (DDR) memories such as DDR, DDR2, DDR3, mobile DDR (mDDR), etc. The example re-direct rules database 506 may additionally or alternatively be implemented by one or more mass storage devices such as hard disk drive(s), compact disk drive(s), digital versatile disk drive(s), etc. While in the illustrated example the re-direct rules database 506 is illustrated as a single database, the re-direct rules database 506 may be implemented by any number and/or type(s) of databases.

In the illustrated example, when an access request does not satisfy a re-direct rule in the re-direct rules database 506, the example locations mapper 504 disregards the access request and another access request is processed. In the illustrated example, when an access request does not satisfy a re-direct rule, the example re-direction manager 118 forwards the access request to the original path location (e.g., the access request is processed as usual without any re-direction).

In the illustrated example, when an access request satisfies a re-direct rule in the re-direct rules database 506, the example locations mapper 504 updates (e.g., records) the alternate locations database 120 with a new alternate location mapping. In some examples, prior to re-directing the request to the alternate path location, the example locations mapper 504 performs a check and/or queries the hypervisor 108 to determine whether the alternate path location has been created and/or exists. For example, during the installation of a new application, the alternate path location(s) corresponding to the new application may not have been previously provisioned in the virtual computing environment 500. In some such examples, the hypervisor 108 provisions a VHD corresponding to the alternate path location (e.g., creates the VHD).

FIG. 6 illustrates an example data table 600 that may be employed by the example re-direct rules database 506 of FIGS. 5A and/or 5B to store re-direct rules. For example, the locations mapper 504 of FIGS. 5A and/or 5B may access the data table 600 when a path location mapping is not returned by the alternate locations database 120. The example locations mapper 504 may access the data table 600 to determine whether to create a path location mapping for the access request. The example data table 600 of FIG. 6 includes an example request originator column 605, an example parameter column 610 and an example re-direct column 620. However, any other columns representing any other conditions and/or characteristics of an access request may additionally or alternatively be used. Moreover, the example column(s) may be implemented in any other fashion. The example request originator column 605 identifies the source of an access request. The example parameter column 610 identifies a parameter (e.g., filename, partial filename, etc.) for which a re-direct rule exists. The example re-direct column 620 identifies whether an access request is to be re-directed and, thus, a path location mapping should be created for storing in the example alternate locations database 120.

The example data table 600 of the illustrated example of FIG. 6 includes three example rows 640, 650, 660, corresponding to three different re-direct rules. The example first row 640 indicates that any access request directed to a "logs" folder is to be re-directed. In some such instances, the example locations mapper 504 generates an alternate path mapping corresponding to the re-direct rule to store in the alternate locations database 120 whenever the conditions of the first row are met. As a result, subsequent access requests that specify a path location to a "logs" folder will be re-directed to the alternate path location stored in the alternate locations database 120. For example, the locations mapper 504 may generate the alternate path mappings identified in the example first, third and fourth rows 240, 260, 270 of the path location mappings shown in the illustrated example of FIG. 2.

The example second row 650 indicates that an access request directed to the "highscores.txt" file by the "Solitaire" application is to be re-directed. In some such instances, the example locations mapper 504 generates an alternate path mapping corresponding to the re-direct rule to store in the alternate locations database 120. For example, the locations mapper 504 may generate the alternate path mapping identified in the example third row 260 of the path location mappings shown in the illustrated example of FIG. 2.

The example third row 660 of FIG. 6 indicates that any access request directed to a "UserAccounts" file is not to be re-directed. Thus, subsequent access requests that specify the "UserAccounts" file will not be re-directed (e.g., will be directed to the original path location specified in the access request). For example, the locations mapper 504 may generate the alternate path mapping identified in the example second row 250 of the path location mappings shown in the illustrated example of FIG. 2. While three example re-direct rules are represented in the example data table 600 of FIG. 6, the example data table 600 may include fewer or more re-direct rules.

As noted above, FIG. 5B illustrates an example lightweight modularized virtualization system constructed using a container-based architecture instead of a virtual machine-based architecture. The example of FIG. 5B is similar to the example of FIG. 5A. However, in the example of FIG. 5B, the example storage manager is executed on the host operating system 154 and the modularized virtualization topology is reflected within the container 161 instead of in the first VM 111. Subject to these differences, the above description of FIG. 5A is applicable to the example of FIG. 5B.

While an example manner of implementing the example storage manager 504 is illustrated in FIG. 5A and FIG. 5B, one or more of the elements, processes and/or devices illustrated in FIGS. 5A and/or 5B may be combined, divided, re-arranged, omitted, eliminated and/or implemented in any other way. Further, the example request collector 116, the example buffer 117, the example alternate locations database 120, the example locations mapper 504, the example re-direct rules database 506 and/or, more generally, the example storage manager 502 of FIGS. 5A and/or 5B may be implemented by hardware, software, firmware and/or any combination of hardware, software and/or firmware. Thus, for example, any of the example request collector 116, the example buffer 117, the example alternate locations database 120, the example locations mapper 504, the example re-direct rules database 506 and/or, more generally, the example storage manager 502 of FIGS. 5A and/or 5B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request collector 116, the example buffer 117, the example alternate locations database 120, the example locations mapper 504, the example re-direct rules database 506 and/or, more generally, the example storage manager 502 of FIGS. 5A and/or 5B is/are hereby expressly defined to include a tangible computer readable storage device or storage disk such as a memory, a digital versatile disk (DVD), a compact disk (CD), a Blu-ray disk, etc. storing the software and/or firmware. Further still, the example storage manager 502 of FIGS. 5A and/or 5B may include one or more elements, processes and/or devices in addition to, or instead of, those illustrated in FIGS. 5A and/or 5B, and/or may include more than one of any or all of the illustrated elements, processes and devices.

Figure 7A:
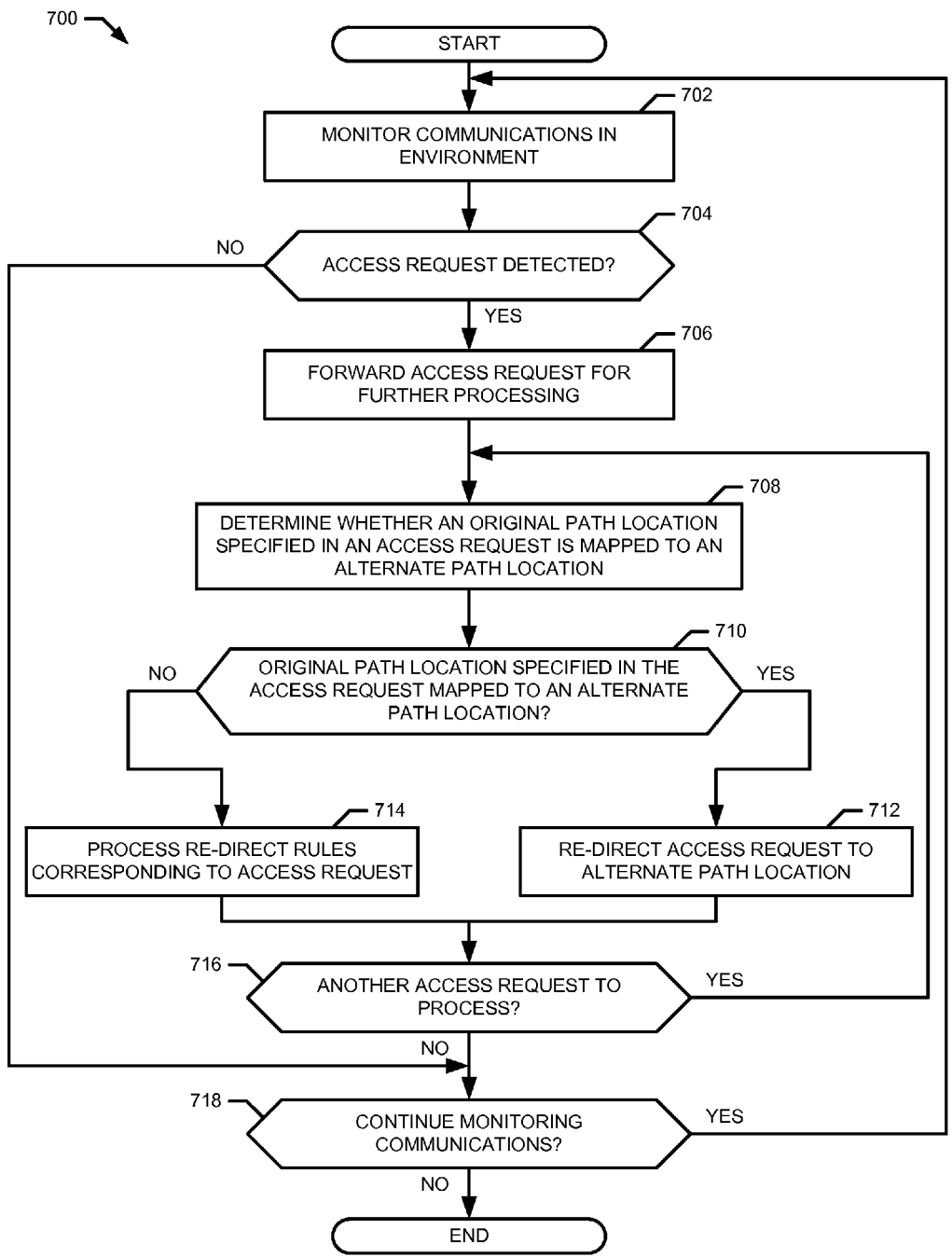
FIG. 7A and FIG. 7B are flowcharts representative of example machine-readable instructions that may be executed to generate alternate path location mappings in the environments of FIG. 5A or FIG. 5B.
Figure 7B:
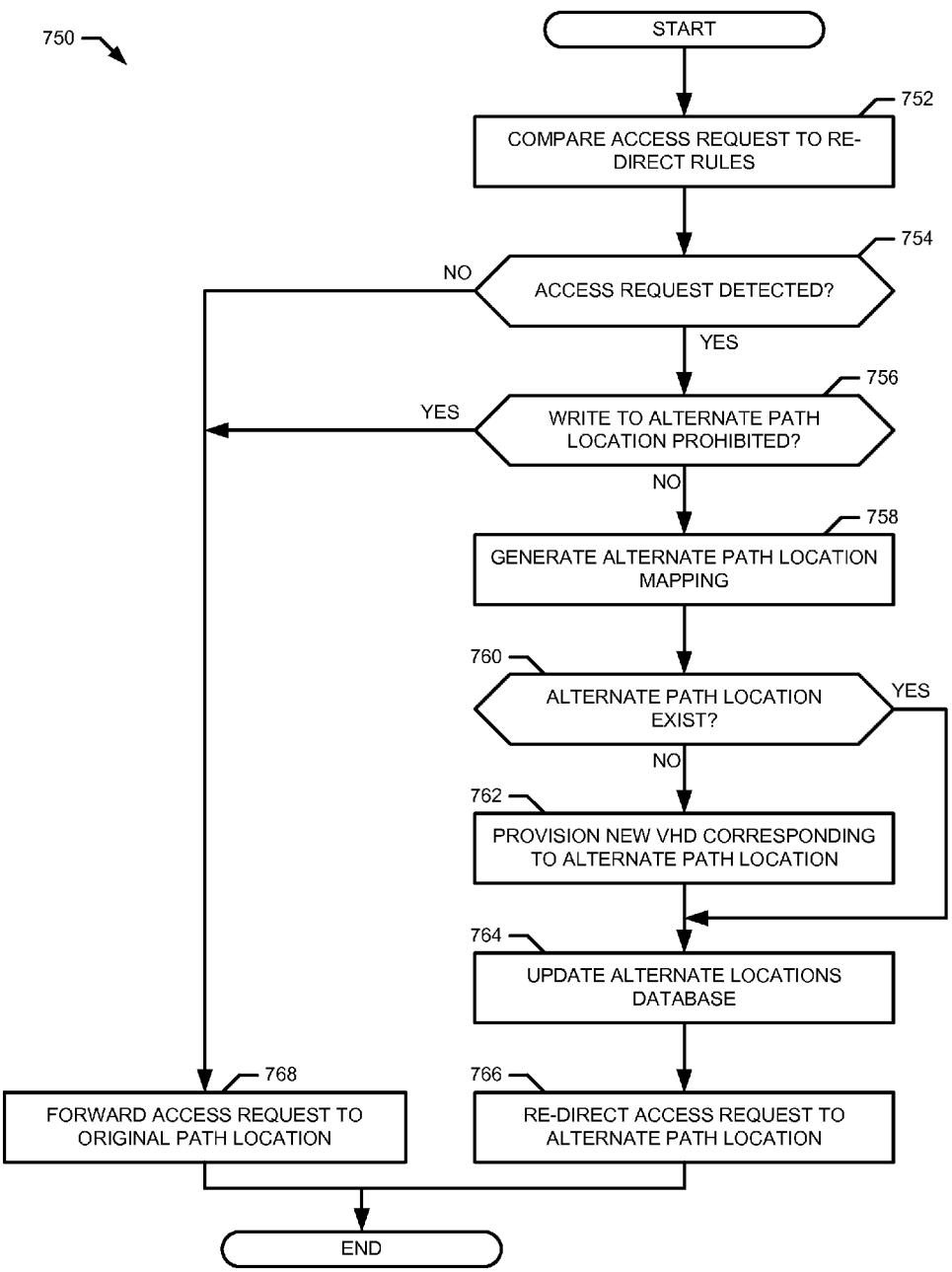

Flowcharts representative of example machine readable instructions for implementing the storage manager 502 of FIGS. 5A and/or 5B are shown in FIG. 7A and FIG. 7B. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 7A and/or 7B, many other methods of implementing the example storage manager 502 may alternatively be used. For example, the order of execution of the blocks may be changed, and/or some of the blocks described may be changed, eliminated, or combined.

As mentioned above, the example processes of FIGS. 7A and/or 7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7A and/or 7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7A and FIG. 7B are flowcharts representative of example machine-readable instructions 700 and 750, respectively, that may be executed to implement the example storage manager 502 of FIGS. 5A and/or 5B. The example instructions 700 of the illustrated example of FIG. 7A begin at block 702 when the example storage manager 114 monitors communications in the virtual computing environment 100. For example, the request collector 116 (FIGS. 5A and/or 5B) intercepts (e.g., traps and/or hooks) communications within the virtual computing environment 500. Such communications may be, for example, access requests between the example hypervisor 108 and the example virtual machine 111 provisioned by the hypervisor 108. At block 704, the example request collector 116 determines whether an intercepted communication is an access request. For example, the request collector 116 may parse the communication and determine the communication is an access request when the syntax of the communication matches a write request syntax or when the syntax of the communication matches a read request syntax. If, at block 704, the request collector 116 determined that the communication was not an access request (e.g., an access request was not detected), then control proceeds to block 718 to determine whether to continue or not to continue monitoring communications for an access request.

If, at block 704, the request collector 116 detected an access request, then, at block 706, the request collector 116 forwards the access request to the re-direction manager 118 (FIGS. 5A and/or 5B) for further processing. At block 708, the example re-direction manager 118 determines whether the original path location specified in the access request is mapped to an alternate path location. For example, the re-direction manager 118 may query the path locations mappings shown in the example data table 200 of FIG. 2. If, at block 710, the example re-direction manager 118 determined that the original path location is mapped to an alternate path location (e.g., the alternate locations database 120 returned an alternate path location for requests from the request originator), then, at block 712, the example re-direction manager 118 re-directs the access request to the alternate path location.

If, at block 710, the example re-direction manager 118 determined that the original path location was not mapped to an alternate path location for requests from the request originator, then, at block 714, the example storage manager 502 processes re-direct rules corresponding to the access request. For example, the example locations mapper 504 (FIGS. 5A and/or 5B) of the storage manager 502 may determine whether to update the alternate locations database 120 by adding a new alternate path location mapping in the alternate locations database 120. In some such examples, when the locations mapper 504 determines to update the alternate locations database 120, then the locations mapper 504 generates the alternate path location mapping (e.g., based on the parameters of the re-direct rule) and updates the alternate locations database 120 to include the generated alternate path location mapping. In some examples when the locations mapper 504 determines not to re-direct the access request, the example storage manager 502 forwards (e.g., directs) the access request to the original path location specified in the access request.

At block 716, the example re-direction manager 118 and/or the example locations mapper 504 determines whether another access request to process is received. If, at block 716, the re-direction manager 118 and/or the locations mapper 504 determines that there is another access request to process, control returns to block 708 to determine whether the original path location specified in the new access request is mapped to an alternate path location for requests from the request originator.

If, at block 716, the example re-direction manager 118 determined that there was not another access request to process, or after the request collector 116 determined that an intercepted communication was not an access request at block 704, then, at block 718, the storage manager 502 determines whether to continue monitoring for communications. If, at block 718, the storage manager 502 determined to continue monitoring for communications, then control returns to block 702 to continue monitoring communications in the virtual computing environment 500 for an access request. If, at block 718, the storage manager 502 determined not to continue monitoring the virtual computing environment 500 for communications, the example program 700 of FIG. 7A ends.

FIG. 7B is a flowchart representative of example machine-readable instructions 750 that may be executed to implement the example storage manager 502 of FIGS. 5A and/or 5B to generate an alternate path location mapping to store in the alternate locations database 120. For example, during a new installation of an application and/or a migration to a modularized virtualized topology as disclosed herein, path location mappings to re-direct access requests from an original path location (specified in the access request) to an alternate path location may not exist and/or may not have been created. The example locations mapper 504 of FIGS. 5A and/or 5B may then populate the alternate locations database 120 with the new alternate path location mappings.

The example instructions 750 of FIG. 7B may be used to implement block 714 of FIG. 7A. The example instructions 750 of the illustrated example of FIG. 7B begin at block 752 when storage manager 502 compares an access request to re-direct rules stored in the example re-direct rules database 506 (FIGS. 5A and/or 5B). For example, using the original path location specified in the access request, the locations mapper 504 (FIGS. 5A and/or 5B) may query the re-direct rules shown in the example data table 600 of FIG. 6. If, at block 754, the re-direct rules database 506 does not return a match, then, at block 768, the storage manager 502 forwards the access request to the original path location specified in the access request. The example process 750 of FIG. 7B then ends.

If, at block 754, the re-direct rules database 506 did return a match, then, at block 756, the example locations mapper 504 determines whether or not the alternate path location associated with the re-direct rule is write protected. For example, an alternate path location associated with an operating system logs folder (e.g., the example VHD 131 encapsulating the example "OS logs" folder 130) may be write protected while an alternate path location associated with an application (e.g., the example VHD 135 encapsulating the example "app logs" folder 134) may not be write protected. If, at block 756, the locations mapper 504 determined that the alternate path location is write protected, then control proceeds to block 768 to forward the access request to the original path location specified in the access request.

If, at block 756, the example locations mapper 504 determined that the alternate path location is not write protected, then, at block 758, the locations mapper 504 generates an alternate path location mapping to store, for example, in the alternate locations database 120. At block 760, the locations mapper 504 determines whether the virtual hard disk to be located at the alternate path location exists and/or has been created. For example, during a migration of an application to a modularized virtualization topology, not only may there be no alternate path location mappings in the alternate locations database 120, the virtual hard disk to be located at those path addresses may not exist (e.g., have not been provisioned). If, at block 760, the locations mapper 504 determines that the VHD does not exist, then, at block 762, the example locations mapper 504 facilitates the provisioning of a new VHD corresponding to the alternate path location. For example, the locations mapper 504 may request the example hypervisor 108 (FIG. 5A) to instantiate a new VHD in the virtual computing environment 500. At block 764, the locations mapper 504 updates the alternate locations database 120 to include the new path location mapping the original path to the new VHD. At block 766, the storage manager 502 re-directs the access request to the alternate path location. For example, the re-direction manager 118 and/or the locations mapper 504 may re-direct the access request to the VHD at the alternate path location in the virtual computing environment 500. The example instructions 750 of FIG. 7B then ends (e.g., control advances to block 716 of FIG. 7A).

Figure 8:
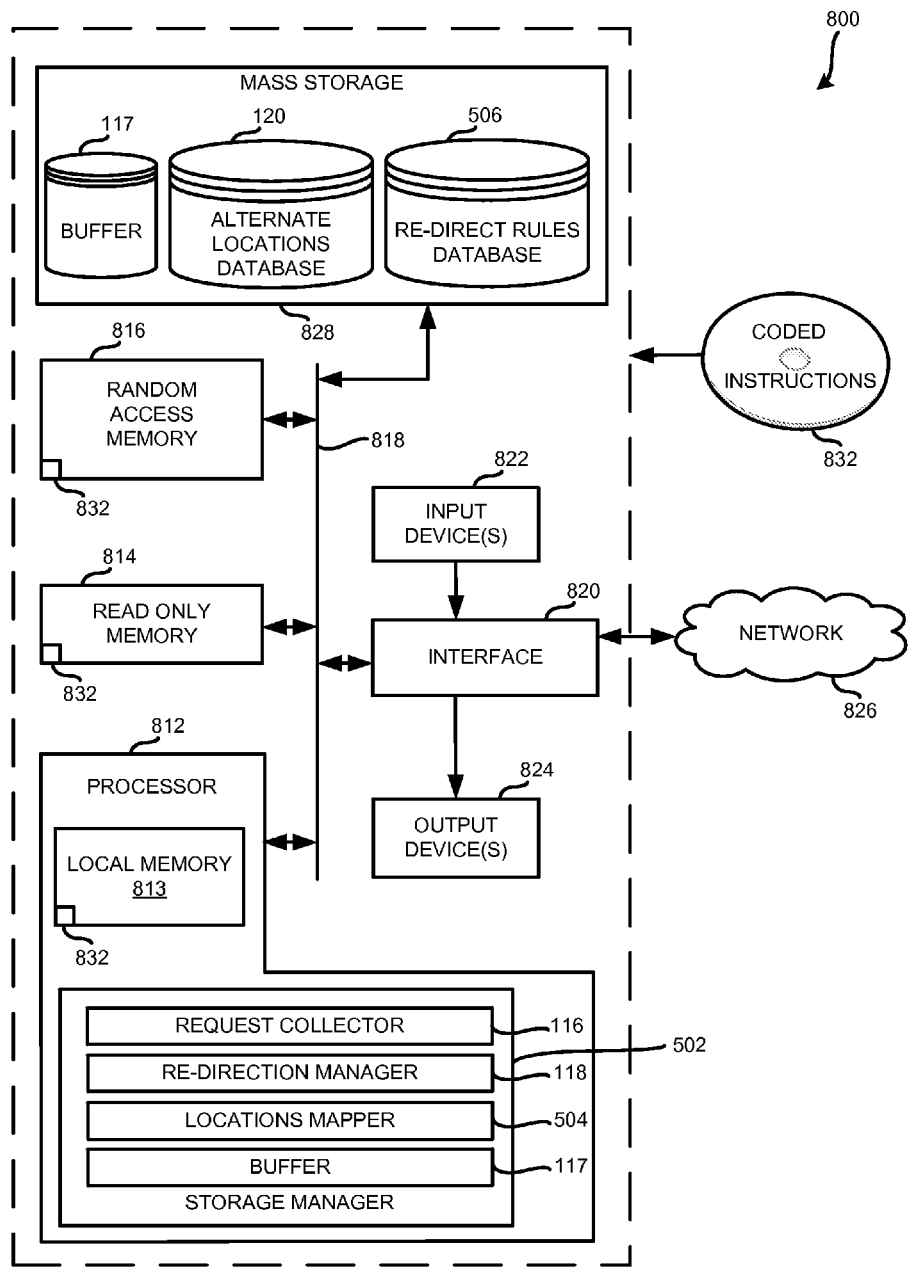
FIG. 8 is a block diagram of an example storage manager structured to execute the example machine-readable instructions of FIGS. 7A and/or 7B to implement the example locations mapper of FIG. 5A or FIG. 5B.

FIG. 8 is a block diagram of an example processor platform 800 capable of executing the instructions of FIGS. 7A and/or 7B to implement the storage manager 502 of FIGS. 5A and/or 5B. The processor platform 800 can be, for example, a server, a personal computer, or any other type of computing device. The processor platform 800 of FIG. 8 may represent, for example, the physical resources on which the hypervisor 108, the virtual machine(s) and/or the container(s) are instantiated.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example executes the instructions to implement the example request collector 116, the example buffer 117, the example locations mapper 504 and/or, more generally, the storage manager 502. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example mass storage 828 implements the example buffer 117, the example alternate locations database 120 and the example re-direct rules database 506. Although the example buffer 117 of FIG. 8 is illustrated in the example processor 812 and the example mass storage 828, the example buffer 117 can be in either or both locations.

Coded instructions 832 representative of the machine-readable instructions of FIGS. 7A and/or 7B may be stored in the mass storage device 828, in the volatile memory 814, in the non-volatile memory 816, and/or on a removable tangible computer readable storage medium such as a CD or DVD.

Figure 9A:
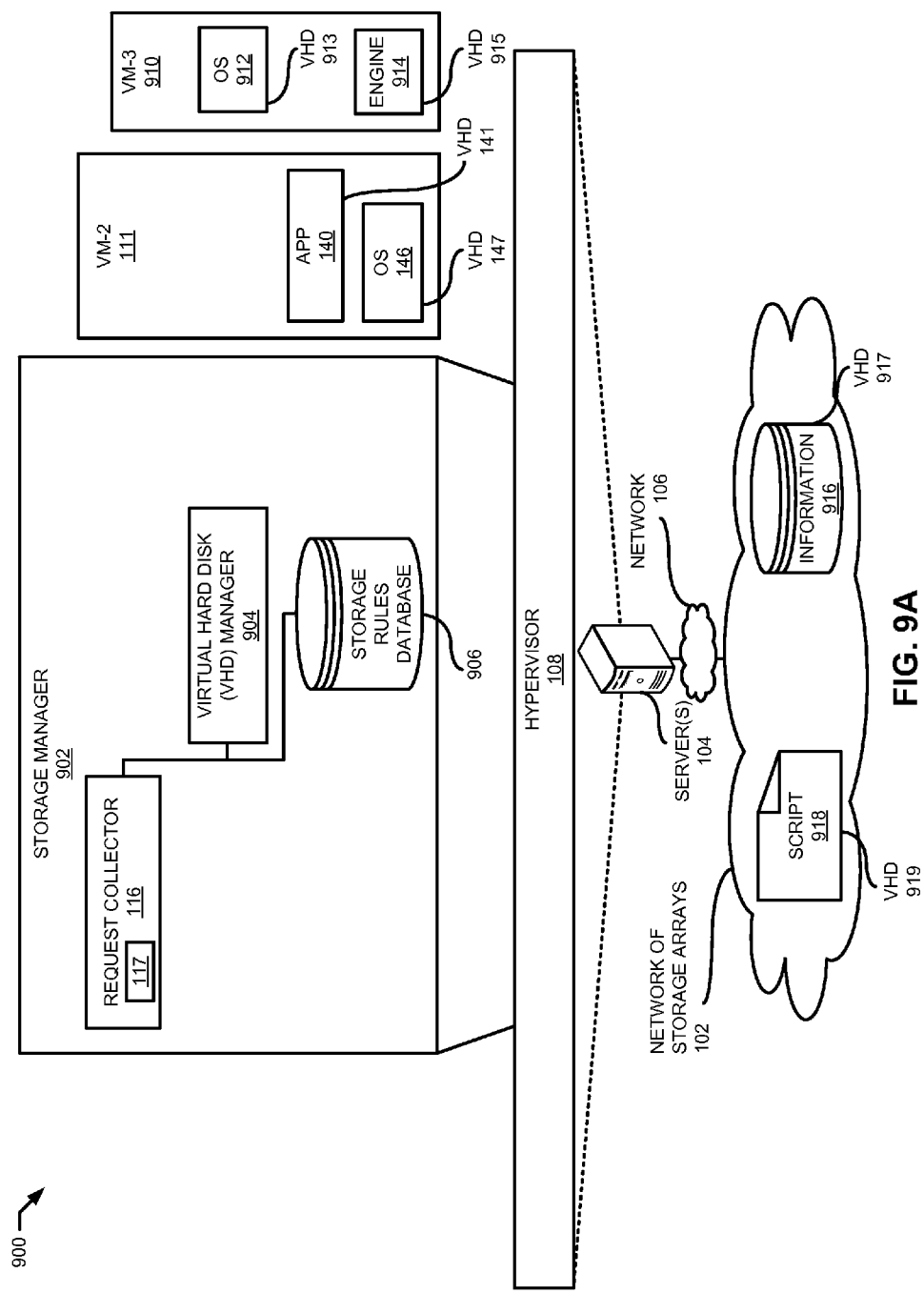
FIG. 9A is a diagram of an example virtual computing environment constructed in accordance with the teachings of this disclosure to manage inter-virtual hard disk relations in a modularized virtualization topology using virtual hard disks.

FIG. 9A illustrates an example virtual computing environment 900 including an example storage manager 902 and an example third virtual machine (VM-3) 910. Other than the storage manager 902 and the third virtual machine 910, the example of FIGS. 1A and 9A are similar. Thus, the discussion of like numbered components in FIG. 1A apply equally well to the like numbered parts of FIG. 9A and are not repeated here.

In the illustrated example of FIG. 9A, the example virtual computing environment 900 includes the example storage manager 902 to manage inter-virtual hard disk relations in a modularized virtualization topology using virtual hard disks. The example storage manager 902 of FIG. 9A includes the example request collector 116 to monitor communications within the virtual computing environment 900, an example VHD manager 904 to manage relationships and/or rules associated with the VHDs in the virtual computing environment 900, and an example storage rules database 906.

Figure 9B:
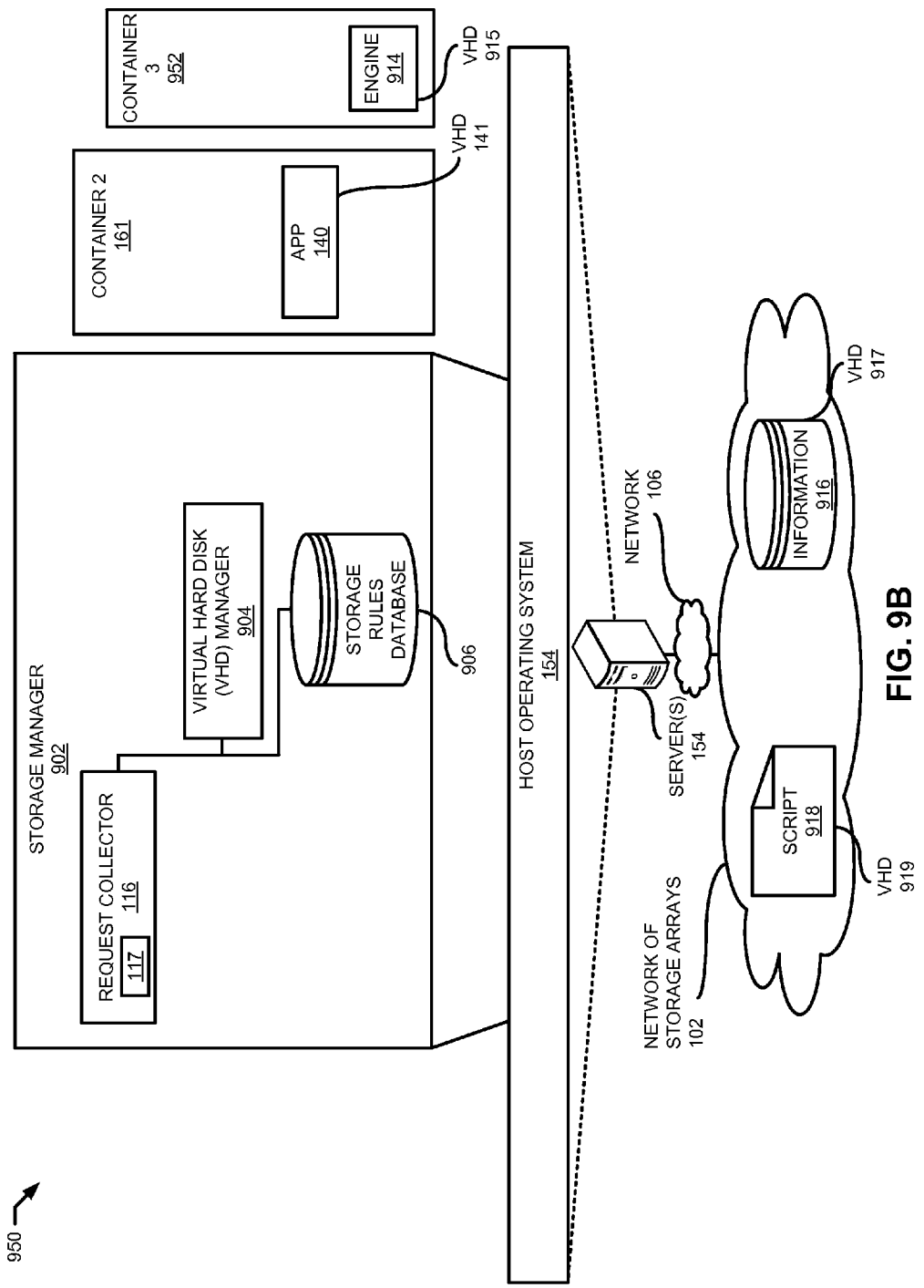
FIG. 9B is a diagram of an alternate example virtual computing environment constructed in accordance with the teachings of this disclosure to manage inter-virtual hard disk relations in a modularized virtualization topology using virtual hard disks.

FIG. 9B is an example illustrating a light-weight virtual computing environment 950 employing containers 161, 952. Other than the use of virtual machines and a hypervisor instead of containers running on a host OS, the example of FIGS. 9A and 9B are similar. Thus, the following discussion of like numbered components in FIG. 9A apply equally well to the like numbered parts of FIG. 9B and, to avoid redundancy, FIG. 9B will not be separately described.

In the illustrated example of FIG. 9A, two virtual machines are executing. A first virtual machine 111 is similar to the virtual machine 111 of FIG. 1A. The example second virtual machine 910, like the first VM 111, employs a modularized virtualization topology as disclosed herein. In the illustrated example, the resources mounted on the second virtual machine 910 are encapsulated in separate VHDs. For example, the second virtual machine 910 includes a first VHD 913 that encapsulates an operating system 912 and a second VHD 915 that encapsulates a database engine 914. In other words, every functionality executed in the second virtual machine 910 is encapsulated in its own VHD. The same is true for the first VM 111.

The example storage manager 902 may re-direct a portion of access requests intercepted within the virtual environment 900 of FIG. 9A. The example storage manager 902 of FIG. 9A includes the request collector 116 to monitor communications between the hypervisor 108 and the virtual machines 111, 910, communications between the virtual machines 111, 910, and/or communications within one of the virtual machines 111, 910. For example, the request collector 116 may intercept a communication from the hypervisor 108 to the second virtual machine 111 (e.g., trap or hook an I/O communication) and parse the communication (e.g., a message, a request, instructions, etc.) to identify an access request (e.g., a read request or a write request). For example, the request collector 116 may parse a communication and determine the communication is an access request when the syntax of the communication matches a write request syntax or when the syntax of the communication matches a read request syntax. The request collector 116 may then initiate a process to read data from and/or write data to virtual resources loaded onto the second virtual machine 111. In the illustrated example of FIG. 9A, the request collector 116 initiates the process by providing a detected access request to the example virtual hard disk (VHD) manager 904 for further processing. The request collector 116 then returns to monitoring for communications. In some examples, the request collector 116 may include and/or be in communication with an example buffer 117 to temporarily store the intercepted communications before providing them to the VHD manager 904.

As described above, the example storage manager 902 may re-direct a portion of access requests intercepted between the hypervisor 108 and the virtual machines 111, 910, communications between the virtual machines 111, 910, and/or communications within one of the virtual machines 111, 910. In this example, each VHD encapsulating a single logical functionality in accordance with the principles disclosed above.

The functionality encapsulated in a VHD may be a script (e.g., an uninstall script), a database, a directory, an application (e.g., an operating system, a computer game, etc.). As a result, multiple VHDs may be mounted and accessed in cooperation to support a service (e.g., an overall logical functionality) implemented by multiple VHDs. For example, a database service, which includes the database engine 912, database information 916, and script 918 to erase the information 916, may be encapsulated in three different VHDs in the virtual computing environment 900, rather than as a single VHD encapsulating the database service. In the illustrated example, the second VHD 915 encapsulates the database engine 914, a third VHD 917 encapsulates the database information 916, and a fourth VHD 919 encapsulates the script 918 to erase the database information 916. In the illustrated example, the third VHD 917 encapsulating the database information 916 and the fourth VHD 919 encapsulating the script 918 are available via the network of storage arrays 102.

In such an example, if the storage manager 902 intercepts an access request from the application 140 to query a database service in the virtual computing environment 900, then the database engine 914 and the database information 916 should be available (e.g., the second VHD 915 and the third VHD 917 should be mounted in a virtual machine) to enable access to the queried data. In other examples, if the storage manager 902 intercepts an access request (e.g., traps and/or hooks an I/O request) from the application 140 to erase the database information 916, all three components of the database service 914, 916, 918 should be accessible. For example, the database engine 914, encapsulated in the second VHD 915, needs to access and execute the script 918 encapsulated in the fourth VHD 919 to erase the database information 916 that is encapsulated in the third VHD 917.

In the illustrated example of FIG. 9A, the VHD manager 904 queries the example storage rules database 906 to identify relationships and/or rules governing relationships between VHDs (e.g., VHDs used in cooperation to support the same service) and to manage such relationships. In the illustrated example, the storage rules database 906 includes storage rules that associate access requests with response actions. The example VHD manager 904 generates response actions based on the storage rules to manage the corresponding relationships between VHDs. For example, in response to an access request to write to the database information 916, the example VHD manager 904 may query the storage rules database 906 for relationships and/or rules associated with the database information 916 and/or the VHD 917 encapsulating the database information 916. In response to the query, the storage rules database 906 may return response actions that include, for example, (1) determining whether the database engine 914 is accessible to write to the database information 916 (e.g., determining whether the second VHD 915 and the third VHD 917 are loaded on a VM) and, (2) if the appropriate VHDs 915, 917 are not available, to mount the second VHD 195 and/or the third VHD 917. For example, if in the illustrated example of FIG. 9A, the third virtual machine 910 includes the first VHD 913 and the second VHD 915 but not the third VHD 917, in response to the response actions returned from the storage rules database 906, the example VHD manager 904 may mount the third VHD 917 (from the network of storage arrays 102) to the third VM 910 to enable writing to the database information 916.

In some examples, the storage rules correspond to dependencies between VHDs. For example, the third virtual machine 910 of the example of FIG. 9A is loaded with the first VHD 913 (e.g., the VHD encapsulating the operating system 912) and the second VHD 915 (e.g., the VHD encapsulating the database engine 914). Assuming the database engine 914 cannot function without the operating system 912 (e.g., the second VHD 915 is dependent on the first VHD 913), if the VHD manager 904 receives a request to remove (e.g., dis-mount) the first VHD 913 from the third virtual machine 910, then the VHD manager 904 may automatically dis-mount the second VHD 915 from the third virtual machine 910. For example, if the database engine 914 is dependent on a library that is included with the operating system 912, and the first VHD 913 is removed from the third virtual machine 910, then the VHD manager 904 may also remove the second VHD 915 encapsulating the database engine 914. An example data table 1000 representing storage rules based on inter-VHD dependencies is shown in FIG. 10.

In some examples, the response actions may be based on conditions. For example, when the VHD manager 904 matches the access request with a storage rule in the storage rules database 906, the VHD manager 904 may determine whether a condition associated with the access request is satisfied. In some such examples, the response action may depend on whether the condition is satisfied (e.g., true/false, valid/invalid, etc.). For example, a first storage rule may assert that two particular VHDs cannot be mounted on the same virtual machine at the same time. For example, the example first storage rule may specify that two operating systems cannot be loaded on the same virtual machine at the same time. In the illustrated example, if, for example, the VHD manager 904 receives a request (e.g., from the request collector 116) to load the operating system 146 to the third virtual machine 910 (e.g., to mount the VHD 147 to the third virtual machine 910), the example VHD manager 904 may automatically refuse the mounting of the VHD 147 to the third virtual machine 910.

In the illustrated example, response actions returned in response to the first storage rule cause the VHD manager 904 to refuse to mount the VHD 147 to the third VM 910 because the third VM 910 already includes the operating system 912. In other examples, if the request to mount the VHD 147 is received while the example first VHD 913 is not mounted to the third VM 910, the example VHD manager 904 may permit mounting the VHD 147, which is encapsulating the operating system 912, to the third VM 910. An example data table 1100 representing storage rules based on inter-VHD relationships is shown in FIG. 11. An example flowchart representative of example machine-readable instructions that may be executed to implement the example storage manager 902 is described below in connection with FIG. 12.

An example benefit of the example VHD manager 904 of FIGS. 9A and 9B is that the VHD manager 904 enables a service (e.g., a database) and/or overall logical functionality sought to be achieved to be represented by multiple VHDs in the virtual computing environment 900. For example, in the above example, a database service is represented as three inter-related VHDs 915, 917, 919. The VHD manager 904 then manages the mounting and/or dis-mounting of VHDs in the environment in real-time so that, when requested, a service is able to properly perform. For example, the VHD manager 904 manages the mounting and/or dis-mounting of VHDs in the virtual computing environment 900 so that the one or more VHDs needed to perform a service are available and do not conflict in operation (e.g., two operating system VHDs mounted in the same VM would conflict).

The VHD 904 manager also manages the VHDs in the virtual computing environment 900 so that VHDs that are not necessary for performing a service are removed (e.g., dis-mounted). This approach is beneficial because it avoids the presence of unnecessary services (e.g., VHDs that will not be used), but that can impose a security risk or extra management burden. In addition, the example VHD 904 of FIG. 9A prevents the mounting and/or dis-mounting of VHDs that would render a service inoperable. For example, if a request to dis-mount the third VHD 917 encapsulating the database information 916 is received, referencing the storage rules in the example storage rules database 906, the VHD manager 904 may prevent the dis-mounting of the VHD 917 while the database engine 914 is accessing the database information 916.

The example storage rules database 906 of FIG. 9A employs storage rules that are queried by the example VHD manager 904. In some examples, the storage rules are pre-populated. For example, a developer of a service implemented with a modularized virtualization topology may populate the storage rules database 906 with inter-VHD relations and/or dependencies that correspond to the one or more VHD(s) encapsulating their service. In some examples, the storage rules may be expressed as metadata associated with the virtual hard disk. For example, metadata associated with a virtual hard disk may define one or more response action(s) which are to be executed in response to access requests corresponding to the functionality and/or data sets encapsulated by the virtual hard disk.

The example storage rules database 906 of FIG. 9A may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., a flash memory). The example storage rules database 906 may additionally or alternatively be implemented by one or more double data rate (DDR) memories such as DDR, DDR2, DDR3, mobile DDR (mDDR), etc. The example storage rules database 906 may additionally or alternatively be implemented by one or more mass storage devices such as hard disk drive(s), compact disk drive(s), digital versatile disk drive(s), etc. While in the illustrated example storage rules database 906 is illustrated as a single database, the storage rules database 906 may be implemented by any number and/or type(s) of databases.

FIG. 10 illustrates an example data table 1000 that may be stored by the example storage rules database 906 of FIG. 9A to store storage rules directed to the dependencies of the VHDs in the virtual computing environment 900. For example, the VHD manager 904 of FIG. 9A may access the data table 1000 when an access request to mount a VHD is intercepted (e.g., trapped and/or hooked) by the request collector 116. The example VHD manager 904 may process the access request and, when condition(s) associated with the request are satisfied, generate corresponding response actions. For example, if an access request to write to database information encapsulated in a VHD is detected, then a response action may be to (1) first mount a VHD encapsulating the database engine to a virtual machine and then (2) mount the database information VHD to the virtual machine.

The example data table 1000 of FIG. 10 includes an example request column 1010, an example condition(s) column 1015 and an example response action(s) column 1020. The example request column 1010 indicates the access request being processed by the VHD manager 904. The example condition(s) column 1015 indicates a condition associated with an access request that must be satisfied before any response action is generated. The example response action(s) column 1020 indicates an example response action associated with the identified storage rule. However, any other columns representing any other conditions and/or characteristics of the access request may additionally or alternatively be used. Moreover, the example column(s) of the example data table 1000 may be implemented in any other fashion (e.g., using a different data structure).

The example data table 1000 of the illustrated example of FIG. 10 includes four example rows 1030, 1040, 1050, 1060 corresponding to four different storage rules directed to inter-VHD dependencies. The example first row 1030 indicates that a storage rule corresponds to access requests to "mount VHD A to VM-A." If an access request to "mount VHD A to VM-A" is intercepted by the request collector 116 and provided to the VHD manager 904, and a condition "request to populate a database" is satisfied, four response actions are sequentially generated, namely: 1. Mount VHD B to VM-A, 2. Execute install script from VHD B, 3. Dis-mount VHD B, and 4. Mount VHD A to VM-A. For example, access to VHD A (e.g., instructions to populate a database) may depend on there being a database to populate. Thus, instructions to instantiate a database (encapsulated in VHD B) are executed before the database is populated.

The example second row 1040 indicates that a storage rule corresponds to access requests to "mount VHD C to VM-A." In the illustrated example, if an access request to "mount VHD C to VM-A" is intercepted, and the condition that the request be a request to "write to VHD C" is satisfied, two response actions are sequentially generated, namely: 1. Mount VHD D to VM-B, and 2. Mount VHD C to VM-A. For example, VHD D may be a redundant node to the VHD C in a high-availability system. In some such instances, when the VHD C is mounted to a VM-A (e.g., to access information (e.g., a database) encapsulated in the VHD C), its redundant node (e.g., the VHD D) is also mounted on a different virtual machine (e.g., the VM-B) to enable copying modifications made to the information encapsulated in the VHD C to its redundant node.

The example third row 1050 indicates that a storage rule corresponds to access requests to "mount VHD E to VM-A." In the illustrated example, if an access request to "mount VHD E to VM-A" is intercepted, and the condition that the access request is "a first write to a node with backup" is satisfied, three response actions are sequentially generated, namely: 1. Deploy new VM-C instance, 2. Mount VHD F to VM-C, and 3. Mount VHD E to VM-A. For example, VHD F may be a redundant node (e.g., a backup of VHD E). The first time at which data is written to the original VHD E, a new virtual machine (e.g., the VM-C) is instantiated and then the backup node (e.g., the VHD F) is mounted to the newly instantiated VM-C.

The example fourth row 1060 indicates that a storage rule corresponds to access requests to "mount VHD G to VM-A on Hypervisor-1." In the illustrated example, if an access request to "mount VHD G to VM-A on Hypervisor-1" is intercepted, and the condition that the access request is "a first write to a node with backup" is satisfied, three response actions are generated, namely: 1. Deploy new VM-C instance on Hypervisor-2, 2. Mount VHD H to VM-C on Hypervisor-2, and 3. Mount VHD G to VM-A on Hypervisor-1. As shown in the example fourth row 1060, the storage manager 902 may manage virtual resources beyond the hypervisor that it is associated with (e.g., a component of, provisioned by, etc.). For example, the backup of VHD G may be stored in a different virtual computing environment.

While four example storage rules directed to dependencies are represented in the example data table 1000 of FIG. 10, more or fewer storage rules directed to dependencies may be used (e.g., a request to mount a first VHD results in a second VHD also being mounted). In addition, while the four example storage rules represented in the example data table 1000 of FIG. 10 are directed to mounting a VHD to a virtual machine (e.g., the VM-A), the virtual machine may represent a cluster of virtual machines. For example, when a virtual machine includes a mirror site (e.g., a redundant node), the virtual machine and the mirror site are implemented as a cluster of virtual machines. In some such examples, a storage rule that applies to the virtual machine applies to the cluster of virtual machines (e.g., also applies to the mirror site).

FIG. 11 illustrates an example data table 1100 that may be stored by the example storage rules database 906 of FIGS. 9A and/or 9B to store storage rules directed to relationships between VHDs in the virtual computing environment 900. For example, the VHD manager 904 of FIGS. 9A and/or 9B may access the data table 1100 when an access request to mount a VHD is intercepted. Response actions in the example data table 1100 depend on whether conditions associated with different VHD(s) are satisfied. For example, if an access request to install an application that only executes on a first operating system is intercepted by the request collector 116 and provided to the VHD manager 904, the VHD manager 904 may perform a check (e.g., test) to determine whether a first VHD encapsulating the first operating system is mounted to a virtual machine. If the first VHD is mounted on a virtual machine, then the VHD manager 904 may mount a second VHD encapsulating the application to the virtual machine on which the first VHD is mounted. Additionally or alternatively, if a third VHD encapsulating a second operating system is instead mounted on the virtual machine, the response actions may include (1) dis-mounting the third VHD from the virtual machine, (2) mounting the first VHD encapsulating the first operating system, and (3) mounting the second VHD to the virtual machine. Additionally or alternatively, if the first VHD encapsulating the first operating system is not mounted on a virtual machine, the response action may be to disregard the request (e.g., refuse) to mount the second VHD on the virtual machine. In other examples, the VHD manager 904 may mount the second VHD to the virtual machine but not enable (e.g., power on) the second VHD.

The example data table 1100 includes an example request column 1110, an example condition(s) column 1120 and an example response action(s) column 1130. The example request column 1110 indicates the access request being processed by the VHD manager 904. The example condition(s) column 1120 indicates a condition associated with an access request that is satisfied before any example response action associated with the identified access request is generated. For example, the VHD manager 904 may compare configuration information of the virtual computing environment 900 to the condition identified in the example condition(s) column 1120. While, in the illustrated example, the conditions are based on mounted VHDs, any other configuration information may additionally or alternatively be used such as, for example, system configuration settings, open and/or mounted devices, installed software, program state/configuration information, privileges, etc. The example response action(s) column 1130 indicates an example response action associated with the identified storage rule based on whether or not the identified condition is satisfied. However, any other columns representing any other conditions and/or characteristics of the access request and/or conditions may additionally or alternatively be used.

The example data table 1100 of the illustrated example of FIG. 11 includes four example rows 1140, 1150, 1160, 1170, corresponding to four different storage rules directed to inter-VHD relationships between VHDs in the virtual computing environment 900. The example first row 1140 indicates that a storage rule corresponds to access requests to "mount VHD B to VM-A." To determine the appropriate response action(s) to generate in response to access requests to "mount VHD B to VM-A", a determination is made whether the condition "VHD A mounted to VM-A" is satisfied. In the illustrated, when the condition is satisfied (e.g., the VHD A is mounted to the VM-A), then the VHD manager 904 generates the response action to refuse to mount VHD B to VM-A. For example, assume VHD A encapsulates a first operating system and VHD B encapsulates a second operating system, while the example VM-A may only execute one operating system at a time. In some such examples, the example first row 1140 specifies that while the first operating system is loaded on the VM-A, the second operating system cannot be installed on the VM-A. In the illustrated example, when the condition is not satisfied (e.g., the VHD A is not mounted to the VM-A), then the VHD manager 904 generates the response action to "mount VHD B to VM-A."

The example second row 1150 indicates that a storage rule corresponds to access requests to "mount VHD D to VM-A." To determine the appropriate response action(s) to generate in response to an access request to "mount VHD D to VM-A," a determination is made whether the condition "VHD A mounted to VM-A" is satisfied. In the illustrated example, when the condition is satisfied (e.g., the VHD A is mounted to the VM-A), then the VHD manager 904 sequentially generates two response actions, namely: 1. Dis-mount VHD A, and 2. Mount VHD D to VM-A. For example, VHD D may encapsulate a different (e.g., an updated) version of an application that is also encapsulated in VHD A. In the illustrated example, the mounted VHD A (e.g., the obsolete version) is dis-mounted from the VM-A before the VHD D (e.g., the updated version) is mounted to the VM-A. In the illustrated example, when the condition is not satisfied (e.g., the VHD A is not mounted to the VM-A), then the VHD manager 904 generates the response action to "mount VHD D to VM-A."

The example third row 1160 indicates that a storage rule corresponds to access requests to "mount VHD F to VM-B." To determine the appropriate response action(s) to generate in response to an access request to "mount VHD F to VM-B," a determination is made whether the condition "VHD A mounted to VM-A" is satisfied. In the illustrated example, when the condition is satisfied (e.g., the VHD A is mounted to the VM-A), then the VHD manager 904 generates the response action to mount VHD F to VM-B. For example, assume VM-A and VM-B execute a first operating system, VHD A is an application that executes on the first operating system while VHD F is an application that executes on a second operating system. In such circumstances, while VHD A is mounted (e.g., on the first operating system), VHD F cannot be mounted onto VM-B because it requires a different operating system. In the illustrated example, when the condition is not satisfied (e.g., the VHD A is not mounted to the VM-A), then the VHD manager 904 generates the response action to "mount VHD F to VM-B."

The example fourth row 1170 indicates that a storage rule corresponds to access requests to "mount VHD H to VM-B." To determine the appropriate response action(s) to generate in response to an access request to "mount VHD H to VM-B," a determination is made whether the condition "VHD A mounted to VM-A" is satisfied. In the illustrated example, when the condition is satisfied (e.g., the VHD A is mounted to the VM-A), then the VHD manager 904 sequentially generates two response actions, namely: 1. Dis-mount VHD A from VM-A, and 2. Mount VHD H to VM-B. For example, VHD H may be an upgraded version of a database application on VHD A, and VM-B may be an upgraded version of a database application server of VM-A. In such circumstances, to perform the upgrade of the database service, the old version of the database service in VHD A on VM-A must first be dis-mounted. In the illustrated example, when the condition is not satisfied (e.g., the VHD A is not mounted to the VM-A), then the VHD manager 904 generates the response action to "mount VHD H to VM-B."

While four example storage rules are represented in the example data table 1100 of FIG. 11, more or fewer storage rules may be provided in the example data table 1100.

As noted above, FIG. 9B illustrates an example lightweight modularized virtualization system constructed using a container-based architecture instead of a virtual machine-based architecture. The example of FIG. 9B is similar to the example of FIG. 9A. However, in the example of FIG. 9B, the example storage manager is executed on the host operating system 154 and the modularized virtualization topology is reflected within containers instead of in virtual machines. Subject to these differences, the above description of FIG. 9A is applicable to the example of FIG. 9B.

While an example manner of implementing the example storage manager 902 is illustrated in FIG. 9A and FIG. 9B, one or more of the elements, processes and/or devices illustrated in FIGS. 9A and/or 9B may be combined, divided, re-arranged, omitted, eliminated and/or implemented in any other way. Further, the example request collector 116, the example buffer 117, the example VHD manager 904, the example storage rules database 906 and/or, more generally, the example storage manager 902 of FIGS. 9A and/or 9B may be implemented by hardware, software, firmware and/or any combination of hardware, software and/or firmware. Thus, for example, any of the example request collector 116, the example buffer 117, the example VHD manager 904, the example storage rules database 906 and/or, more generally, the example storage manager 902 of FIGS. 9A and/or 9B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request collector 116, the example buffer 117, the example VHD manager 904, the example storage rules database 906 and/or, more generally, the example storage manager 902 of FIGS. 9A and/or 9B is/are hereby expressly defined to include a tangible computer readable storage device or storage disk such as a memory, a digital versatile disk (DVD), a compact disk (CD), a Blu-ray disk, etc. storing the software and/or firmware. Further still, the example storage manager 902 of FIGS. 9A and/or 9B may include one or more elements, processes and/or devices in addition to, or instead of, those illustrated in FIGS. 9A and/or 9B, and/or may include more than one of any or all of the illustrated elements, processes and devices.

Figure 12:
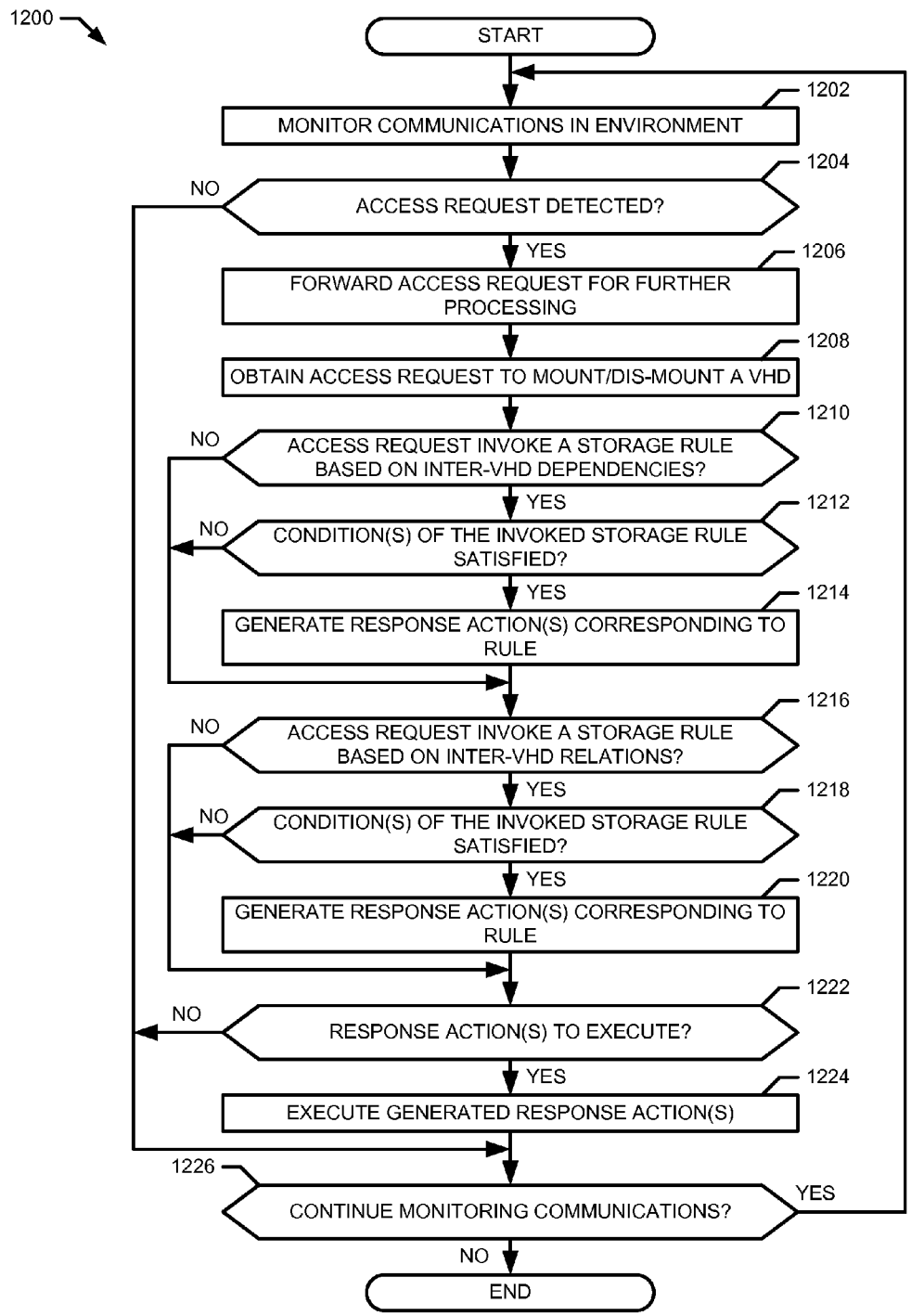
FIG. 12 is a flowchart representative of example machine-readable instructions that may be executed to manage inter-virtual hard disk relations in the environments of FIG. 9A or FIG. 9B.

A flowchart representative of example machine readable instructions for implementing the storage manager 902 of FIGS. 9A and/or 9B is shown in FIG. 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example storage manager 902 may alternatively be used. For example, the order of execution of the blocks may be changed, and/or some of the blocks described may be changed, eliminated, or combined.

As mentioned above, the example processes of FIG. 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 12 is a flowchart representative of example machine-readable instructions 1200 that may be executed by the example storage manager 902 of FIGS. 9A and/or 9B to manage inter-virtual hard disk relations in the virtual computing environment 900 using virtual hard disks. For example, the VHD manager 904 (FIGS. 9A and/or 9B) maintains the integrity of an overall functionality and/or service by determining whether or not the correct VHDs in the virtual computing environment 900 are mounted to and/or dis-mounted from virtual machines at the appropriate time(s). For example, to mount a first VHD encapsulating an application, a second VHD encapsulating an operating system may also need to be mounted. In such circumstances, the functioning of the first VHD depends on the second VHD. Additionally or alternatively, to mount the first VHD to a virtual machine, a third VHD encapsulating a second operating system may first need to be dis-mounted from the virtual machine before the second VHD and the first VHD can be mounted to the virtual machine.

The instructions 1200 of the illustrated example of FIG. 12 begin at block 1202 when the example storage manager 902 monitors communications in the virtual computing environment 900. For example, the request collector 116 (FIGS. 9A and/or 9B) intercepts (e.g., traps and/or hooks) communications within the virtual computing environment 900 for access requests between the example hypervisor 108 and the example virtual machines 111, 910 provisioned by the hypervisor 108. At block 1204, the example request collector 116 determines whether an intercepted communication is an access request sent between one or more of the example virtual machines 111, 910 and/or the hypervisor 108 and/or an access request within one of the VMs 111, 910. For example, the request collector 116 may parse the communication and determine the communication is an access request when the syntax of the communication matches a write request syntax or when the syntax of the communication matches a read request syntax. If, at block 1204, the request collector 116 determined that the communication was not an access request (e.g., an access request was not detected), then control proceeds to block 1226 to determine whether to continue or not to continue monitoring communications in the virtual computing environment 900 for an access request.

If, at block 1204, the request collector 116 detected an access request, then, at block 1206, the request collector 116 forwards the access request to the example VHD manager 904 for further processing. At block 1208, the example VHD manager 904 obtains an access request to mount and/or dis-mount a VHD. At block 1210, the example VHD manager 904 determines whether or not the access request invokes an inter-VHD dependencies rule in the storage rules database 906 (FIGS. 9A and/or 9B). For example, using the access request, the VHD manager 904 may query the inter-VHD dependencies shown in the example data table 1000 of FIG. 10 to see if an inter-VHD dependency rule is invoked (e.g., the syntax of the access request matches the syntax of a request in the example requests column 1010 of the data table 1000 of FIG. 10). If, at block 1210, the VHD manager 904 determined that an inter-VHD dependency rule is invoked, then, at block 1212, the VHD manager 904 determines whether the condition(s) of the invoked an inter-VHD dependency rule are satisfied.

If, at block 1212, the example VHD manager 904 determined that the access request satisfied the condition(s) of an invoked inter-VHD dependencies rule in the storage rules database 906, then, at block 1214, the VHD manager 904 generates response action(s) based on the satisfied rule. For example, response actions may include mounting a second VHD to the same virtual machine, mounting the second VHD to a different virtual machine, mounting the second VHD to a virtual machine implemented by a different hypervisor, etc.

After the VHD manager 904 generates the response action(s) at block 1214, or, after the VHD manager 904 determined that the access request did not invoke an inter-VHD dependencies rule at block 1210, or after the VHD manager 904 determined that the access request did not satisfy the condition(s) of an invoked rule at block 1212, then, at block 1216, the VHD manager 904 determines whether or not the access request invokes an inter-VHD relations rule in the storage rules database 906. For example, using the access request, the VHD manager 904 may query the inter-VHD relationships shown in the example data table 1100 of FIG. 11 to see if a rule is invoked (e.g., the syntax of the access request matches the syntax of a request in the example requests column 1110 of the data table 1100 of FIG. 11). If, at block 1216, the VHD manager 904 determined that an inter-VHD dependency rule is invoked, then, at block 1218, the VHD manager 904 determines whether the condition(s) of the invoked rule are satisfied.

If, at block 1218, the example VHD manager 904 determined that the access request satisfied the condition(s) of an invoked inter-VHD relations rule in the storage rules database 906, then, at block 1220, the VHD manager 904 generates response action(s) based on the satisfied rule. For example, response actions may include mounting a second VHD to the same virtual machine, mounting the second VHD to a different virtual machine, dis-mounting the first VHD before mounting the second VHD to a different virtual machine, dis-mounting the first VHD from a first virtual machine and then mounting the second VHD to second virtual machine, etc.

After the VHD manager 904 generates the response action(s) at block 1220, or, after the VHD manager 904 determined that the access request did not invoke a rule based on inter-VHD relations at block 1216, or after the VHD manager 904 determined that the access request did not satisfy the condition(s) of an invoked rule at block 1218, then, at block 1222, the VHD manager 904 determines whether there are response action(s) to execute. For example, response action(s) may have been generated in response to satisfying conditions of an inter-VHD dependencies rule (block 1214) and/or an inter-VHD relations rule (block 1220). If, at block 1222, the VHD manager 904 determined that there are response action(s) to execute, then, at block 1224, the VHD manager 904 executes the generated response action(s). For example, the VHD manager 904 may mount and/or dis-mount additional VHDs to the same and/or different virtual machine as the first VHD and virtual machine.

If, at block 1204, the example request collector 116 determined that an intercepted communication was not an access request, or, if, at block 1222, the VHD manager 126 determined that there were no response actions to execute, or after the VHD manager 904 executes the response action(s) at block 1224, then, at block 1226, the storage manager 902 determines whether to continue monitoring for communications. If, at block 1226, the storage manager 902 determined to continue monitoring for communications, then control returns to block 1202 to continue monitoring communications in the virtual computing environment 900 for an access request. If, at block 1226, the storage manager 902 determined not to continue monitoring the virtual computing environment 900 for communications, the example program 1200 of FIG. 12 then ends.

FIG. 21 is an example data table 2100 illustrating configuration states (e.g., stages) of two virtual machines in a virtual computing environment at different points in time. The example data table 2100 includes a time column 2110 identifying a point in time, a first virtual machine column 2120 identifying the state of the first virtual machine, a second virtual machine column 2130 identifying the state of the second virtual machine, an action column 2140 identifying an action associated with the corresponding point in time, and a rule column 2150 identifying a rule (e.g., an inter-VHD storage rule, a re-direct rule, a life cycle rule, etc.) applicable to at least one virtual hard disk in the virtual environment.

The example data table 2100 of the illustrated example of FIG. 21 includes four example rows 2160, 2170, 2180, corresponding to four different points in time. The example first row 2160 indicates that at a first time, a first VHD A and a second VHD B are mounted to the first virtual machine, and a third VHD C is mounted to the second virtual machine. The example first row 2160 also indicates that an access request to mount the fourth VHD D to the first virtual machine is detected. The example first row 2160 also indicates that an inter-VHD dependency rule associated with the second VHD B prevents a fourth VHD D to be mounted to the same virtual machine as the second VHD B (e.g., "VHD B cannot be mounted with VHD D").

The example second row 2170 indicates that at a second time, the second VHD B has been dis-mounted from the first virtual machine. In the illustrated example, at the second time, only the first VHD A is mounted to the first virtual machine, and the third VHD C is mounted to the second virtual machine. The example second row 2170 also indicates that no rule is applicable based on the action.

The example third row 2180 indicates that at a third time, the fourth VHD D has been mounted to the first virtual machine. In the illustrated example, at the third time, the first VHD A and the fourth VHD D are mounted to the first virtual machine and the third VHD C is mounted to the second virtual machine. The example third row also indicates that when the fourth VHD D is mounted to a virtual machine, (1) a fifth VHD E is also mounted to the same virtual machine (e.g., "Mount VHD E to VM-1 in response to mounting VHD D to VM-1"), and (2) a sixth VHD F is mounted to a different virtual machine (e.g., "Mount VHD F to VM-2).

The example fourth row 2190 indicates that at a fourth time, the fifth VHD E has been mounted to the first virtual machine and the sixth VHD F has been mounted to the second virtual machine. In the illustrated example, at the fourth time, the first VHD A, the fourth VHD D and the fifth VHD E are mounted to the first virtual machine, and the third VHD C and the sixth VHD F are mounted to the second virtual machine. The example fourth row 2190 also indicates that no rule is applicable based on the action.

While four example points in time are represented in the example data table 2100 of FIG. 21, more or fewer points in time may be provided in the example data table 2100. As described below, in some examples, the rules may be life cycle rules in which a determination of whether a condition of the life cycle rule is satisfied depends on a current life cycle stage. For example, in the above example, a life cycle rule may indicate that the VHD F cannot be mounted to the second virtual machine when the current life stage is the "Runtime" life cycle stage.

Figure 13:
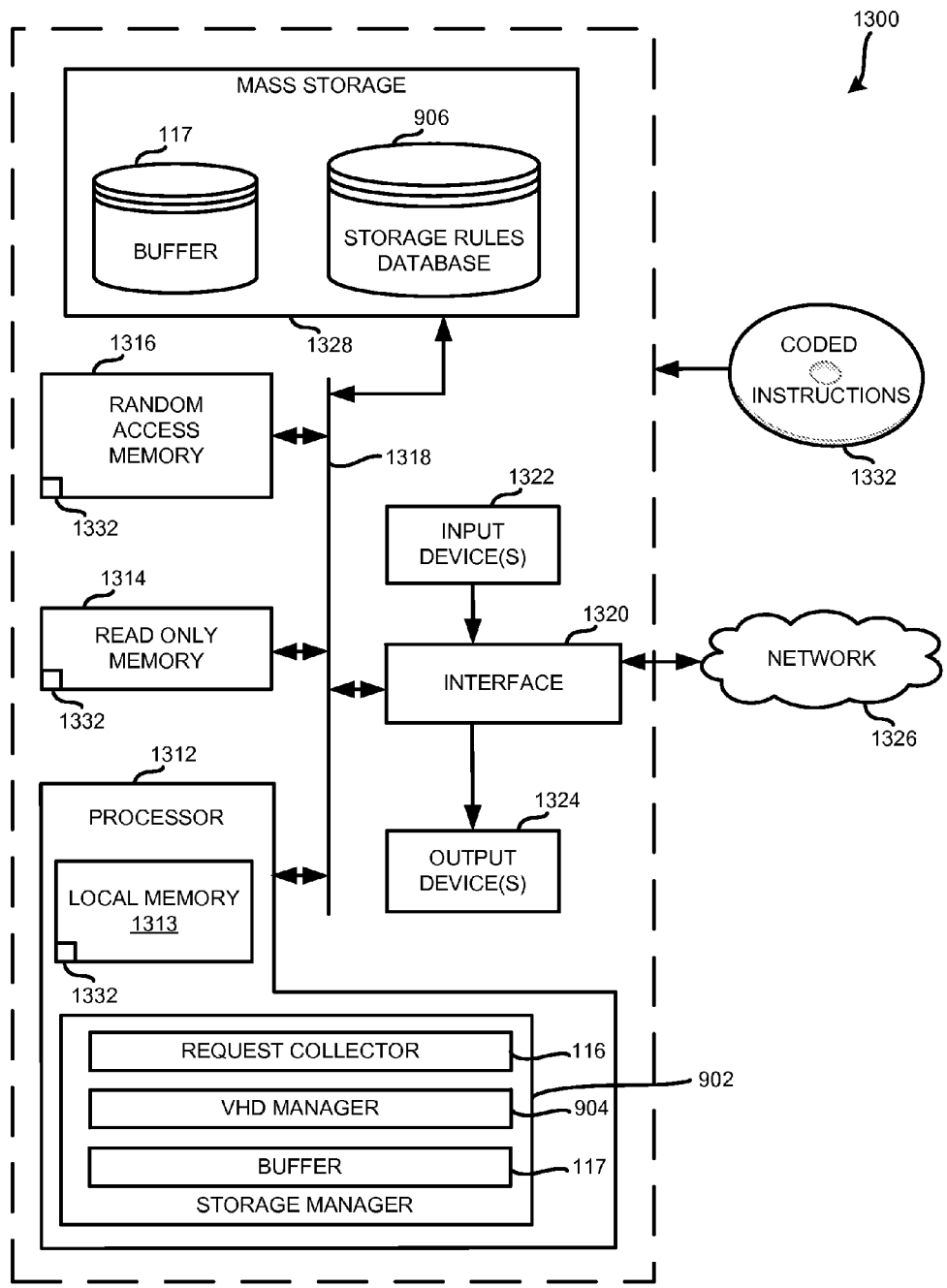
FIG. 13 is a block diagram of an example storage manager structured to execute the example machine-readable instructions of FIG. 12 to implement the example virtual hard disk manager of FIG. 9A or FIG. 9B.

FIG. 13 is a block diagram of an example processor platform 1300 capable of executing the instructions of FIG. 12 to implement the storage manager 902 of FIGS. 9A and/or 9B. The processor platform 1300 can be, for example, a server, a personal computer, or any other type of computing device. The processor platform 1300 of FIG. 13 may represent, for example, the physical resources on which the hypervisor 108, the virtual machine(s) and/or the container(s) are instantiated The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example request collector 116, the example buffer 117, the example VHD manager 904 and/or, more generally, the storage manager 902. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example buffer 117 and the example storage rules database 906. Although the example buffer 117 of FIG. 13 is illustrated in the example processor 1312 and the example mass storage 1328, the example buffer 117 can be in either or both locations.

Coded instructions 1332 representative of the machine-readable instructions of FIG. 12 may be stored in the mass storage device 1328, in the volatile memory 1314, in the non-volatile memory 1316, and/or on a removable tangible computer readable storage medium such as a CD or DVD.

Figure 14A:
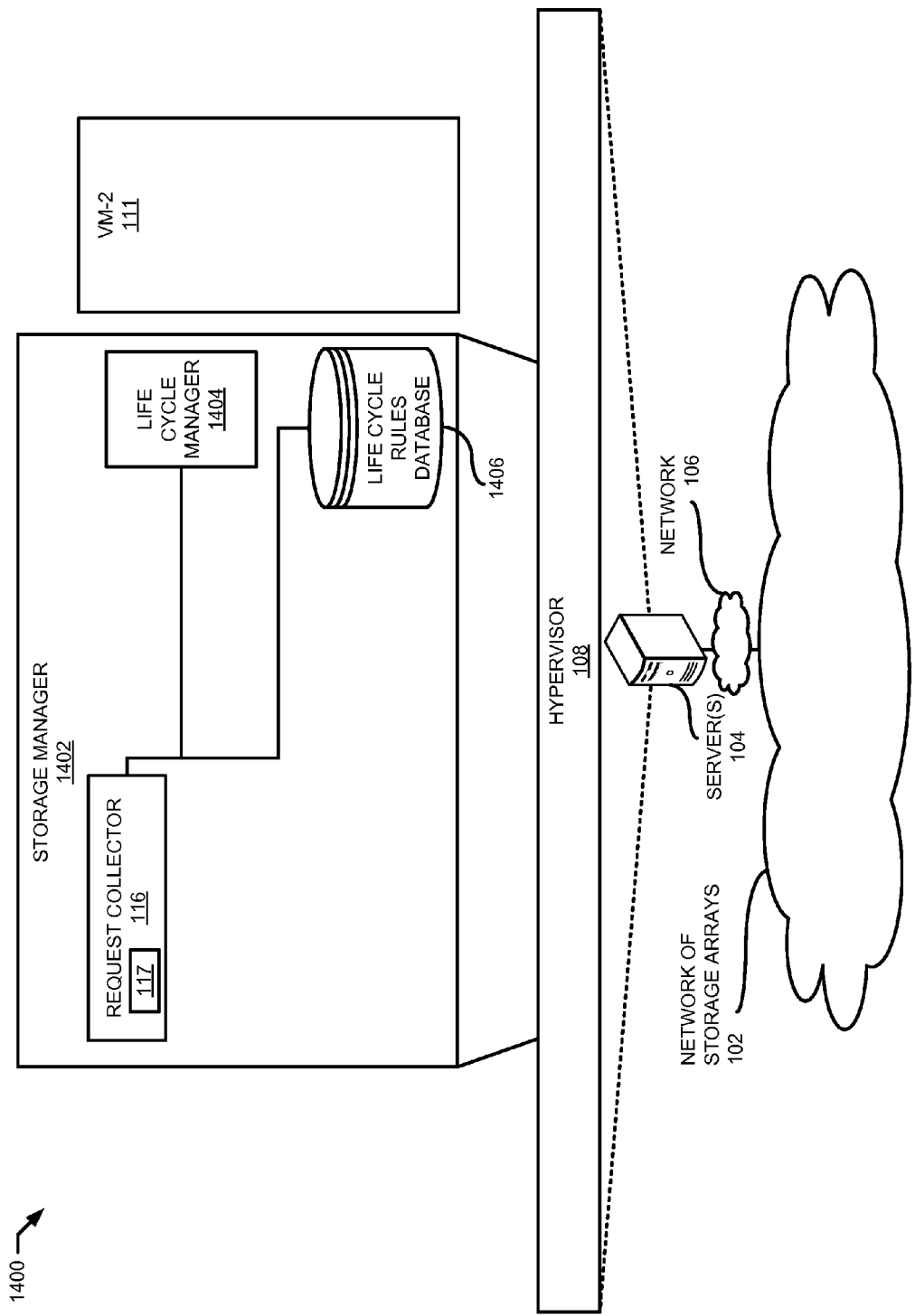
FIG. 14A is a diagram of an example virtual computing environment constructed in accordance with the teachings of this disclosure to enforce life cycle rules in a modularized virtualization topology using virtual hard disks.

FIG. 14A illustrates an example virtual computing environment 1400 including an example storage manager 1402. Other than the storage manager 1402, the example of FIGS. 1A and 14A are similar. Thus, the discussion of like numbered components in FIG. 1A apply equally well to the like numbered parts of FIG. 14A and are not repeated here.

In the illustrated example of FIG. 14A, the example storage manager 1402 includes the example request collector 116 to monitor communications within the virtual computing environment 1400, an example life cycle manager 1404 to enforce life cycle rules in a modularized virtualization topology using virtual hard disks, and an example life cycle rules database 1406.

Figure 14B:
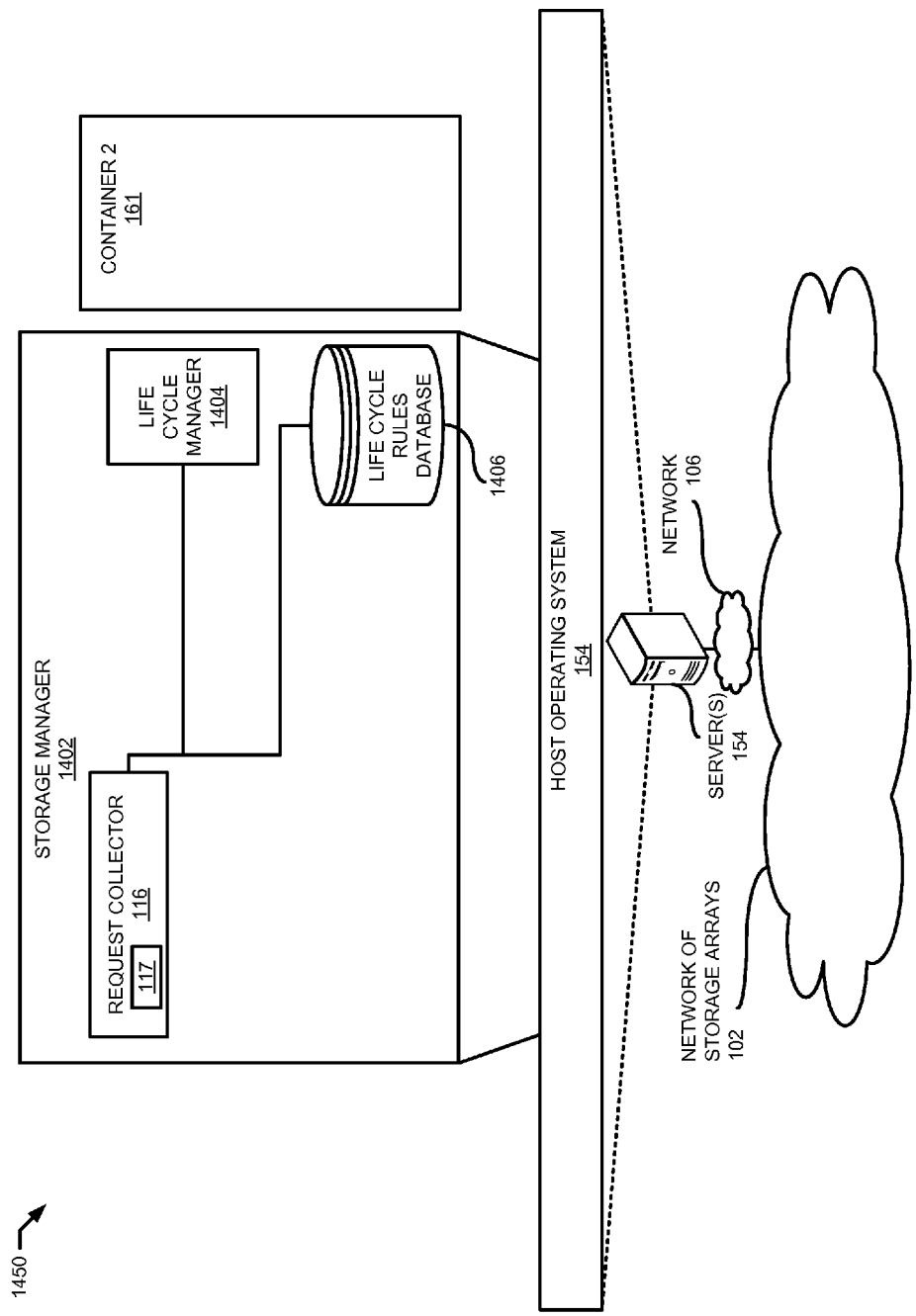
FIG. 14B is a diagram of an alternate example virtual computing environment constructed in accordance with the teachings of this disclosure to enforce life cycle rules in a modularized virtualization topology using virtual hard disks.

FIG. 14B is an example illustrating a light-weight virtual computing environment 1450 employing containers. Other than the use of virtual machines and a hypervisor instead of containers running on a host OS, the example of FIGS. 14A and 14B are similar. Thus, the following discussion of like numbered components in FIG. 14A apply equally well to the like numbered parts of FIG. 14B and, to avoid redundancy, FIG. 14B will not be separately described.

The example storage manager 1402 may re-direct a portion of access requests intercepted within the virtual environment 1400 of FIG. 14A. The example storage manager 1402 of FIG. 14A includes the request collector 116 to monitor communications between the hypervisor 108 and the second virtual machine 111, and/or communications within the virtual machine 111. For example, the request collector 116 may intercept a communication (e.g., trap or hook an I/O communication) and parse the communication (e.g., a message, a request, instructions, etc.) to identify an access request (e.g., a read request or a write request). For example, the request collector 116 may parse a communication and determine the communication is an access request when the syntax of the communication matches a write request syntax or when the syntax of the communication matches a read request syntax. The request collector 116 may then initiate a process to read data from and/or write data to virtual resources loaded onto the second virtual machine 111. In the illustrated example of FIG. 14A, the request collector 116 initiates the process by providing a detected access request to the example life cycle manager 1404. The request collector 116 then returns to monitoring for communications. In some examples, the request collector 116 may include and/or be in communication with an example buffer 117 to temporarily store the intercepted communications before providing them to the life cycle manager 1404. In this example, each VHD encapsulates a single logical functionality.

In some examples, accessing a virtual hard disk (VHD) may depend on the different life cycle stages of an application and/or service. For example, a database life cycle may include an installation stage, a runtime stage, a vulnerable stage and a de-provision stage. The installation stage may include first functionality to initiate a database and second functionality to populate the database with default values. The runtime stage of the database life cycle may include functionality enabling access to the database. The vulnerable stage of the database life cycle may include functionality that prevents access to the database (e.g., due to a detected security threat in the virtual computing environment 1400). The de-provision stage of the database life cycle includes first functionality to erase the data in the database and second functionality to delete the database. Furthermore, each of the function structures may be encapsulated in different, respective VHDs.

Figure 15:
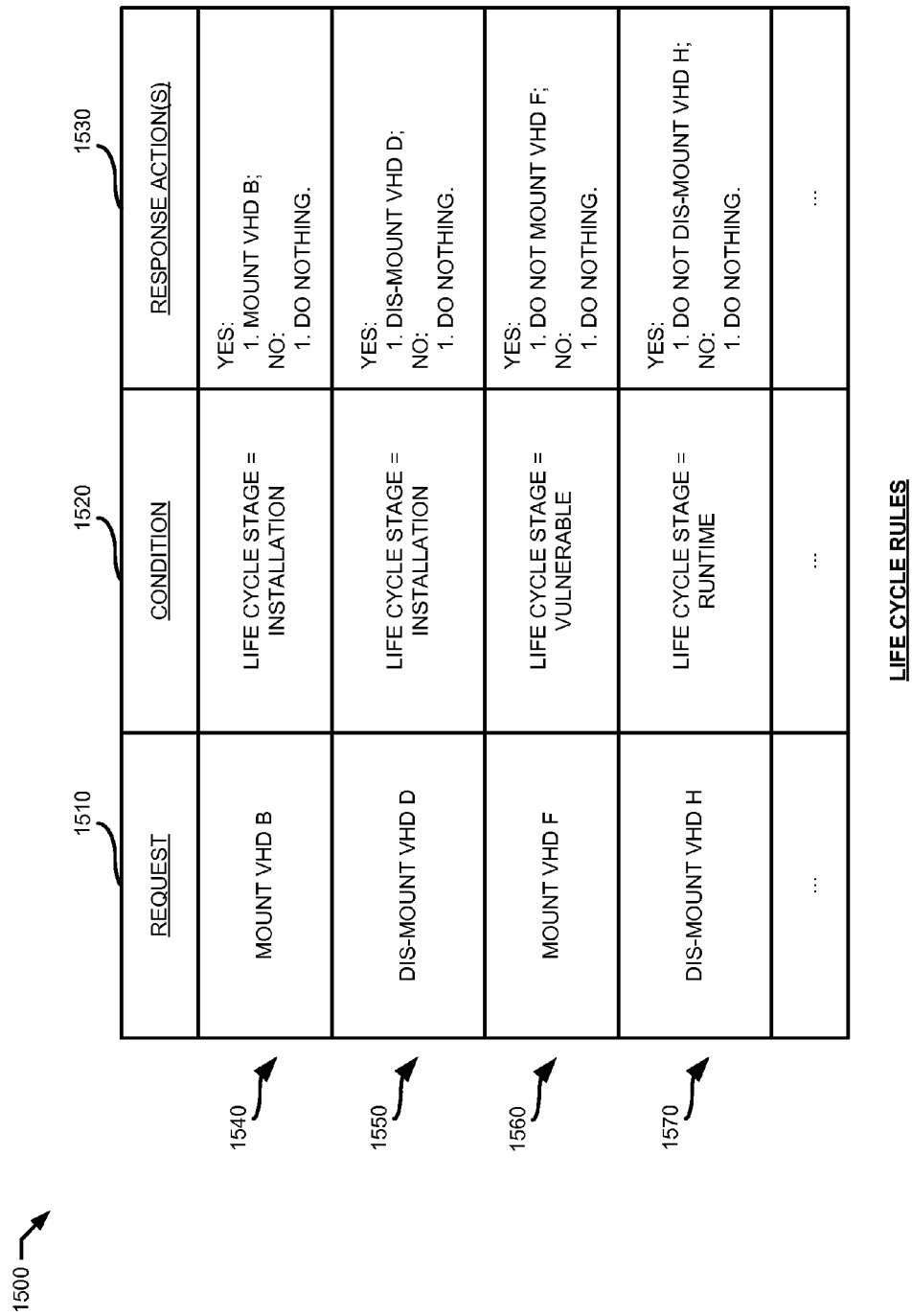
FIG. 15 illustrates an example data table that may be employed by the example storage manager of FIG. 14A or FIG. 14B to store life cycle rules.

In the illustrated example of FIG. 14A, the storage manager 1402 is provided with the example life cycle manager 1404 to enforce life cycle rules associated with the VHDs in the virtual computing environment 1400. In the illustrated example, the life cycle manager 1404 of FIG. 14A queries the example life cycle rules database 1406 to identify relationships and/or rules governing access to one or more VHDs (e.g., VHDs used in cooperation to support the same service) at one or more life cycle stages. An example data table 1500 representing life cycle rules based on life cycle stages is shown in FIG. 15.

In the illustrated example, the life cycle rules database 1406 includes life cycle rules that associate access requests with response actions based on life cycle stage conditions. For example, when the life cycle manager 1404 matches the access request with a life cycle rule in the life cycle rules database 1406, the life cycle manager 1404 of FIG. 14A determines whether a condition (e.g., a current life cycle stage) associated with the virtual hard disk specified in the access request is satisfied (e.g., true/false, valid/invalid, etc.). For example, a life cycle rule in the life cycle database 1406 may specify that a VHD encapsulating instructions (e.g., a script) to erase all information in a database can only be mounted while the database service is in the de-provision stage. In some such examples, when an access request to mount the VHD is detected during another life cycle stage of the database service (e.g., the installation stage, the runtime stage or the vulnerable stage), the life cycle manager 1404 disregards (e.g., refuses) the request.

In the illustrated example, the life cycle rules database 1406 also includes current life cycle stage information. For example, the life cycle manager 1404 may store a current life cycle stage in the life cycle rules database 1406 and/or the life cycle manager 1404 may read a current life cycle stage from the life cycle rules database 1406 after specified operations (e.g., an init script) are executed.

In some examples, the life cycle manager 1404 removes (e.g., dis-mounts) a VHD once its functionality is performed. For example, in the above example, after two VHDs encapsulating the two installation functionalities are mounted and executed, the life cycle manager 1404 may automatically dis-mount, deactivate and/or delete the two VHDs so that the corresponding installation functionalities cannot be executed again. An example flowchart representative of example machine-readable instructions that may be executed to implement the example life cycle manager 1404 is described below in connection with FIG. 16.

The example life cycle rules database 1406 of FIG. 14A employs life cycle rules that are queried by the example life cycle manager 1404. In some examples, the life cycle rules are pre-populated by a software designer. For example, a developer of a service implemented with a modularized virtualization topology may populate the life cycle rules database 1406 with life cycle rules appropriate for respective VHDs. In some examples, the life cycle rules may be expressed as metadata associated with a corresponding virtual hard disk. For example, metadata associated with a virtual hard disk may define one or more response action(s) in response to access requests corresponding to the functionality and/or data sets encapsulated by the virtual hard disk. This metadata may be accessible by the life cycle manager 1404 whenever the VHD is accessed. The metadata may be compared to the life cycle stage to determine if the life cycle stage condition is satisfied.

The example life cycle rules database 1406 of FIG. 14A may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., a flash memory). The example life cycle rules database 1406 may additionally or alternatively be implemented by one or more double data rate (DDR) memories such as DDR, DDR2, DDR3, mobile DDR (mDDR), etc. The example life cycle rules database 1406 may additionally or alternatively be implemented by one or more mass storage devices such as hard disk drive(s), compact disk drive(s), digital versatile disk drive(s), etc. While in the illustrated example the life cycle rules database 1406 is illustrated as a single database, the life cycle rules database 1406 may be implemented by any number and/or type(s) of databases.

FIG. 15 illustrates an example data table 1500 that may be stored by the example life cycle rules database 1406 of FIGS. 14A and/or 14B. The example data table 1500 of FIG. 15 may store life cycle rules specifying life cycle stage requirements for VHDs. For example, the life cycle manager 1404 of FIGS. 14A and/or 14B may access (e.g., query) the data table 1500 and facilitate and/or restrict execution of the intercepted access request based on the life cycle stage of the VHD.

The example data table 1500 of FIG. 15 includes an example request column 1510, an example condition column 1520 and an example response action(s) column 1530. The example request column 1510 indicates the access request being processed by the life cycle manager 1404. The example condition column 1520 indicates that the response action associated with the identified storage rule depends on whether the life cycle stage condition is satisfied or not satisfied. For example, the life cycle manager 1404 may compare the current life cycle stage of a VHD to the identified life cycle stage condition in the condition column 1520.

Referring to the above example, life cycle stages associated with a database service may include "Installation," "Runtime," "Vulnerable" and "De-Provision." While, in the illustrated example, the conditions are based on life cycle stage requirements, any other configuration information may additionally or alternatively be used such as, for example, system configuration settings, open and/or mounted devices, installed software, program state/configuration information, privileges, etc. For example, an additional condition may allow a VHD to be mounted once during a life cycle stage and subsequent mounting requests are disregarded (e.g., refused) during that same life cycle stage, but not in a second, later life cycle stage.

The example response action(s) column 1530 indicates an example response action associated with the identified storage rule based on whether or not the identified condition is satisfied. However, any other columns representing any other condition(s) and/or characteristic(s) of the access request may additionally or alternatively be used. In addition, the example column(s) may be implemented in any other fashion.

The example data table 1500 of the illustrated example of FIG. 15 includes four example rows 1540, 1550, 1560, 1570, corresponding to four different life cycle rules specifying mounted VHD condition life cycle stage requirements for VHDs. The first row 1540 of the example data table 1500 of FIG. 15 indicates that a life cycle rule corresponds to access requests to "mount VHD B." To determine the appropriate response action(s) to generate in response to an access request to "mount VHD B," a determination is made whether or not the life cycle stage is in the "Installation" stage (e.g., a database service is being installed). In the illustrated example, when the life cycle manager 1404 determines that the condition is satisfied (e.g., the current life cycle stage is the "Installation" stage), then the response action is to mount the VHD specified in the access request (e.g., the VHD B). For example, the VHD B may encapsulate database information that is accessed by a database engine and, thus, the life cycle manager 1404 enables the VHD B to be mounted to a virtual machine. In the illustrated example, when the condition is not satisfied (e.g., the current life cycle stage is not the "Installation" stage), then, the response action is to do nothing (e.g., the access request to "mount VHD B" is refused).

The second row 1550 of the example data table 1500 of FIG. 15 indicates that a life cycle rule corresponds to access requests to "dis-mount VHD D." To determine the appropriate response action(s) to generate in response to an access request to "dis-mount VHD D," a determination is made whether or not the corresponding service is in the "Installation" stage. In the illustrated example, when the life cycle manager 1404 determines that the condition is satisfied (e.g., the current life cycle stage is the "Installation" stage), then the response action is to dis-mount the VHD specified in the access request (e.g., the VHD D). For example, the VHD D may encapsulate instructions to populate a database (e.g., with initial values). In such circumstances, when the instruction to populate has been executed, the VHD D can be dis-mounted. By dis-mounting the VHD D, the life cycle manager 1404 prevents the accidental execution of the instruction to populate a database during a different life cycle stage (e.g., during the runtime life cycle stage). In some examples, the life cycle manager 1404 may also delete or shut down the dis-mounted VHD D to prevent further access to the instructions to populate a database. In the illustrated example, when the condition is not satisfied (e.g., the current life cycle stage is not the "Installation" stage), then, the response action is to do nothing (e.g., the access request to "dis-mount VHD D" is refused).

The third row 1560 of the example data table 1500 of FIG. 15 indicates that a life cycle rule corresponds to access requests to "mount VHD F." To determine the appropriate response action(s) to generate in response to an access request to "mount VHD F," a determination is made whether or not the corresponding service is in the "Vulnerable" stage (e.g., mounting VHDs is restricted). In the illustrated example, when the life cycle manager 1404 determines that the condition is satisfied (e.g., the current life cycle stage is the "Vulnerable" stage), then the response action is to not mount the VHD specified in the access request (e.g., refuse to mount the VHD F). For example, during a detected security threat, access to VHDs may be disabled to, for example, prevent malicious activity such as mounting a VHD including an instruction to erase data. In the illustrated example, when the condition is not satisfied (e.g., the current life cycle stage is not the "Vulnerable" stage), then, the response action is to do nothing (e.g., the access request to "mount VHD F" is refused).

The fourth row 1570 of the example data table 1500 of FIG. 15 indicates that a life cycle rule corresponds to access requests to "dis-mount VHD H." To determine the appropriate response action(s) to generate in response to an access request to "dis-mount VHD H," a determination is made whether or not the corresponding service is in the "Runtime" stage (e.g., access to the information in the data table is enabled). In the illustrated example, when the life cycle manager 1404 determines that the condition is satisfied (e.g., the current life cycle stage is the "Runtime" stage), then the response action is to refuse to dis-mount the VHD specified in the access request (e.g., refuse to dis-mount the VHD H). For example, if a database engine is accessing database information encapsulated in the VHD H, then the VHD H cannot be dis-mounted at that time. In the illustrated example, when the condition is not satisfied (e.g., the current life cycle stage is not the "Runtime" stage), then, the response action is to do nothing (e.g., the access request to "dis-mount VHD H" is refused).

While four example storage rules directed to life cycle stage requirements are represented in the example data table 1500 of FIG. 15, fewer or more rules corresponding to life cycle stage requirements may be used.

As noted above, FIG. 14B illustrates an example lightweight modularized virtualization system constructed using a container-based architecture instead of a virtual machine-based architecture. The example of FIG. 14B is similar to the example of FIG. 14A. However, in the example of FIG. 14B, the example storage manager is executed on the host operating system 154 and the modularized virtualization topology is reflected within containers instead of in virtual machines. Subject to these differences, the above description of FIG. 14A is applicable to the example of FIG. 14B.

While an example manner of implementing the example storage manager 1402 is illustrated in FIG. 14A and/or FIG. 14B, one or more of the elements, processes and/or devices illustrated in FIGS. 14A and/or 14B may be combined, divided, re-arranged, omitted, eliminated and/or implemented in any other way. Further, the example request collector 116, the example buffer 117, the example life cycle manager 1404, the example life cycle rules database 1406 and/or, more generally, the example storage manager 1402 of FIGS. 14A and/or 14B may be implemented by hardware, software, firmware and/or any combination of hardware, software and/or firmware. Thus, for example, any of the example request collector 116, the example buffer 117, the example life cycle manager 1404, the example life cycle rules database 1406 and/or, more generally, the example storage manager 1402 of FIGS. 14A and/or 14B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request collector 116, the example buffer 117, the example life cycle manager 1404, the example life cycle rules database 1406 and/or, more generally, the example storage manager 1402 of FIGS. 14A and/or 14B is/are hereby expressly defined to include a tangible computer readable storage device or storage disk such as a memory, a digital versatile disk (DVD), a compact disk (CD), a Blu-ray disk, etc. storing the software and/or firmware. Further still, the example storage manager 1402 of FIGS. 14A and/or 14B may include one or more elements, processes and/or devices in addition to, or instead of, those illustrated in FIGS. 14A and/or 14B, and/or may include more than one of any or all of the illustrated elements, processes and devices.

Figure 16:
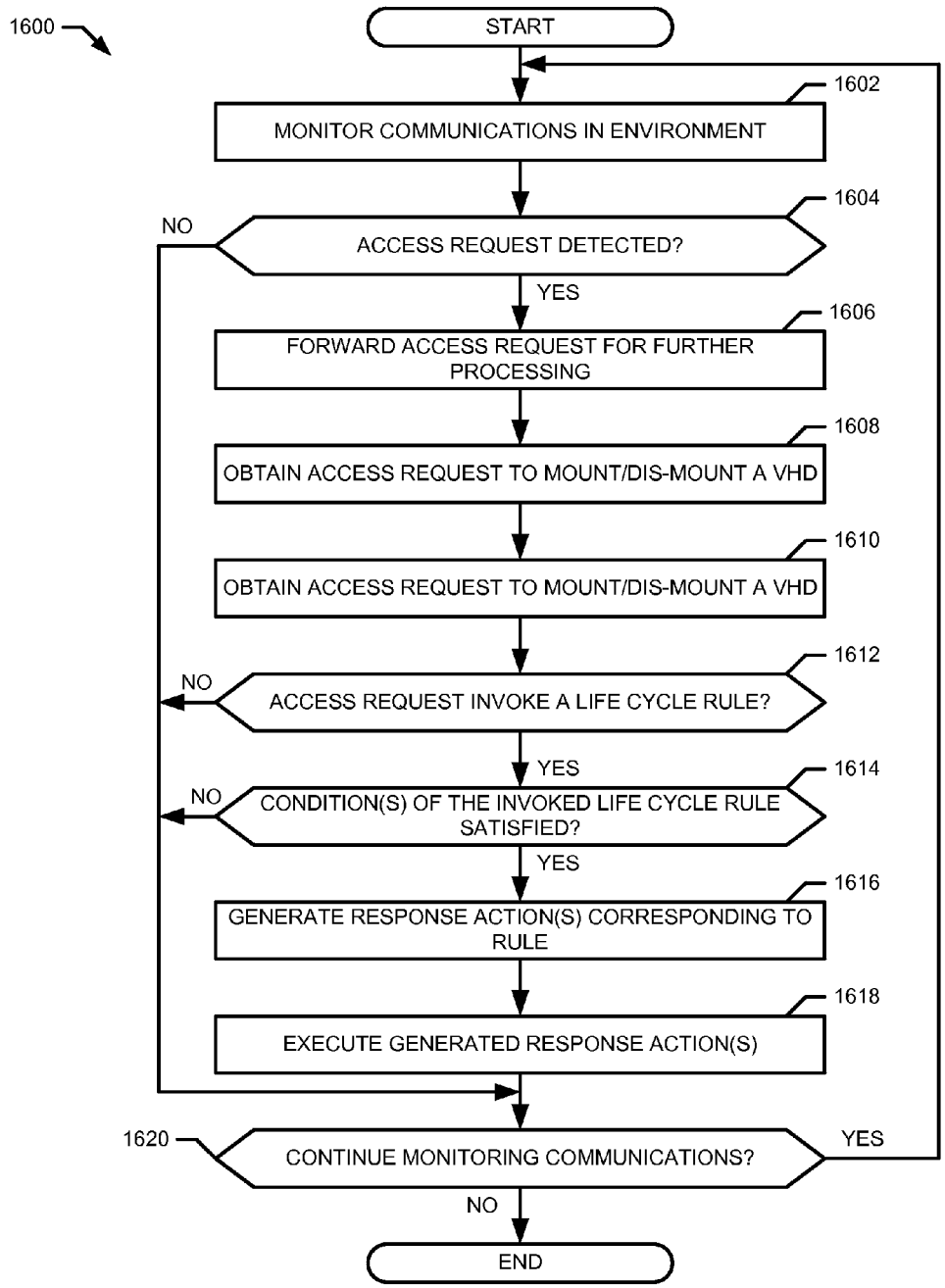
FIG. 16 is a flowchart representative of example machine-readable instructions that may be executed to manage life cycle rules in the environments of FIG. 14A or 14B.

A flowchart representative of example machine readable instructions for implementing the storage manager 1402 of FIGS. 14A and/or 14B is shown in FIG. 16. In this example, the machine readable instructions comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIG. 16, many other methods of implementing the example storage manager 1402 may alternatively be used. For example, the order of execution of the blocks may be changed, and/or some of the blocks described may be changed, eliminated, or combined.

As mentioned above, the example processes of FIG. 16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 16 is a flowchart representative of example machine-readable instructions 1600 that may be executed by the example storage manager 1402 of FIGS. 14A and/or 14B to enforce life cycle rules in a modularized virtualization topology using virtual hard disks. For example, the life cycle manager 1404 (FIGS. 14A and/or 14B) maintains the integrity of an application and/or service by determining whether or not the correct VHDs are mounted/dis-mounted and that they are mounted/dis-mounted in a correct order consistent with the life cycle stages of the application and/or service. For example, referring to the example life cycle stages of a database service described above, an example life cycle rule may define that a specified VHD (1) may only execute during the de-provision life cycle stage and (2) when the previous life cycle stage of the database service was the runtime stage. In such circumstances, accidental and/or malicious out-of-order execution can be prevented. The example life cycle manager 1404 may also enforce VHD expirations by dis-mounting, deleting and/or powering-off a VHD once its corresponding life cycle stage has passed and/or the functionality of the VHD has been completed.

The instructions 1600 of the illustrated example of FIG. 16 begin at block 1602 when the example storage manager 1402 monitors communications in the virtual computing environment 1400. For example, the request collector 116 (FIGS. 14A and/or 14B) intercepts (e.g., traps and/or hooks) communications within the virtual computing environment 1400 for access requests between the hypervisor 108 and the virtual machine 111, and/or communications within the virtual machine 111. At block 1604, the example request collector 116 determines whether an intercepted communication is an access request sent between one or more of the example second virtual machine 111 and/or the hypervisor 108. For example, the request collector 116 may parse the communication and determine the communication is an access request when the syntax of the communication matches a write request syntax or when the syntax of the communication matches a read request syntax. If, at block 1604, the request collector 116 determined that the communication was not an access request (e.g., an access request was not detected), then control proceeds to block 1620 to determine whether to continue or not to continue monitoring communications for an access request.

If, at block 1604, the request collector 116 detected an access request, then, at block 1606, the request collector 116 forwards the access request to the example life cycle manager 1404 for further processing. At block 1608, the example life cycle manager 1404 obtains an access request to mount and/or dis-mount a VHD. At block 1610, the life cycle manager 1404 determines the current life cycle stage for the service associated with the access request. For example, referencing the database life cycles described above, the life cycle manager 1404 may determine whether the database service is in the "installation" stage, the "runtime" stage, the "vulnerable" stage or the "de-provision" stage.

At block 1612, the example life cycle manager 1404 determines whether the access request invokes a life cycle rule in the in the life cycle rules database 1406 (FIGS. 14A and/or 14B). For example, using the access request, the life cycle manager 1404 may query the life cycle rules shown in the example data table 1500 of FIG. 15 to see if a life cycle rule is invoked (e.g., the syntax of the access request matches the syntax of a request in the example requests column 1510 of the data table 1500 of FIG. 15). If, at block 1612, the life cycle manager 1404 determined that a life cycle rule is invoked, then, at block 1614, the life cycle manager 1404 determines whether the condition(s) of the invoked life cycle rule are satisfied.

If, at block 1614, the example life cycle manager 1404 determined that the access request satisfied the condition(s) of the invoked life cycle rule in the life cycle rules database 1406, then, at block 1616, the life cycle manager 1404 generates response action(s) based on the satisfied rule. For example, response actions may include mounting a second VHD, dis-mounting a first VHD, disregarding the mounting/dis-mounting request, etc. At block 1618, the life cycle manager 1404 executes the generated response action(s). For example, the life cycle manager 1404 may mount a VHD, dis-mount a VHD, disregard the request to mount and/or dis-mount a VHD, etc.

If, at block 1604, the example request collector 116 determined that an intercepted communication was not an access request, or, if, at block 1612, the life cycle manager 1404 determined that the access request did not invoke a life cycle rule, or after the life cycle manager 1404 determined that the access request did not satisfy the conditions of an invoked life cycle rule in the life cycle rules database 1406, or after the life cycle manager 1404 executes the generated response action(s) at block 1618, then, at block 1620, the storage manager 1402 determines whether to continue monitoring for communications. If, at block 1620, the storage manager 1402 determined to continue monitoring for communications, then control returns to block 1602 to continue monitoring communications in the virtual computing environment 1400 for an access request. If, at block 1620, the storage manager 1402 determined not to continue monitoring the virtual computing environment 1400 for communications, the example program 1600 of FIG. 16 then ends.

Figure 17:
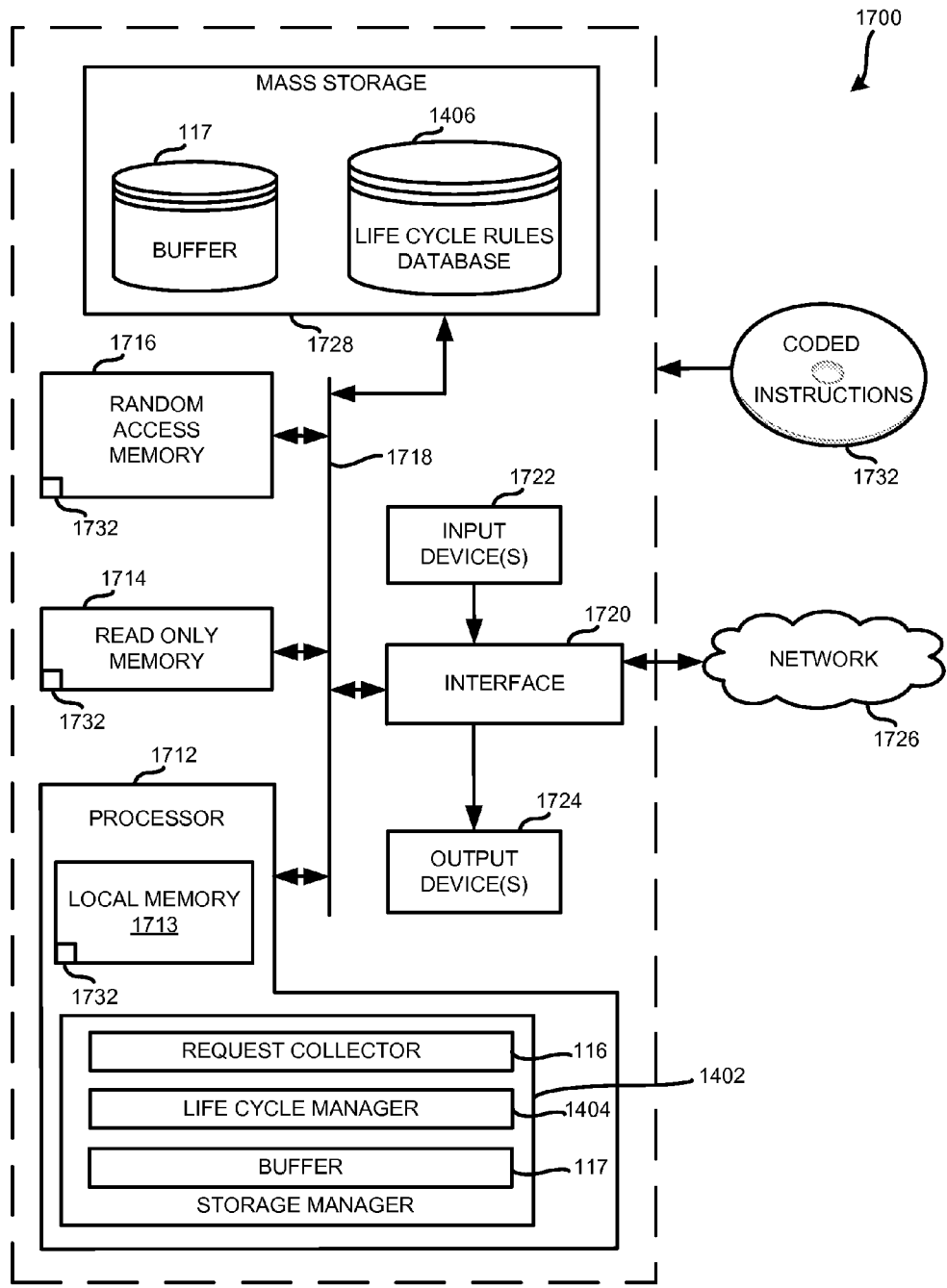
FIG. 17 is a block diagram of an example storage manager structured to execute the example machine-readable instructions of FIG. 16 to implement the example life cycle manager of FIG. 14A or FIG. 14B.

FIG. 17 is a block diagram of an example processor platform 1700 capable of executing the instructions of FIG. 16 to implement the storage manager 1404 of FIGS. 14A and/or 14B. The processor platform 1700 can be, for example, a server, a personal computer, or any other type of computing device. The processor platform 1700 of FIG. 17 may represent, for example, the physical resources on which the hypervisor 108, the virtual machine(s) and/or the container(s) are instantiated.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example executes the instructions to implement the example request collector 116, the example buffer 117, the example life cycle manager 1404 and/or, more generally, the storage manager 1404. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives. The example mass storage 1728 implements the example buffer 117 and the example life cycle rules database 1406. Although the example buffer 117 of FIG. 17 is illustrated in the example processor 1712 and the example mass storage 1728, the example buffer 117 can be in either or both locations.

Coded instructions 1732 representative of the machine-readable instructions of FIG. 16 may be stored in the mass storage device 1728, in the volatile memory 1714, in the non-volatile memory 1716, and/or on a removable tangible computer readable storage medium such as a CD or DVD.

Figure 18A:
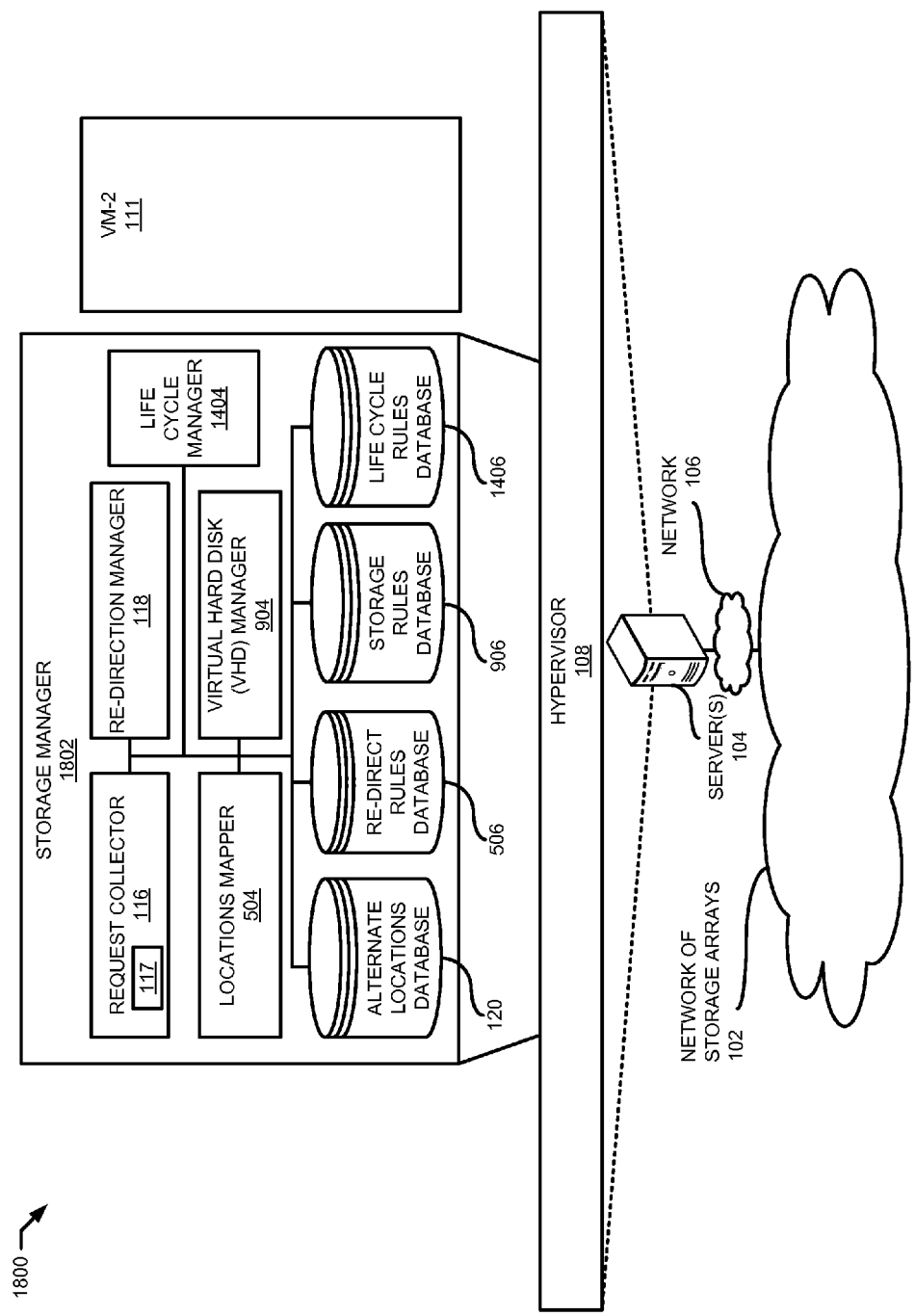
FIG. 18A is a diagram of an example virtual computing environment constructed in accordance with the teachings of this disclosure.

FIG. 18A illustrates an example virtual computing environment 1800 including an example storage manager 1802 combining the structures of the examples of FIGS. 1A, 5A, 9A, and 14A. The storage manager 1802 of FIG. 18A can, thus, perform all of the operations discussed in the above disclosed examples. The discussion of like numbered components in FIGS. 1A, 5A, 9A and 14A above apply equally well to the like numbered parts of FIG. 18A and are not repeated here.

In the illustrated example of FIG. 18A, the storage manager 1802 includes the example request collector 116 of FIG. 1A, the example buffer 117 of FIG. 1A, the example re-direction manager 118 of FIG. 1A, the example locations mapper 504 of FIG. 5A, the example virtual hard disk (VHD) manager 904 of FIG. 9A, and the example life cycle manager 1404 of FIG. 14A. The example storage manager 1802 also includes the example alternate locations database 120 of FIG. 1A, the example re-direct rules database 506 of FIG. 5A, the example storage rules database 906 of FIG. 9A and the example life cycle rules database 1406 of FIG. 14A.

Figure 18B:
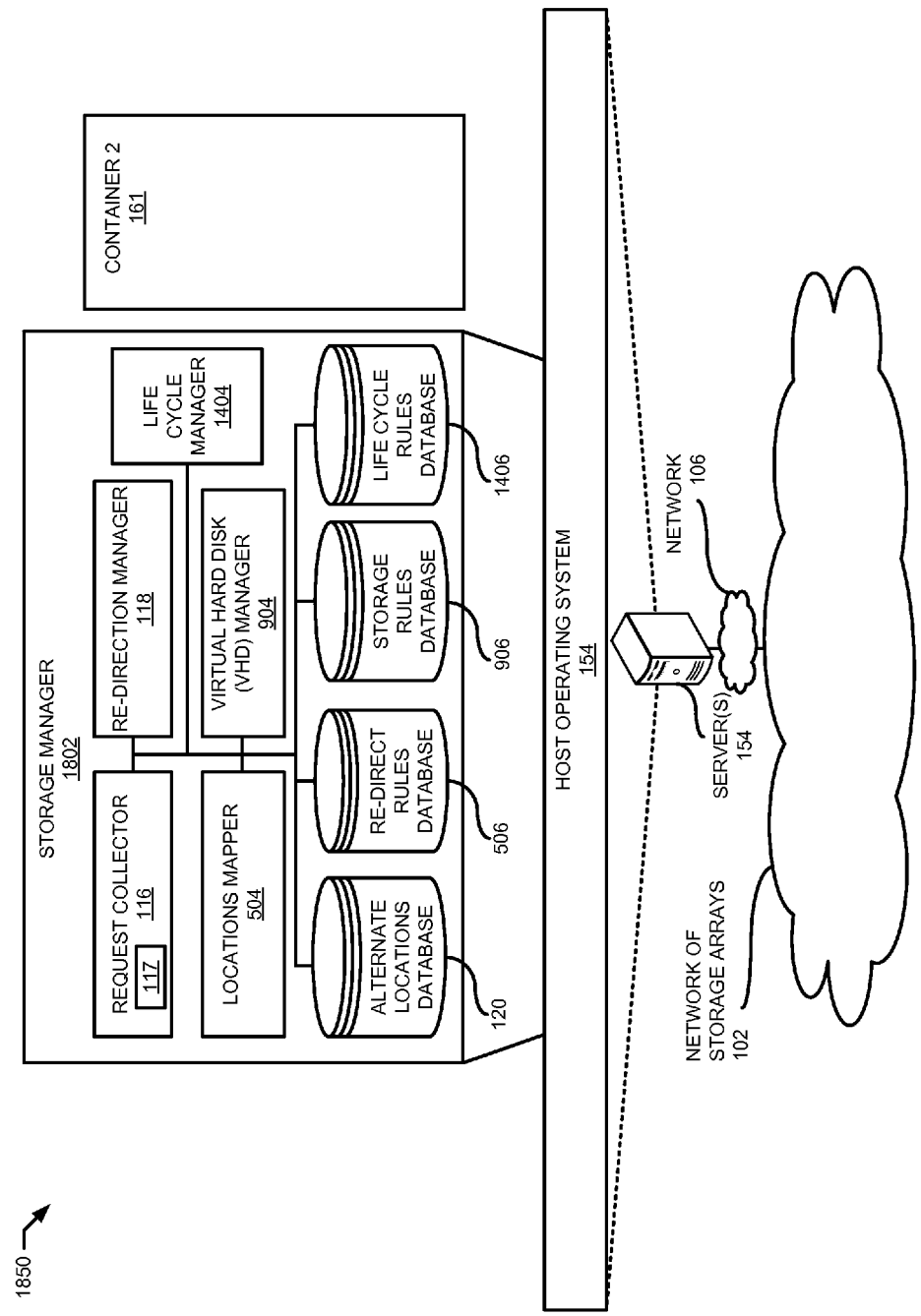
FIG. 18B is a diagram of an alternate example virtual computing environment constructed in accordance with the teachings of this disclosure.

FIG. 18B is an example illustrating a light-weight virtual computing environment 1850 employing the container 161. Other than the use of virtual machines and a hypervisor instead of containers running on a host OS, the example of FIGS. 18A and 18B are similar. In the example of FIG. 18B, the example storage manager 1802 is executed on the host operating system 154 and the modularized virtualization topology is implemented via containers instead of in virtual machines. Subject to these differences, the above description of FIG. 18A is applicable to the example of FIG. 18B.

Figure 19:
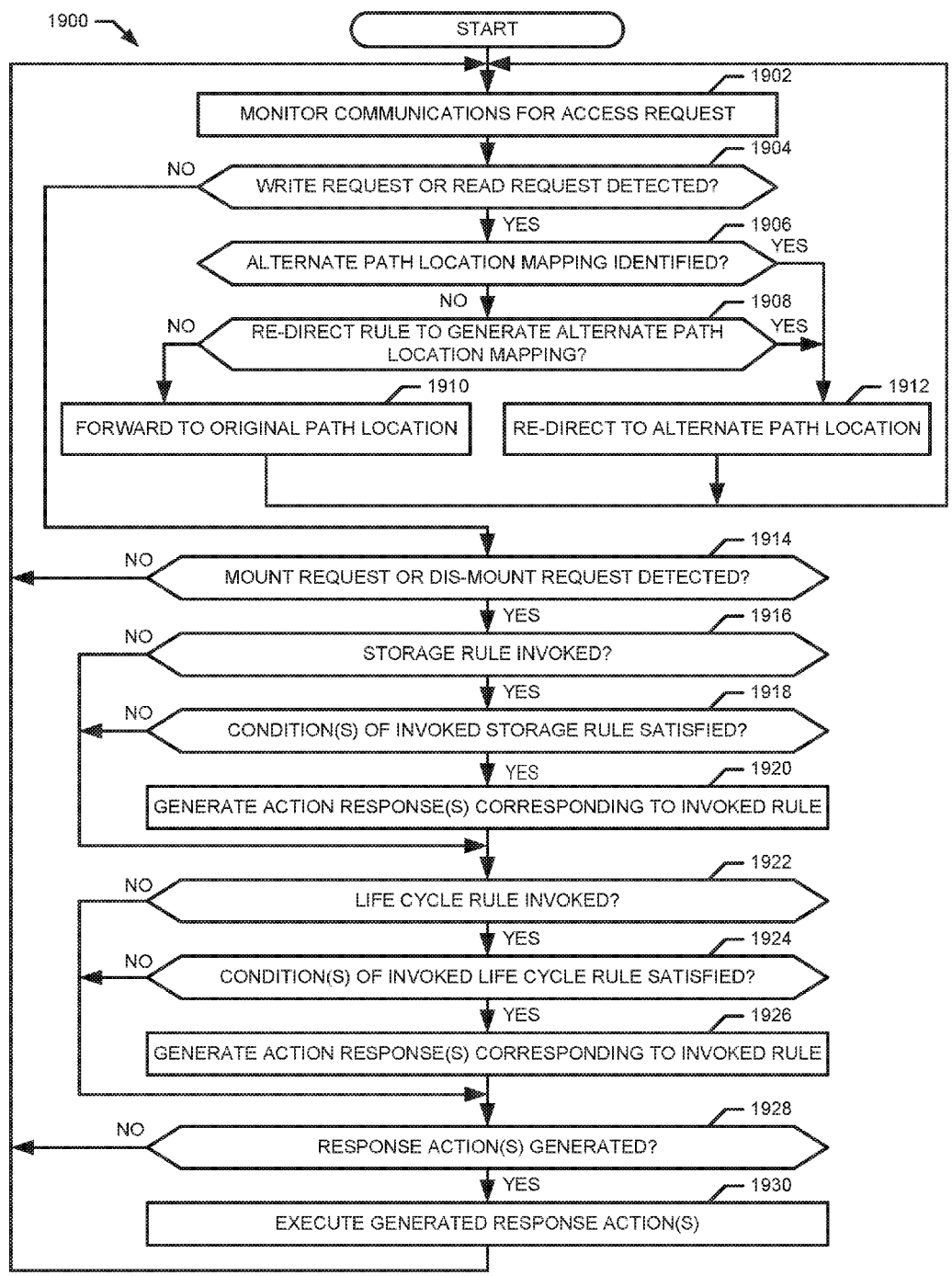
FIG. 19 is a flowchart representative of example machine-readable instructions that may be executed to facilitate managing computer environments using modularized encapsulation in virtual hard disks in the environments of FIG. 18A or FIG. 18B.

FIG. 19 is a flowchart representative of example machine-readable instructions 1900 that may be executed by the example storage manager 1802 of FIGS. 18A and/or 18B to facilitate applying a modularized virtualization topology using virtual hard disks. The instructions 1900 of the illustrated example of FIG. 19 begin at block 1902 when the example storage manager 1802 monitors communication in the virtual computing environment 1800. For example, the request collector 116 (FIGS. 18A and/or 18B) monitors communications for access requests between the example hypervisor 108 and the example second virtual machine 111 provisioned by the hypervisor 108. At block 1904, the example request collector 116 determines whether or not a detected access request is a write request or a read request. For example, the request collector 116 may parse a communication and determine the communication is an access request when the syntax of the communication matches a write request syntax or when the syntax of the communication matches a read request syntax. If, at block 1904, the request collector 116 determined that the access request was a write request or a read request, then, at block 1906, the example storage manager 1802 determines whether to direct the access request to the original path location specified in the access request or to re-direct the access to an alternate path location. For example, the re-direction manager 118 (FIGS. 18A and/or 18B) may query the alternate locations database 120 (FIGS. 18A and/or 18B) for a path location mapping matching the original path location. If, at block 1906, the alternate locations database 120 returns an alternate path location (e.g., an alternate path location mapping was identified), then, control proceeds to block 1912 to re-direct the access request to the identified alternate path location. Control then returns to block 1902 to monitor communication in the virtual computing environment 1800.

If, at block 1906, the example storage manager 1802 did not identify an alternate path location mapping (e.g., the alternate locations database 120 did not return a path location mapping matching the original path location), then, at block 1908, the storage manager 1802 determines whether the alternate locations database 120 should include an alternate path location mapping based on the original path location specified in the access request. For example, the locations mapper 504 (FIGS. 18A and/or 18B) may query the re-direct rules database 506 (FIGS. 18A and/or 18B) based on the original path location to determine whether or not to generate an alternate path location mapping to store in the alternate locations database 120.

If, at block 1908, the example storage manager 1802 did not identify a re-direct rule based on the original path location (e.g., the re-direct rules database 506 did not return a re-direct rule matching the original path location), then, at block 1910, the example storage manager 1802 forwards the access request to the original path location. For example, the re-direction manager 118 and/or the locations mapper 504 may direct the access request to the original path location specified in the access request. Control then returns to block 1902 to monitor communication in the virtual computing environment 1800.

If, at block 1908, the example storage manager 1802 did identify a re-direct rule based on the original path location, then, at block 1912, the storage manager 1802 re-directs the access request to the alternate path location. For example, the re-direction manager 118 and/or the locations mapper 504 may re-direct the access request to the alternate path location based on the path location mapping (e.g., the generated path location mapping). Control then returns to block 1902 to monitor communication in the virtual computing environment 1800.

If, at block 1904, the storage manager 1802 determined that the access request was not a write request or a read request (e.g., the request collector 116 determined that the communication was not an access request), then, at block 1914, the storage manager 1802 determines whether or not the access request was either a mount request or a dis-mount request. If, at block 1914, the storage manager 1802 determined that the access request was neither a mount request nor a dis-mount request, control returns to block 1902 to monitor communication in the virtual computing environment 1800.

If, at block 1914, the storage manager 1802 determined that the access request was either a mount request or a dis-mount request, then, at block 1916, the storage manager 1802 determines whether a storage rule is invoked. For example, the VHD manager 904 (FIGS. 18A and/or 18B) may query the storage rules database 906 (FIGS. 18A and/or 18B) to determine whether the access request invokes an inter-VHD dependencies rule and/or an inter-VHD relations rule. If, at block 1916, the VHD manager 904 determined that an inter-VHD dependencies rule and/or an inter-VHD relations rule was invoked, then, at block 1918, the VHD manager 904 determines whether a condition(s) of the invoked rule is satisfied. If, at block 1918, the VHD manager 904 determined that a condition(s) of the invoked rule is satisfied, then, at block 1920, the VHD manager 904 generates response action(s) corresponding to the invoked rule.

After the VHD manager 904 generates the action response(s) at block corresponding to the invoked rule at block 1920, or if the VHD manager 904 determined that the access request did not invoke a rule at block 1916, or, if, at block 1918, the condition(s) of the invoked rule were not satisfied, then, at block, 1922, the storage manager 1802 determines whether a life cycle rule is invoked. For example, the life cycle manager 1404 (FIGS. 18A and/or 18B) may query the life cycle rules database 1406 (FIGS. 18A and/or 18B) to determine whether the access request invokes a life cycle rule. If, at block 1922, the life cycle manager 1404 determined that a life cycle rule was invoked, then, at block 1924, the life cycle manager 1404 determines whether a condition(s) of the invoked life cycle rule is satisfied. If, at block 1924, the life cycle manager 1404 determined that a condition(s) of the invoked life cycle rule is satisfied, then, at block 1926, the life cycle manager 1404 generates response action(s) corresponding to the invoked life cycle rule.

At block 1928, the storage manager 1802 determines whether there are response action(s) to execute. For example, response action(s) may have been generated in response to satisfying conditions of an invoked inter-VHD dependencies rule or an invoked inter-VHD relations rule (block 1920) and/or an invoked life cycle rule (block 1926). If, at block 1928, the storage manager 1802 determines that there are response action(s) to execute, then, at block 1930, the storage manager 1802 executes the generated response action(s). For example, the storage manager 1802 may mount and/or dis-mount additional VHDs to the same and/or different virtual machine as the first VHD and virtual machine.

After the storage manager 1802 executes the response action(s) at block 1930, or, if the storage manager 1802 determined that there were no response actions to execute at block 1928, control returns to block 1902 to monitor communication in the virtual computing environment 1800.

Figure 20:
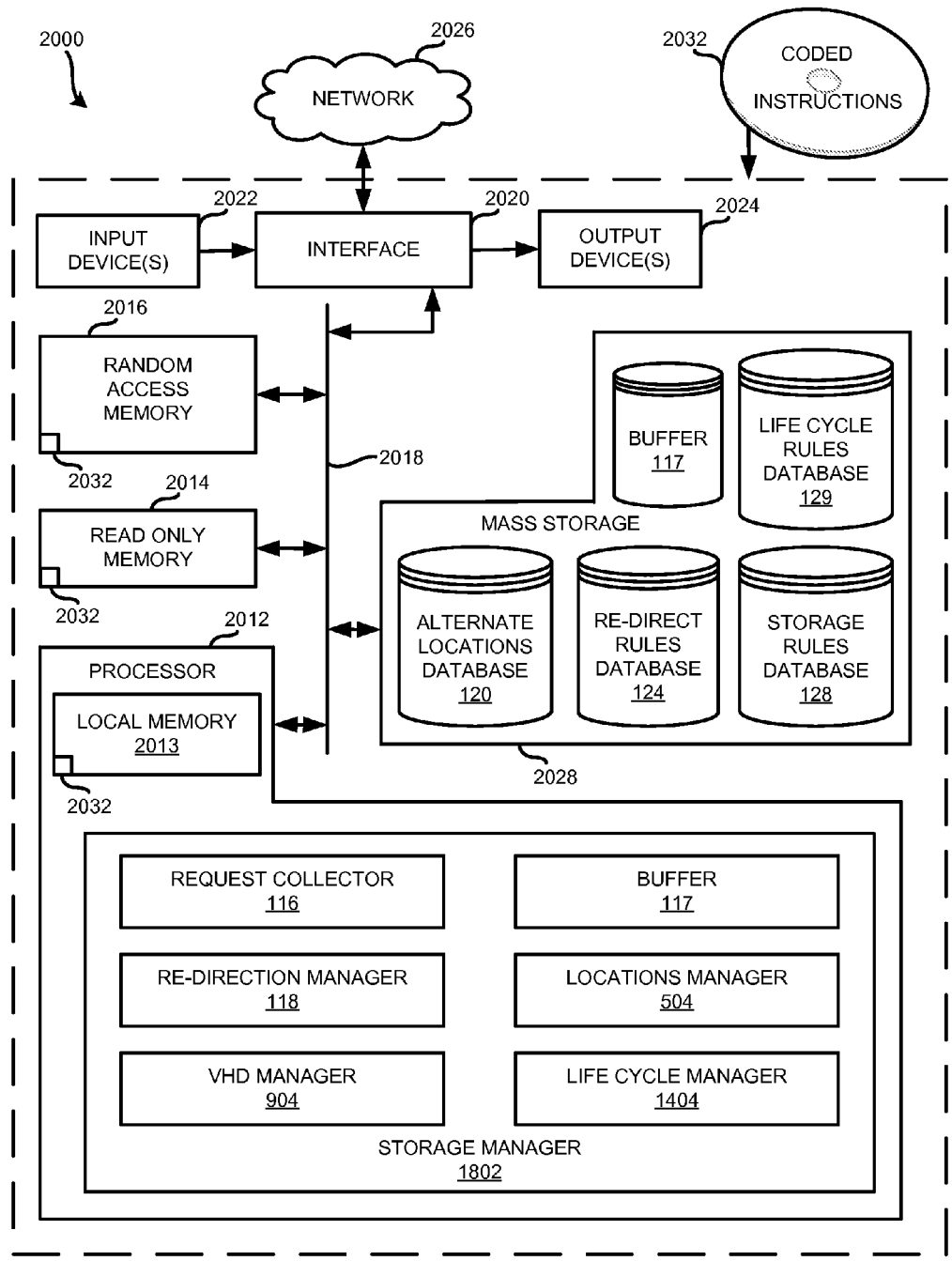
FIG. 20 is a block diagram of an example storage manager structured to execute the example machine-readable instructions of FIGS. 3, 7A, 7B, 12, 16 and/or 19 to implement the example storage manager of FIG. 18A or FIG. 18B.

FIG. 20 is a block diagram of an example processor platform 2000 capable of executing the instructions of FIGS. 3, 7A, 7B, 12, 16 and/or 19 to implement the storage manager 114 of FIGS. 1A and/or 1B, the example storage manager 502 of FIGS. 5A and/or 5B, the example storage manager 902 of FIGS. 9A and/or 9B, the example storage manager 1402 of FIGS. 14A and/or 14B, and/or, in general, the example storage manager 1802 of FIGS. 18A and/or 18B. The processor platform 2000 can be, for example, a server, a personal computer, or any other type of computing device. The processor platform 2000 of FIG. 20 may represent, for example, the physical resources on which the hypervisor 108, the virtual machine(s) and/or the container(s) are instantiated.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

The processor 2012 of the illustrated example includes a local memory 2013 (e.g., a cache). The processor 2012 of the illustrated example executes the instructions to implement the example request collector 116, the example buffer 117, the example re-direction manager 118, the example locations manager 504, the example VHD manager 904, the example life cycle manager 1404 and/or, more generally, the storage manager 1802. The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives. The example mass storage 2028 implements the example buffer 117, the example alternate locations database 120, the example re-direct rules database 506, the example storage rules database 906 and the example life cycle rules database 1406. Although the example buffer 117 of FIG. 20 is illustrated in the example processor 2012 and the example mass storage 2028, the example buffer 117 can be in either or both locations.

Coded instructions 2032 representative of the machine-readable instructions of FIGS. 3, 7A, 7B, 12, 16 and/or 19 may be stored in the mass storage device 2028, in the volatile memory 2014, in the non-volatile memory 2016, and/or on a removable tangible computer readable storage medium such as a CD or DVD.

From the foregoing, it will be appreciated that disclosed methods, apparatus and articles of manufacture enable applying a modularized virtualization topology using virtual hard disks. The VHDs are each dedicated to one functionality and/or data set. In this manner, an application or service can be modified by modifying a VHD rather than searching for the resources in a general virtual hard disk, and without affecting the operation of virtual computing resources. For example, an application can be loaded by mounting VHDs collectively implementing the application. The VHDs are self-contained. As a result, one or more of VHDs can be modified (e.g., deleted, updated, etc.) without interfering with the usability of other VHD(s) mounted in the virtual computing environment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A modularized virtualized computing environment comprising:
   a processor;
   a hypervisor;
   a virtual machine deployed by the hypervisor;
   a plurality of virtual hard drives, each virtual hard drive encapsulating one respective logical functionality or one logical data set, the plurality of virtual hard drives cooperating to implement an overall functionality or service, the one respective logical functionality or the one logical data set maintained separate from other logical functionalities or logical data sets; and
   a storage manager to:
      identify a request to access a software asset at a first path location; and
      determine that the first path location is mapped to a second path location associated with a first one of the plurality of virtual hard drives;
      redirect the request to the second path location,
      determine whether the software asset associated with the request invokes a re-direct rule;
      when the software asset invokes the re-direct rule, provision a new virtual hard drive encapsulating functionality of the software asset; and
      map the first path location to a new path location associated with the new virtual hard drive.

2. A modularized virtualized computing environment as defined in claim 1, wherein the plurality of virtual hard drives are provisioned to perform the overall functionality or service of prior non-modularized software by:
   identifying respective software assets to implement the respective logical functionality in the prior, non-modularized software;
   encapsulating copies of the respective software assets in the respective ones of the plurality of virtual hard drives; and
   mapping original pathnames associated with the software assets to respective ones of the plurality of virtual hard drives.

3. A modularized virtualized computing environment as defined in claim 2, wherein the software assets are dispersed in multiple folders in the prior non-modularized software.

4. A modularized virtualized computing environment as defined in claim 1, wherein each of the plurality of virtual hard drives encapsulates the corresponding one respective logical functionality or the one logically-related data set without any portion of the corresponding one respective logical functionality or the one logically-related data set moving onto any other one of the plurality of virtual hard drives.

5. A modularized virtualized computing environment as defined in claim 4, wherein each of the plurality of virtual hard drives does not include files or data which are unrelated to the corresponding one respective logical functionality or the one logically-related data set, and, which can render any functionality the corresponding virtual hard drive provides, unusable, should the corresponding virtual hard drive be dis-mounted.

6. A modularized virtualized computing environment as defined in claim 1, wherein a first one of the plurality of virtual hard drives is associated with an inter-virtual drive rule, the inter-virtual drive rule defining a dependency condition relative to a second one of the plurality of virtual hard drives.

7. A modularized virtualized computing environment as defined in claim 6, wherein the dependency condition specifies that the first virtual hard drive cannot be mounted if the second virtual hard drive is mounted.

8. A modularized virtualized computing environment as defined in claim 6, wherein the dependency condition specifies that the first virtual hard drive and the second virtual hard drive cannot be mounted on a same virtual machine.

9. A modularized virtualized computing environment as defined in claim 6, wherein the dependency condition specifies that the second virtual hard drive is to be mounted in response to mounting of the first virtual hard drive.

10. A modularized virtualized computing environment as defined in claim 9, wherein the virtual machine is a first virtual machine, and the second virtual hard drive is mounted to a second virtual machine in response to mounting of the first virtual hard drive to the first virtual machine.

11. A modularized virtualized computing environment as defined in claim 1, wherein a first one of the plurality of virtual hard drives is associated with a life cycle stage rule, the life cycle stage rule permitting mounting of the first virtual hard drive during a first life cycle stage, but not during a second life cycle stage.

12. A modularized virtualized computing environment as defined in claim 1, wherein a first one of the plurality of virtual hard drives is associated with a life cycle stage rule, the life cycle stage rule refusing mounting of the first virtual hard drive during a first life cycle stage.

13. A method of migrating non-modularized software to a modularized virtualized computing environment comprising:
identifying respective software assets to implement respective logical functionality in the prior non-modularized software;
provisioning, with a hypervisor executing on a processor, a plurality of virtual hard drives to execute in one or more virtual machines, each virtual hard drive encapsulating one of the respective logical functionalities, the plurality of virtual hard drives cooperating to implement an overall functionality or service of the non-modularized software, the one of the respective logical functionalities maintained separate from other logical functionalities; and mapping, with the hypervisor executing on the processor, original pathnames associated with the software assets to respective ones of the plurality of virtual hard drives;
identifying a request to access a software asset of the non-modularized software at a first path location;
determining that the first path location is mapped to a second path location associated with a first one of the plurality of virtual hard drives;
redirecting the request to the second path location;
determining whether the software asset associated with the request invokes a re-direct rule;
when the software asset invokes the re-direct rule, provisioning a new virtual hard drive encapsulating functionality of the software asset; and
mapping the first path location to a new path location associated with the new virtual hard drive.

14. A method as defined in claim 13, wherein each of the plurality of virtual hard drives encapsulates the corresponding one respective logical functionality without any portion of the corresponding one respective logical functionality onto any other one of the plurality of virtual hard drives.

15. A method as defined in claim 13, further including determining a first one of the plurality of virtual hard drives is associated with an inter-virtual drive rule, the inter-virtual drive rule defining a dependency condition relative to a second one of the plurality of virtual hard drives.

16. A method as defined in claim 15, wherein the dependency condition specifies that the first virtual hard drive cannot be mounted if the second virtual hard drive is mounted.

17. A method as defined in claim 15, wherein the dependency condition specifies that the first virtual hard drive and the second virtual hard drive cannot be mounted on a first one of the virtual machines.

18. A method as defined in claim 15, wherein the dependency condition specifies that the second virtual hard drive is to be mounted in response to mounting of the first virtual hard drive.

19. A method as defined in claim 18, wherein the second virtual hard drive is mounted to a first one of the virtual machines in response to mounting of the first virtual hard drive to a second one of the virtual machines.

20. A method as defined in claim 13, further including determining a first one of the plurality of virtual hard drives is associated with a life cycle stage rule, the life cycle stage rule permitting mounting of the first virtual hard drive during a first life cycle stage, but not during a second life cycle stage.

21. A method as defined in claim 13, further including determining a first one of the plurality of virtual hard drives is associated with a life cycle stage rule, the life cycle stage rule refusing mounting of the first virtual hard drive during a first life cycle stage.

* * * * *